United States Patent

Ishida et al.

[11] Patent Number: 5,809,344
[45] Date of Patent: *Sep. 15, 1998

[54] CAMERA

[75] Inventors: Tokuji Ishida, Daito; Yasuo Nakanishi, Osaka; Toshihiko Ishimura, Habikino; Takehiro Katoh, Nara; Kenji Ishibashi, Sakai; Yoshihiro Hara, Kishiwada; Takashi Kondo, Neyagawa; Hiroshi Yoshino, Osaka, all of Japan

[73] Assignee: Minolta Co., Ltd., Osaka, Japan

[*] Notice: The term of this patent shall not extend beyond the expiration date of Pat. No. 5,550,611.

[21] Appl. No.: 647,454

[22] Filed: May 7, 1996

Related U.S. Application Data

[62] Division of Ser. No. 203,643, Mar. 1, 1994, Pat. No. 5,550,611, which is a continuation of Ser. No. 889,605, May 27, 1992.

[30] Foreign Application Priority Data

May 28, 1991 [JP] Japan ................................. 3-123978

[51] Int. Cl.⁶ ........................................................ G03B 17/00
[52] U.S. Cl. ............................ 396/48; 396/223; 396/238; 396/243
[58] Field of Search .............................. 396/48, 213, 223, 396/238, 243, 242

[56] References Cited

U.S. PATENT DOCUMENTS 5,159,364  10/1992  Yanagisawa et al. ..................... 396/48

Primary Examiner—Russell E. Adams
Attorney, Agent, or Firm—Burns, Doane, Swecker & Mathis, LLP

[57] ABSTRACT

A camera includes an operation device having a plurality of operation modes for executing an operation, a mode changing device for changing over operation modes, a designation device for designating a desired operation mode as an initial mode, and a reset device for resetting the operation device to the designated initial mode.

21 Claims, 64 Drawing Sheets

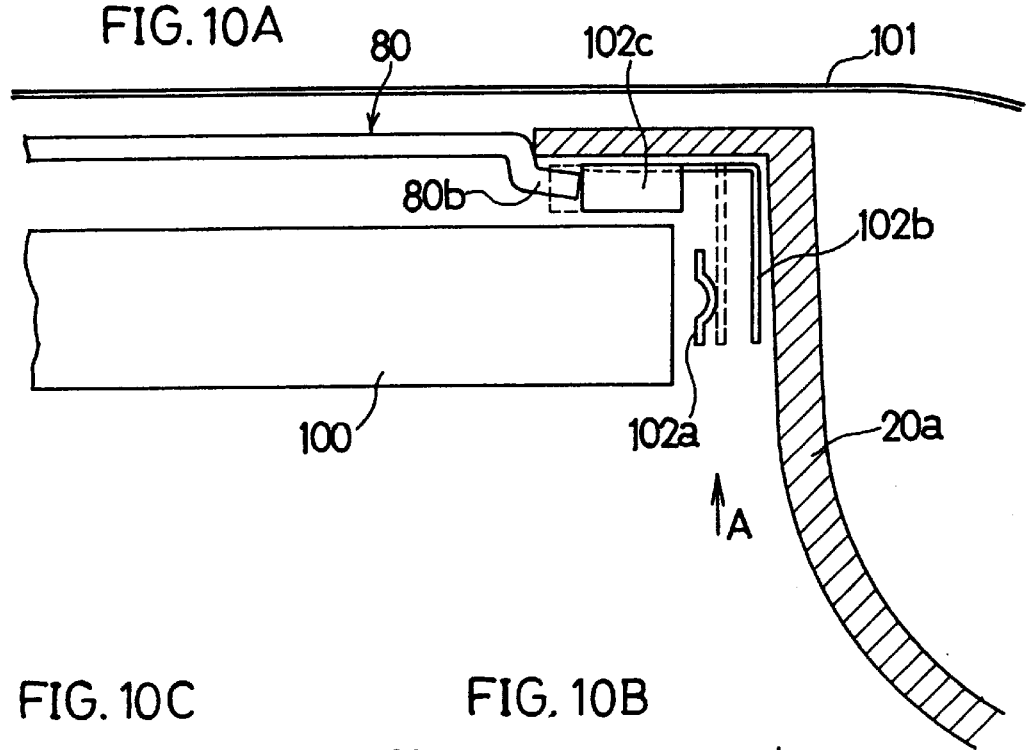
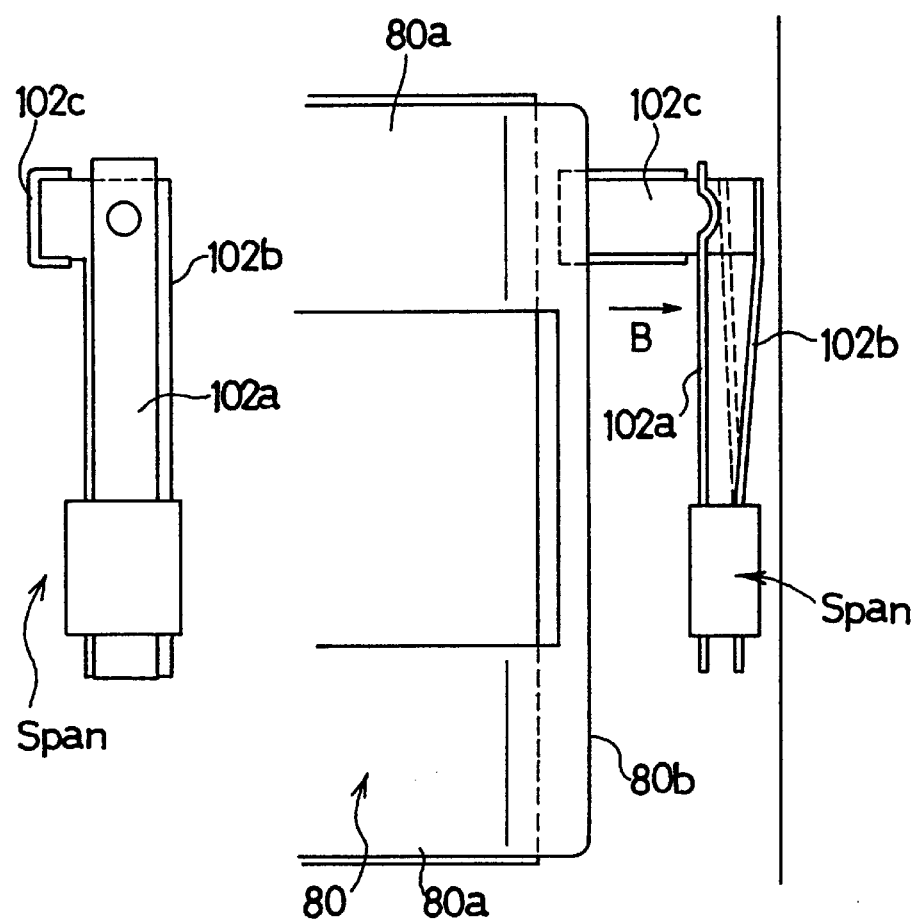

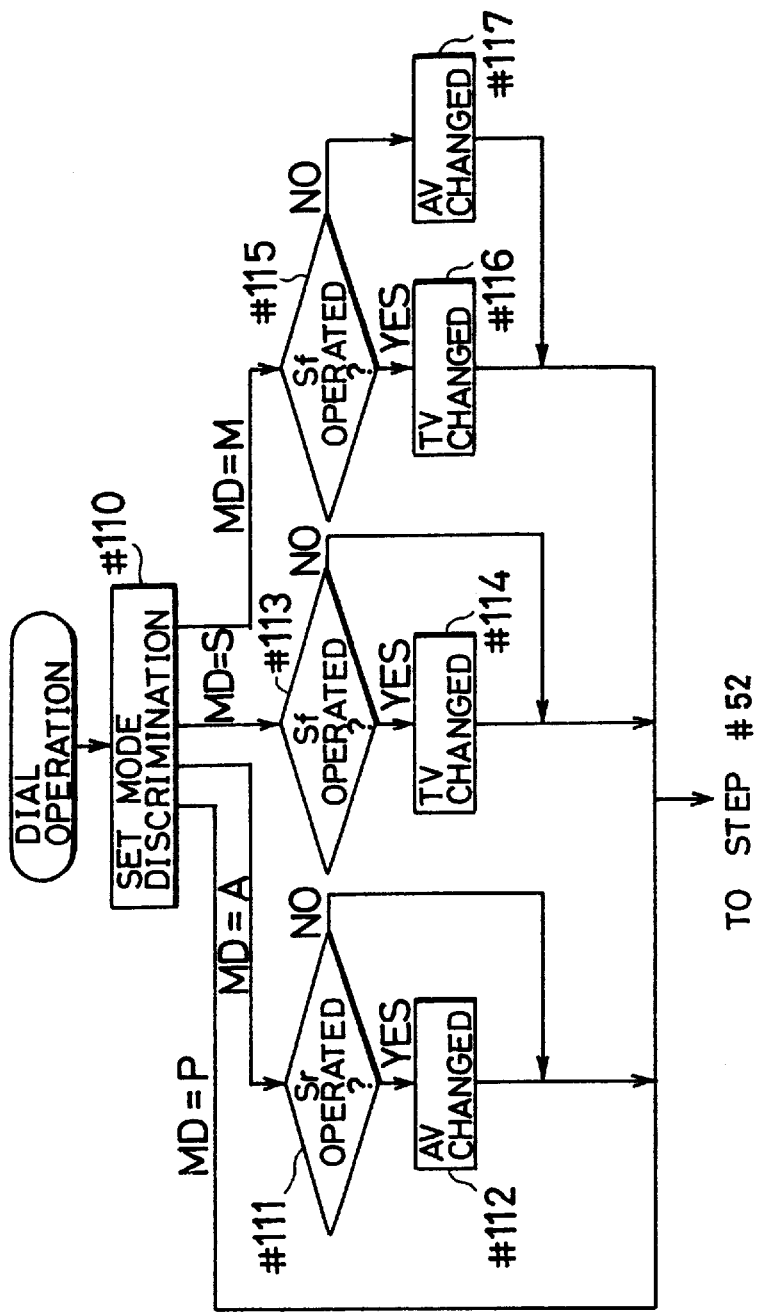

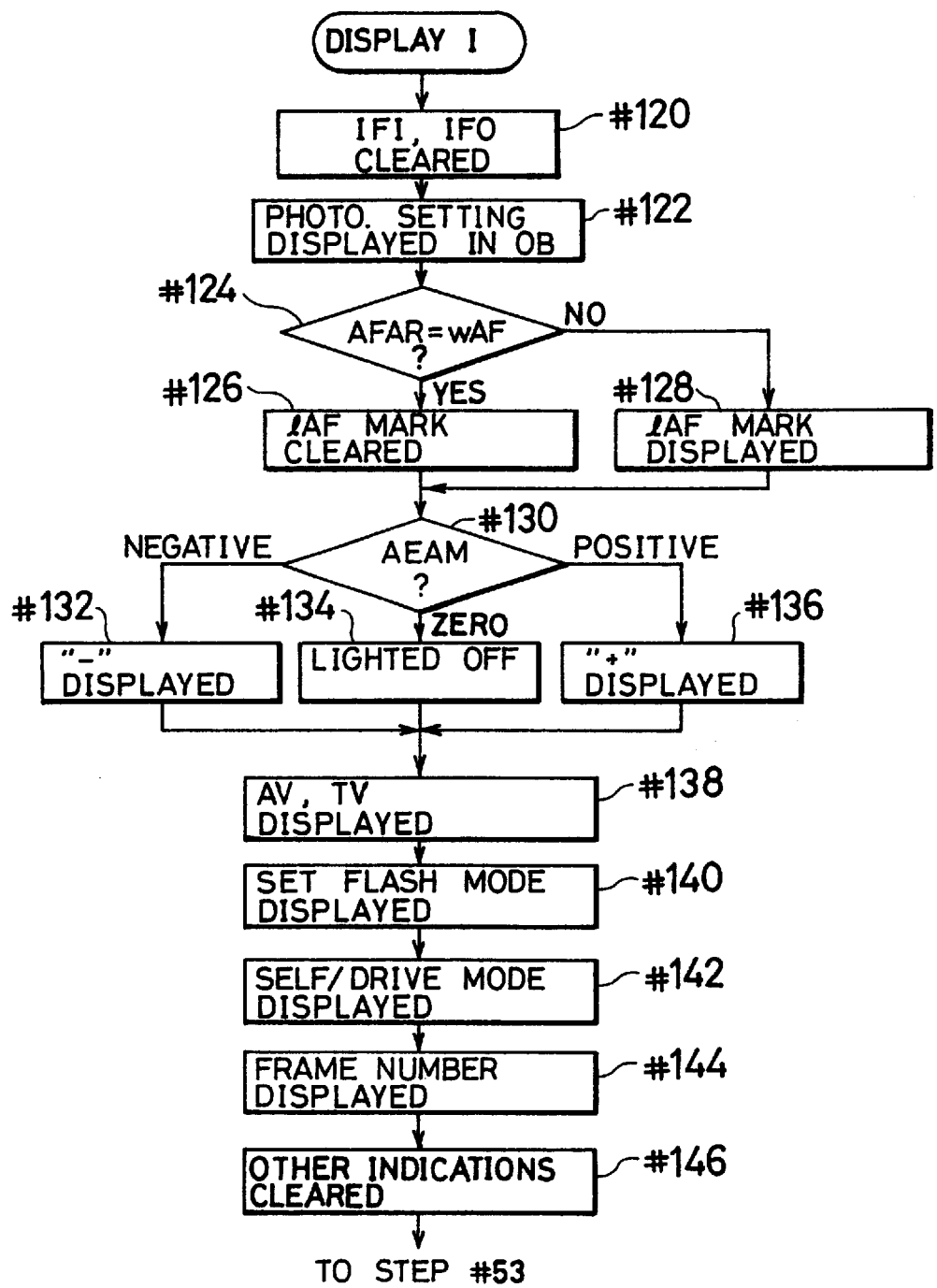

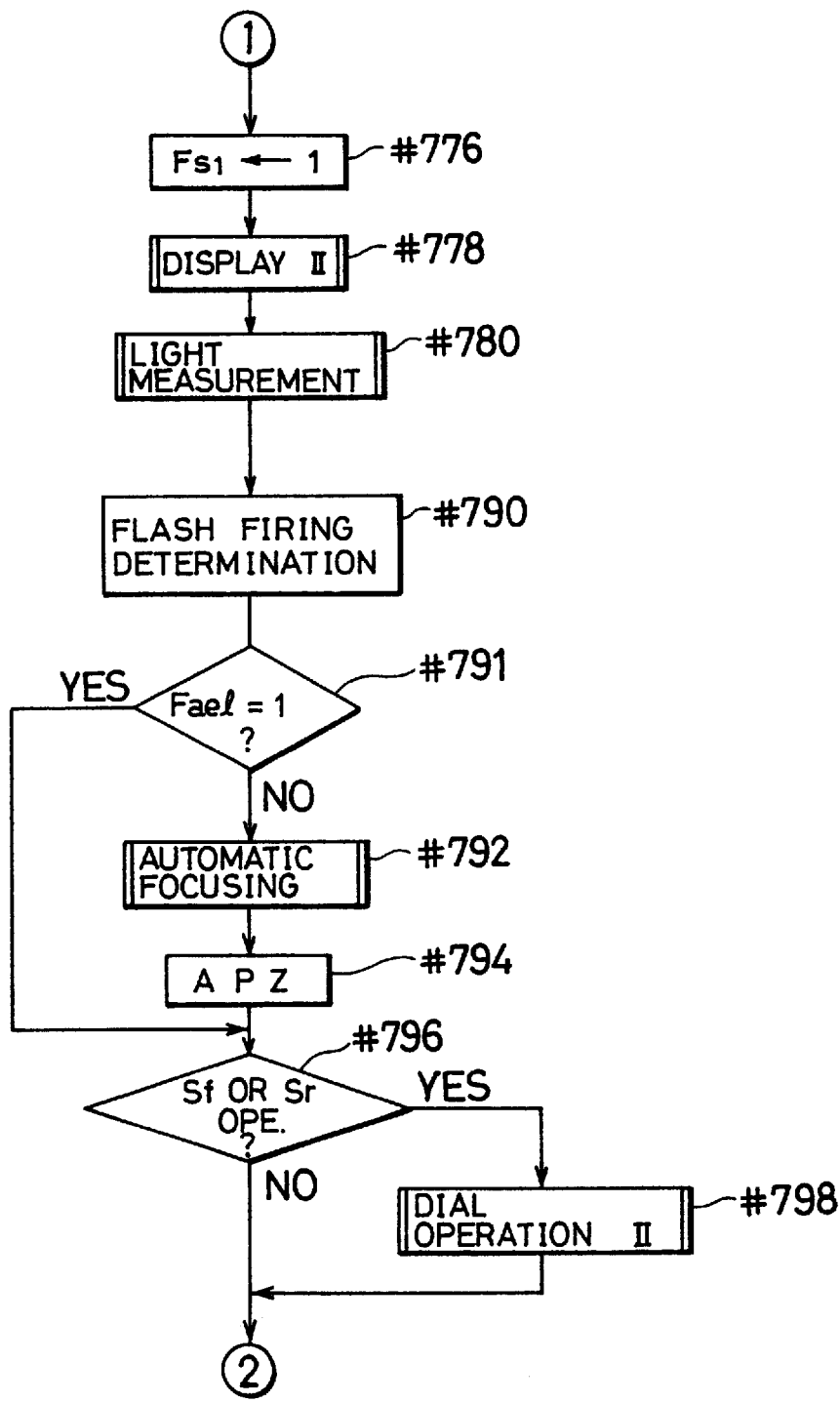

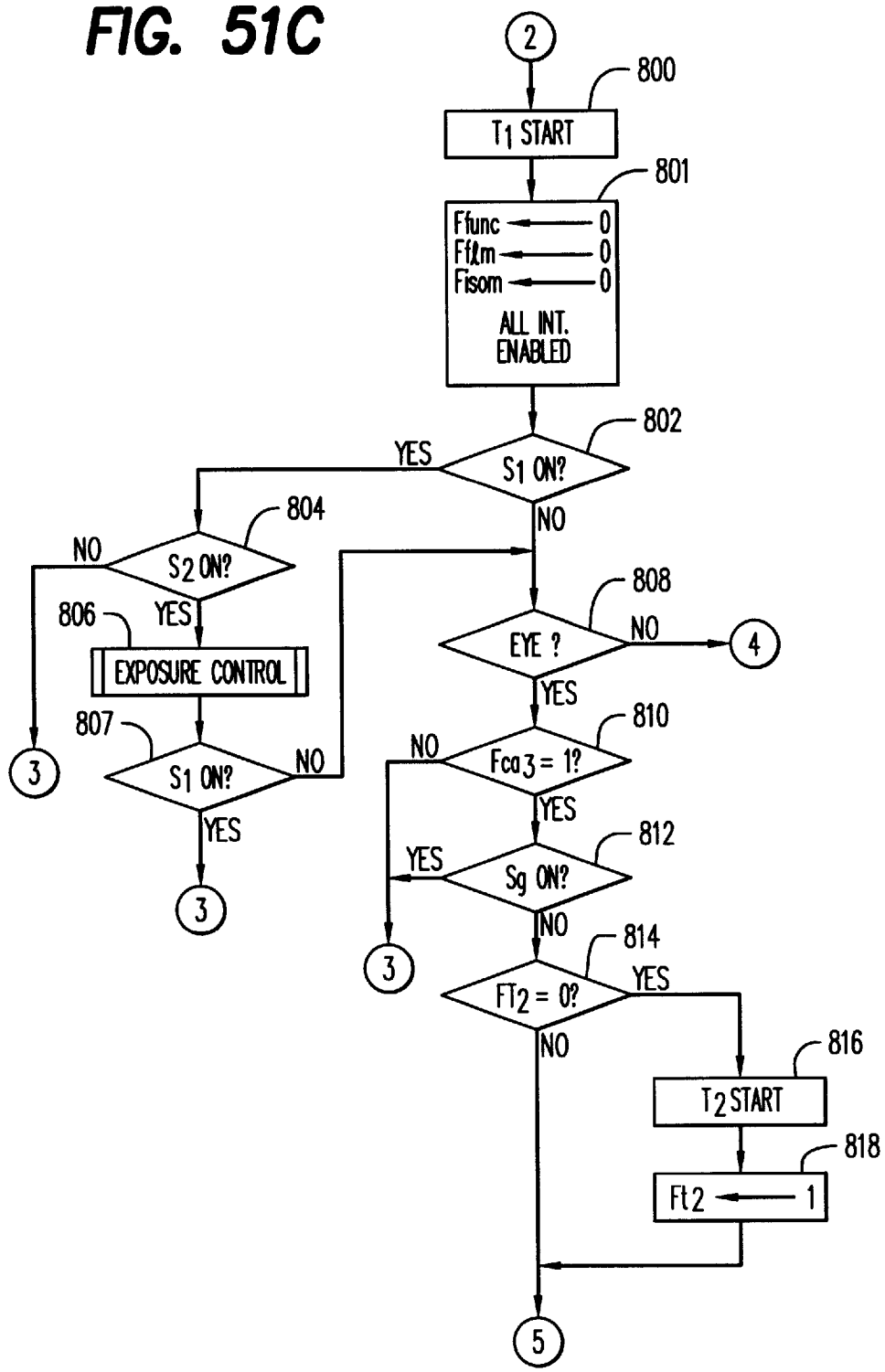

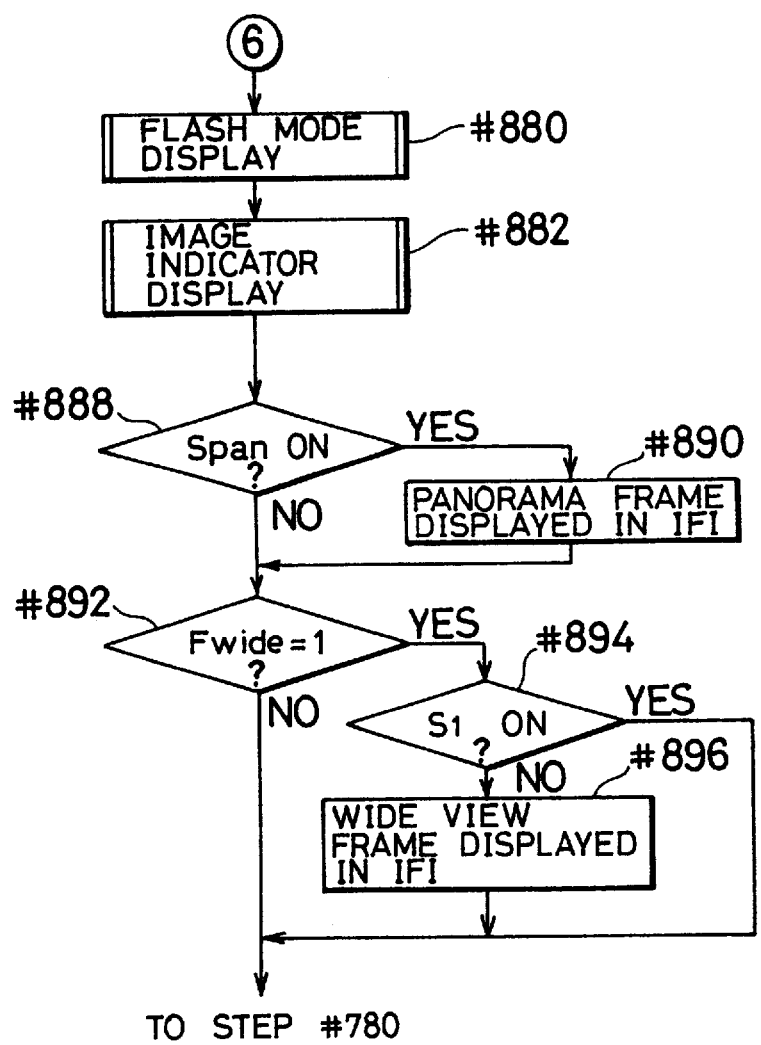

FIG. 64A
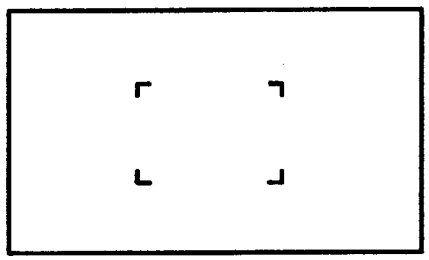
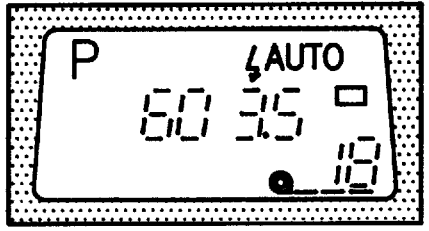
FIG. 64B
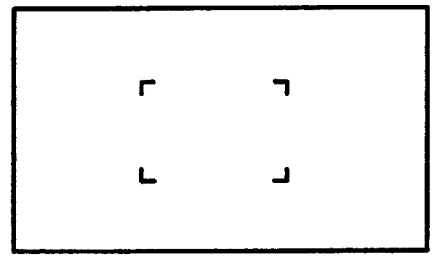
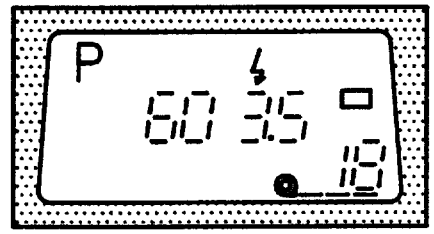

FIG. 65A
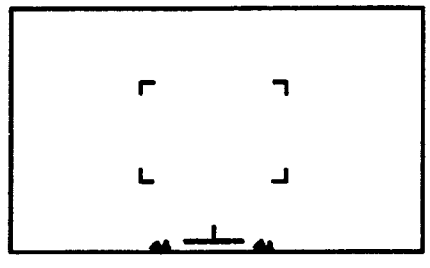
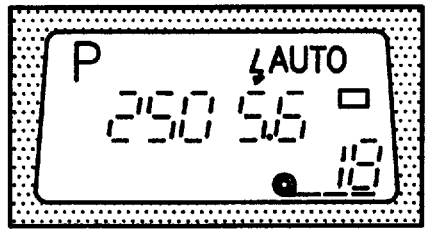
FIG. 65B
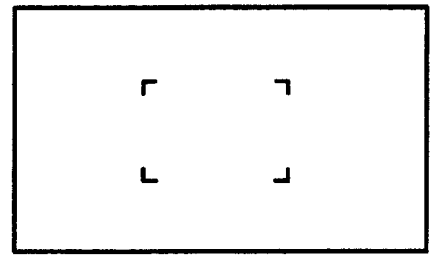
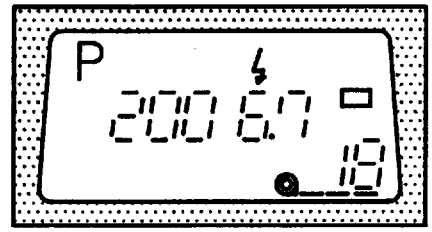

FIG. 68A
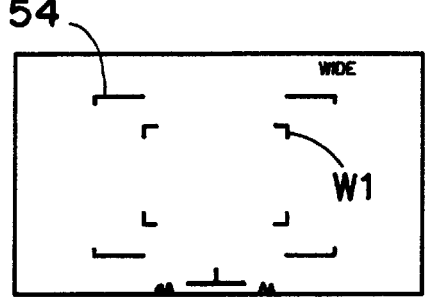
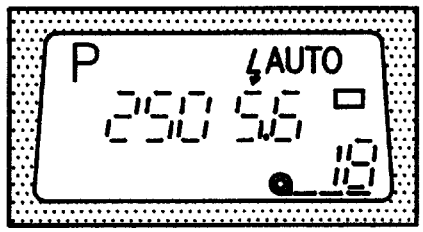
FIG. 68B
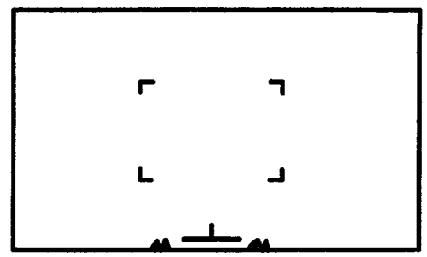
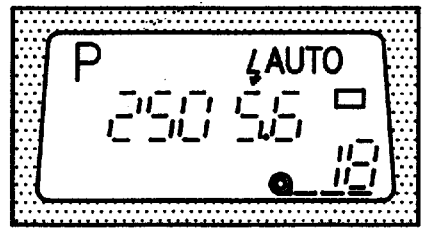
FIG. 69A
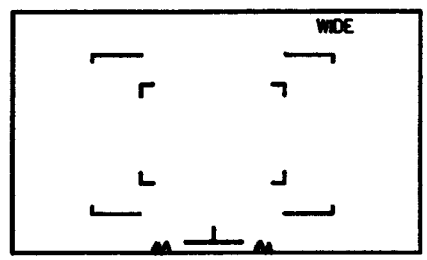
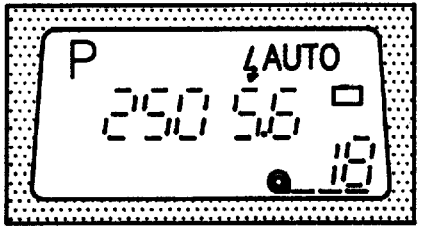
FIG. 69B
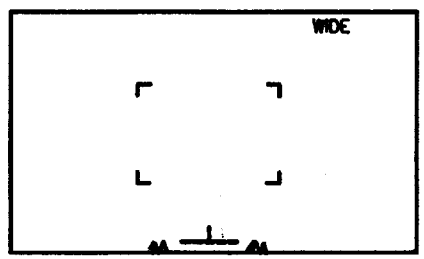
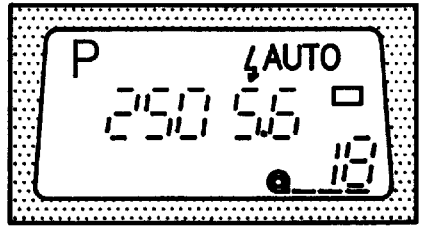

CAMERA

This application is a divisional of application Ser. No. 08/203,643, filed Mar. 1, 1994, now U.S. Pat. No. 5,550,611, which is a continuation of application Ser. No. 07/889,605, filed May 27, 1992.

BACKGROUND OF THE INVENTION AND RELATED ART STATEMENTS

This invention relates to a camera capable of selectively setting various photographing conditions such as designated states of an exposure mode, distance metering area and light metering area and, more particularly to a camera capable of setting and changing initial values of the photographing conditions to which the set photographing conditions are returnable.

In order to meet a wide range of demands from camera operators, cameras have been recently constructed such that various photographing conditions are selectively settable. These cameras allows the operators to obtain final pictures providing a variety of visual effects. Taking an exposure mode as an example, an aperture priority mode, shutter speed priority mode, manual mode, program mode or other mode is settable according to purposes. These photographing conditions are set by manipulating respective operable members. Contrary to the demands requiring more sophisticated functions in cameras, there are not a few cases where the operators desire or prefer a photographing operation under standard photographing conditions. In consideration of cumbersomeness to return the photographing conditions to initial values (standard photographing conditions) by operating the operable members in these cases, there has been proposed a camera provided with a single operable member operated to return all the photographing conditions to the initial values at the same time. More specifically, contents which are assumed to be standard photographing conditions under the normal photographing operation are stored as initial values in storage means provided in the camera, and the various photographing conditions are returned to the respective initial values by operating the single member. Regarding the exposure mode, for instance, the program mode is set as an initial exposure mode in many cases.

The above cameras have a set of initial values to which the respective photographing conditions are returned. However, there are quite a few cases where there exist more or less discrepancies between the set initial values and desired initial values for some operators. Although the program mode is set as an initial exposure mode in many cases as described above, some operators desire to have a manual mode as an initial exposure mode. The same thing can be said about the other photographing conditions. These operators have to return the photographing condition to the initial value and set a desired photographing condition therefrom. In view of the above, it is hard to say that the above cameras have overcome the problem of cumbersomeness.

Further, the operator encounters the following problem in the case where the initial photographing conditions the operator desires differ from the initial photographing conditions inherently set in the camera, and the operator wants to change the presently set photographing condition to his/her desired one. In this case, the operator is compelled to think about which is a faster way to set the desired photographing condition, to operate the operable member in a reverse direction or to return the photographing condition to the set initial value and set the desired one thereafter. Accordingly, the above cameras present the problem in terms of operability thereof.

SUMMARY OF THE INVENTION

It is an object of the invention to provide a camera capable of setting and changing initial values of photographing conditions to the ones an operator desires, thereby improving operability thereof.

A camera of the present invention comprising operation means having a plurality of operation modes for executing an operation, mode changing means for changing over operation modes, designation means for designating a desired operation mode as an initial mode, and reset means for resetting the operation means to the designated initial mode.

According to the present invention, also, a camera may be comprised of first operation means having a plurality of operation modes for executing a first operation, second operation means having a plurality of operation modes for executing a second operation, first mode changing means for changing over operation modes of the first operation means, second mode changing means for changing over operation modes of the second operation means, designation means for designating desired operation modes of the first and second operation means as their respective initial modes, and reset means for resetting both the first operation means and the second operation means to their respective designated initial modes.

According to the present invention, further, a camera may be comprised of storage means for storing data for use in control operation of the camera, the data including a plurality of data units, control means for executing the control operation based on the data, changing means for changing the data, designation means for designating desired data unit of the data as its initial data unit, and reset means for resetting the data to the designated initial data unit.

According to the present invention, further, a camera may be comprised of first storage means for storing first information in connection with a first operation of the camera, the first information including a plurality of information units, first operation means for executing the first operation based on the first information, first changing means for changing the first information stored in the first storage means, second storage means for storing second information in connection with a second operation of the camera, the second information including a plurality of information units, second operation means for executing the second operation based on the second information, second changing means for changing the second information stored in the second storage means, designation means for designating desired information units of the first and second information as their respective initial information units, and reset means for resetting the first and second information stored in the first and second storage means to their respective designated initial information units.

These and other objects, features and advantages of the present invention will become more apparent upon a reading of the following detailed description and accompanying drawings.

BRIEF DESCRIPTION OF THE DRAWINGS

FIGS. 10A, 10B and 10C are diagrams showing a mounted state of the masking unit, FIG. 10A being a diagram in section viewed from above, 10B being a diagram viewed from a direction A shown in FIGS. 10A, and 10C being a diagram showing the panorama switch Span viewed from a direction B shown in FIG. 10B;

FIG. 17 is a flow chart showing a "Dial Operation Routine I";

FIG. 18 is a flow chart showing a "Display Routine I";

FIGS. 51A, 51B, 51C and 51D are flow charts showing "S1-ON Interrupt Routine," "Tca3 Interrupt Routine" and "AE Lock Interrupt Routine";

FIGS. 52A and 52B are flow charts showing a "Display Routine II";

FIGS. 64A and 64B are diagrams showing displayed states of the respective display units in the "Display Routine II";

FIGS. 65A and 65B are diagrams showing displayed states of the respective display units in the "Display Routine I," FIG. 65A showing a state where the flash firing is not required while FIG. 65B showing a state obtainable when a flash pop-up button is turned on in the state shown in FIG. 65A;

FIGS. 68A and 68B are diagrams showing displayed states of the respective display units, FIG. 68A showing the displayed state where a wide view mode is set while FIG. 68B showing the displayed state where a normal view mode is set; and FIGS. 69A and 69B are diagrams showing displayed states of the respective display units which are switched according to the state of a switch S1.

DETAILED DESCRIPTION OF PREFERRED EMBODIMENTS OF THE INVENTION

FIGS. 2A, 2B, 2C and 2D are diagrams showing a camera embodying the invention viewed from above, left, front, and behind respectively.

Figure 4A:
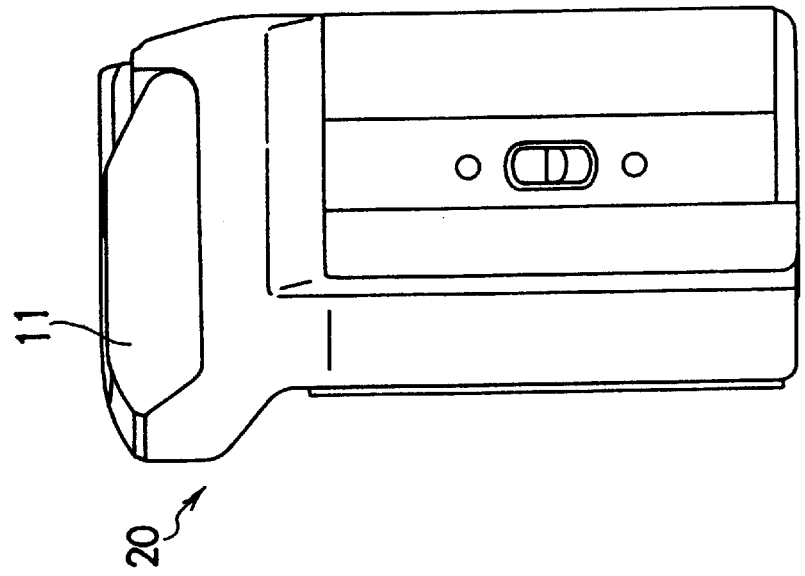
FIGS. 4A and 4B are respectively side view of the camera, FIG. 4A showing a built-in flash device in an accommodated position while FIG. 4B showing the same in a pop-up position.
Figure 4B:
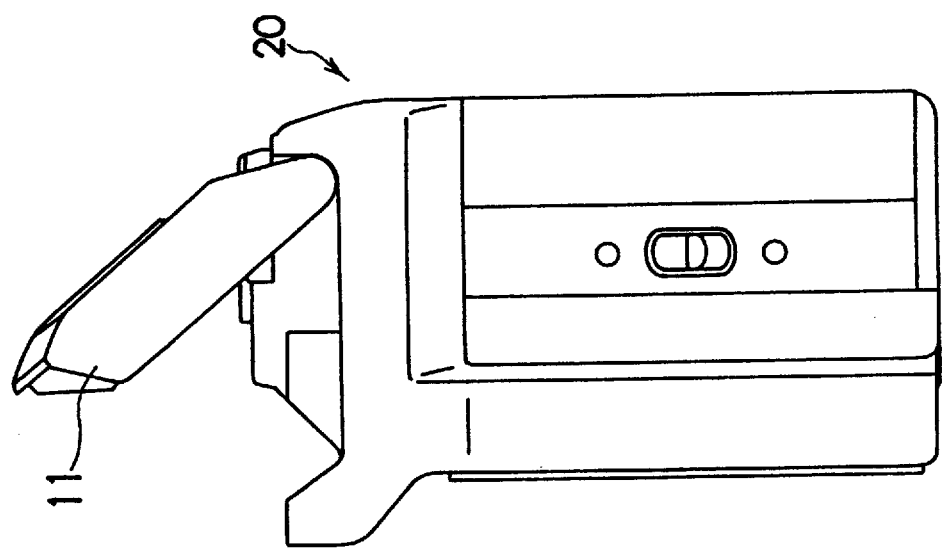

In these figures, a main body 20 of the camera is provided with a taking lens unit 21 (which may be an interchangeable lens) substantially in a center portion of a front face thereof and a built-in flash device 11 at a top thereof. The taking lens unit 21 includes a zoomable taking lens. The built-in flash device 11 is normally accommodated within the camera main body 20 as shown in FIG. 4A. Upon depression of a flash pop-up button Sflup, a stopper is retracted by an actuator 8 (see FIG. 1), whereupon the flash device 11 is caused to pop up by, for example, a spring (see FIG. 4B) and emits a flash of light in a frontward direction therefrom. The arrangement for the flash device 11 may be such that the flash device 11 is popped up and returned from and to an accommodated position within the main body 20 by operating an actuator.

On a rear face of the camera main body 20 are provided a viewfinder 20 having an eye cup 221 disposed therearound. Transparent liquid crystal display (LCD) panels having patterned segments formed therein each are provided on an optical path along which a portion of light representing a subject image and incident through the taking lens unit 21 is introduced to a viewfinder unit. With the use of these LCD panels, desired information, i.e. indicators, can be displayed within and outside a picture frame on a viewfinder screen in accordance with display control signals indicative of operating states of the camera. The LCD panels each constitute two display units; an in-frame display unit IFI and an out-of-frame display unit IFO. The in-frame display unit IFI displays the indicators within the picture frame on the viewfinder screen in superimposition with an image to be photographed. On the other hand, the out-of-frame display unit IFO displays the indicators outside the picture frame on the viewfinder screen. Further, in a proper position on an upper face of the camera main body 20 is provided an on-body display unit OB shown in FIG. 6 including a LCD panel having patterned segments formed therein. The on-body display unit OB allows a camera operator to confirm the operating states of the camera without looking through the viewfinder 22.

Next, there will be described operable members provided on the camera main body 20 such as switches and buttons.

Besides the flash pop-up button Sflup, a grip switch Sg is provided on the front face of the main body 20 in a position that the operator is most likely to hold in taking pictures. On the top face of the main body 20 are provided a main switch Sm, program set button Sp, release button 24, card button Scard, view size changeover switch Swide, front control dial Sf, and rear control dial Sr. A switch S1 is turned on when the release button 24 is pressed halfway. whereas a switch S2 is turned on when the release button 24 is pressed all the way. The card switch Scard is turned on when a function expansion card is mounted to the camera. The view size changeover switch Swide is adapted for setting an image area on the viewfinder screen changeably between a normal view and a wide-view. Further, on the rear face of the main body 20 are provided an automatic exposure (AE) lock button Sael and function button Sfunc for allowing viewfinder indicators (indicators displayed on the viewfinder screen) for various functions to be selectively displayed.

Figure 3:
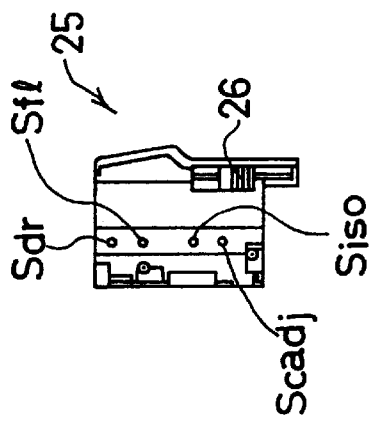
FIG. 3 is a diagram showing a construction of an interior of a card holder.
Figure 2A:
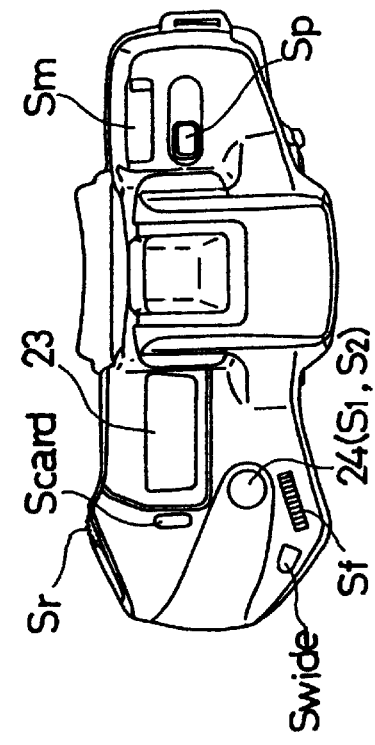
FIGS. 2A, 2B, 2C and 2D are diagrams showing the camera viewed from above, left, front, and behind respectively.
Figure 2D:
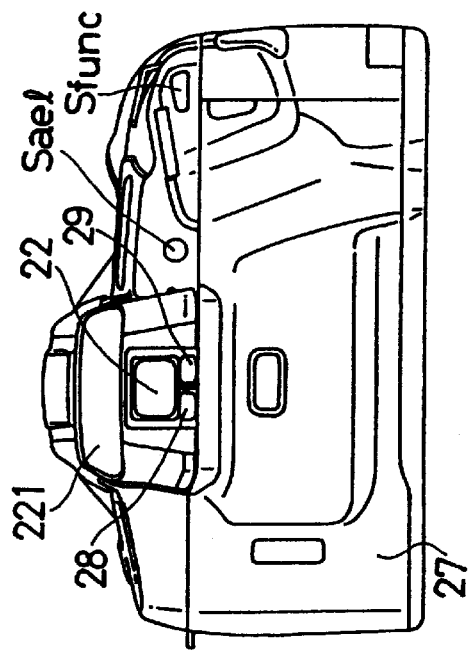
Figure 2C:
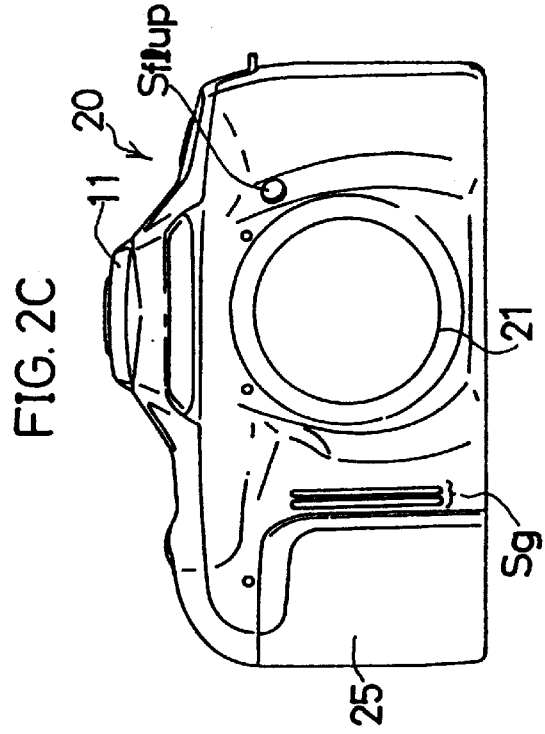
Figure 2B:
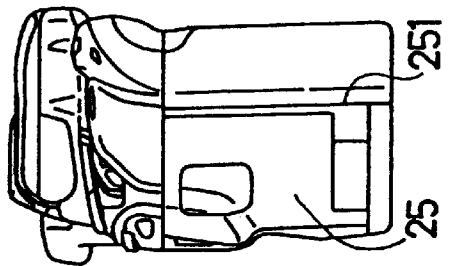

In a front right portion of the main body 20, a card holder 25 is formed openably and closably by rotating about an upright support shaft 251. Inside the card holder 25 are provided a construction shown in FIG. 3. More specifically, an unillustrated card slit extending in a direction parallel to the drawing of FIG. 3 is formed inside the card holder 25. A function expansion card is insertable to the card slit from above. The inserted card is ejectable by sliding a card eject switch 26 upward.

Further, there are provided a plurality of buttons inside the card holder 25 as shown in FIG. 3. These buttons are; a self-timer/drive mode button Sdr, flash mode button Sfl, film speed button Siso and card adjustment button Scadj from above. Though unillustrated in FIG. 3, there are also provided a flash switch Sflup1, back cover switch Sb, and panorama switch Span. The switch Sflup1 is in the OFF state when the built-in flash device 11 is in the accommodated state while in the ON state when it is in the pop-up state. The back cover switch Sb detects an opened state of a back cover 27. The panorama switch Span indicates that a panoramic photography mode is set.

The switches and buttons described above are connected to the CPU 1 as shown in FIG. 1.

Near and below the viewfinder 22 is provided eye sensor 6 including a light emitter 28 designed to emit light to the rearward and a light receiver 29. The light emitter and light receiver 28, 29 are used for detecting the presence or absence of the operator looking through the viewfinder 22, i.e. the presence or absence of an eye. The detection is made in the following way. The light emitted periodically from the light emitter 28 is reflected by a part of the operator's face, and the reflected light is received by the light receiver 29. The eye sensor 6 detects the presence of the operator looking through the viewfinder when the level of the light received by the light receiver 29 is above a predetermined level. It is preferable to use infrared light in the eye sensor 6 so as to prevent a maloperation.

Though unillustrated in the drawings, an off-camera flash device (wireless off-camera flash device) may be used if necessary. The off-camera flash device is designed to emit light upon receipt of a specified optical pulse signal from the camera main body 20.

Figure 1:
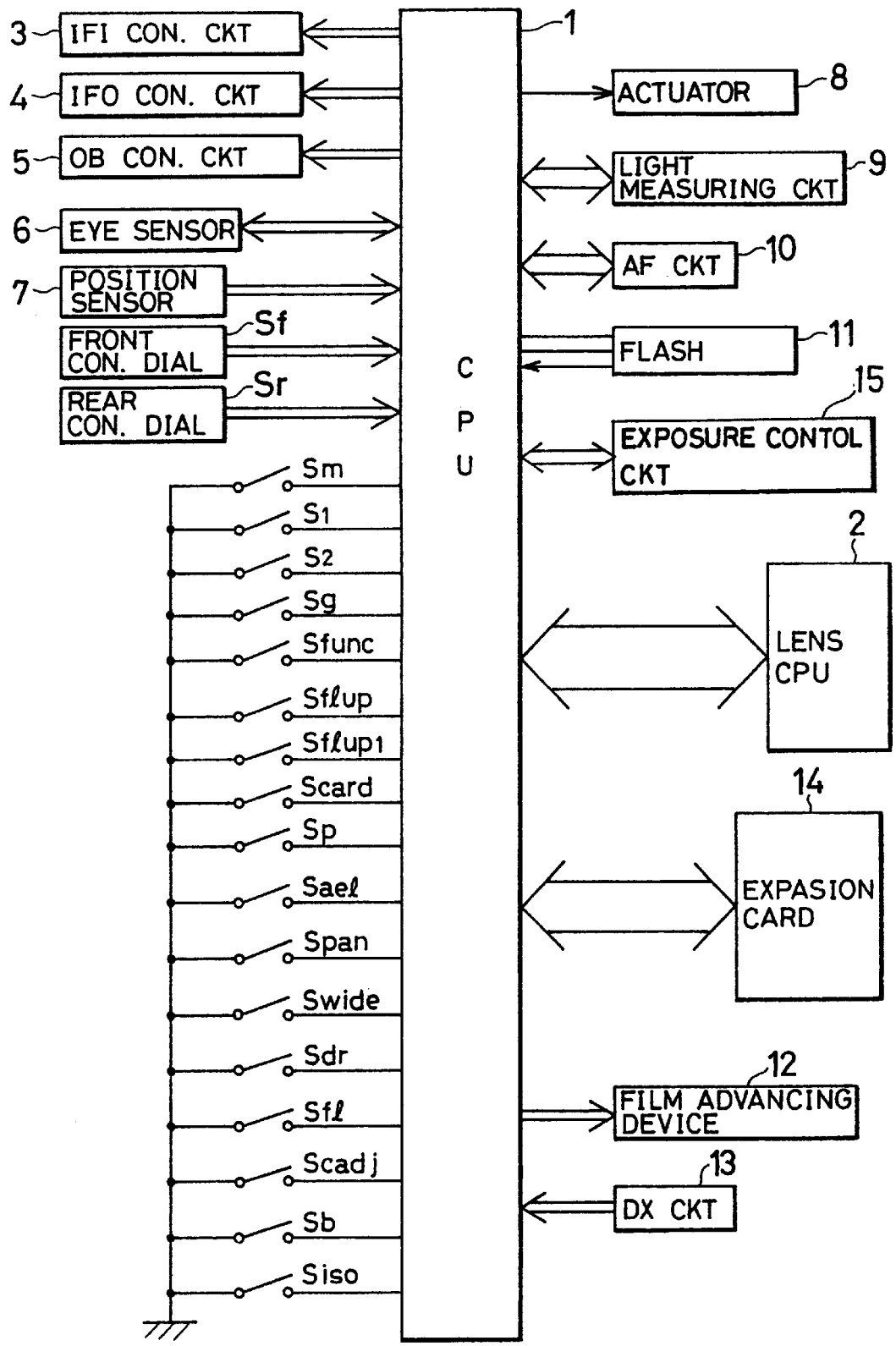
FIG. 1 is a block diagram showing a control system of a camera in accordance with the invention.

FIG. 1 is a block diagram showing a control system of the camera in accordance with invention.

The CPU 1 reads necessary data from peripheral circuits and centrally controls operations of the camera by sending control signals. The CPU 1 is internally provided with various flags, timers, and memories such as a read only memory (ROM) and a random access memory (RAM) for storing various programs to be executed and calculation results.

A lens CPU 2 is built in the taking lens unit 21, and controls the driving of the taking lens to attain an in-focus position and an automatic power zooming (APZ) in accordance with the distance to a subject so as to maintain a magnification at a specified value by communicating with the CPU 1 in the camera main body 20 according to needs. Further, the lens CPU 2 sends lens data inherent in the taking lens unit 21 including a fully open aperture value and a conversion factor used in converting the defocus amount into lens drive amount in accordance with requests from the CPU 1.

Designated at 3, 4 are an in-frame display control circuit and an out-of-frame display control circuit for controlling the display units IFI, IFO to display indicators to be described with reference to FIG. 5 respectively. These display circuits 3, 4 are hereinafter referred to as IFI display circuit and IFO display circuit. Designated at 5 is an on-body (OB) display circuit for controlling the on-body display unit OB to display indicators to be described with reference to FIG. 6. Designated at 6 is the eye sensor including the light emitter 28 and light receiver 29.

A vertical position sensor 7 detects that the camera is postured in a vertical position. In taking pictures, there are cases where it is preferable to hold the camera in the vertical position in relation to the subject. The sensor 7 detects the vertical posture of the camera so that a focus area to be described below can be automatically changed to a suitable one in these cases. The sensor 7 may, for example, carry out the detection using a T-shaped sealed tube provided inside the camera. The sealed tube has a specified amount of conductive liquid filled therein and electrodes (one of these is a common electrode) formed at three terminals. The sensor 7 detects the vertical posture of the camera by discriminating an electrode short-circuiting to the common electrode according to inclination of the camera. In place of the sensor 7, a posture sensor may be adopted which is capable of detecting a variety of postures of the camera by taking advantage of the gravitational force.

The front control dial Sf is provided at a front side of the upper face of the camera main body 20 for changing an exposure control, shutter speed and light metering area. The rear control dial Sr is provided at a rear side of the upper face of the camera main body 20 for changing an exposure mode, aperture value and focus area. Designated at Sm to Siso are switches and buttons described above.

The actuator 8 causes the stopper to retract so that the built-in flash device 11 pops up from the accommodated position within the camera main body 20. The actuator 8 is driven in response to depression of the flash pop-up button Sflup.

A light measuring circuit 9 measures the brightness of the subject by receiving a portion of light incident through the taking lens with specified light measurement devices. The arrangement of the light measurement devices is such that they can perform both spot metering and wide metering. The spot metering is to measure the subject brightness in a center portion of the subject, while the wide metering is to measure the subject brightness in one large portion of the subject.

Figure 5:
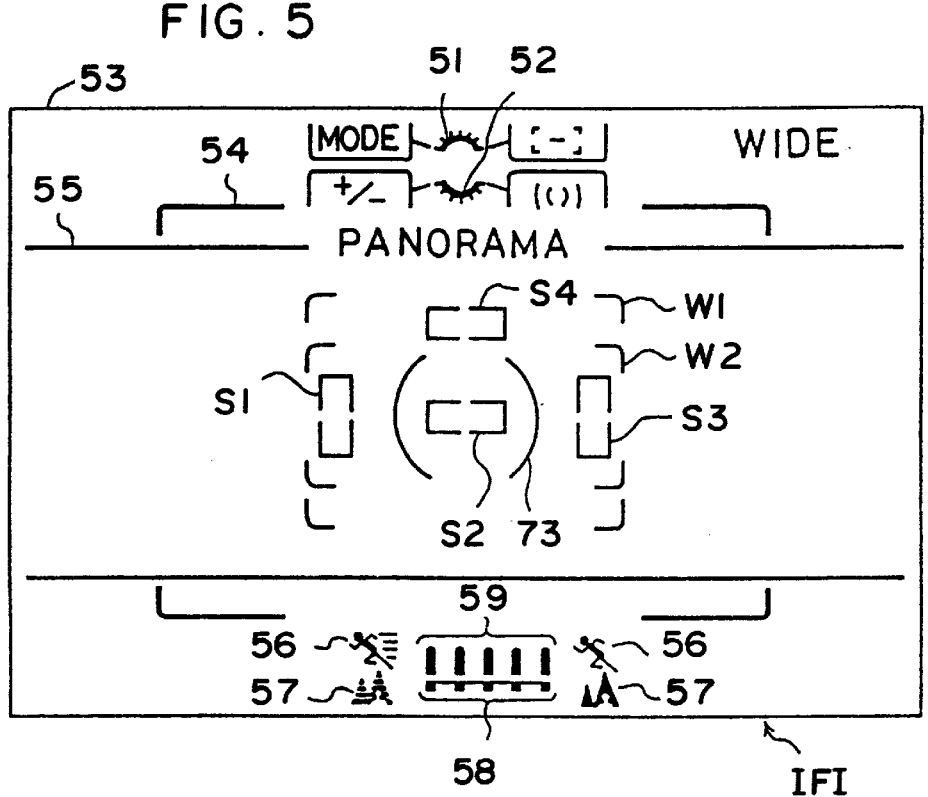
FIG. 5 is a diagram showing an in-frame display unit and an out-of-frame display unit together with indications displayed thereon.
Figure 6:
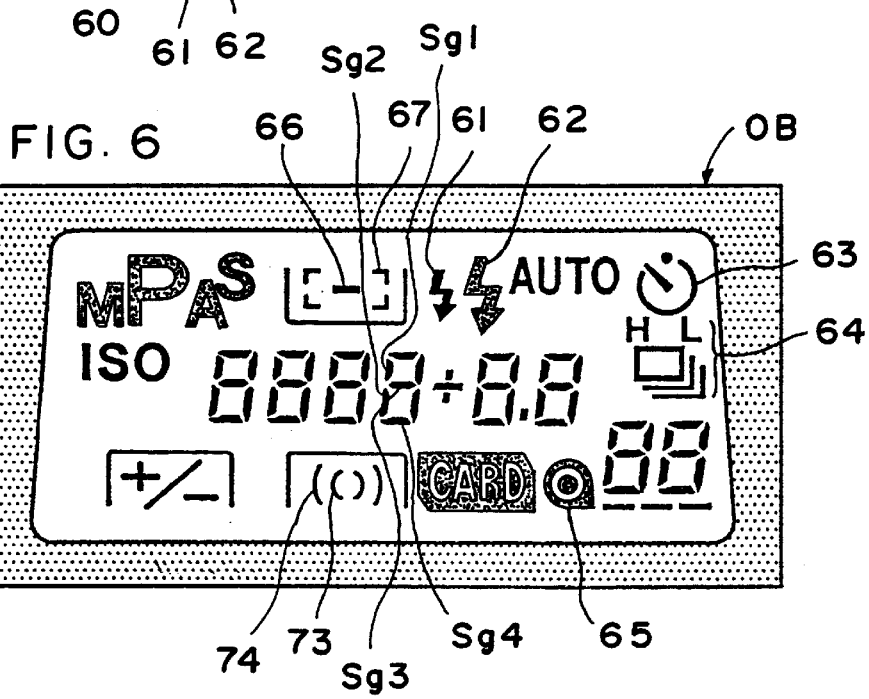
FIG. 6 is a diagram showing an on-body display unit together with indications displayed thereon.
Figure 7:
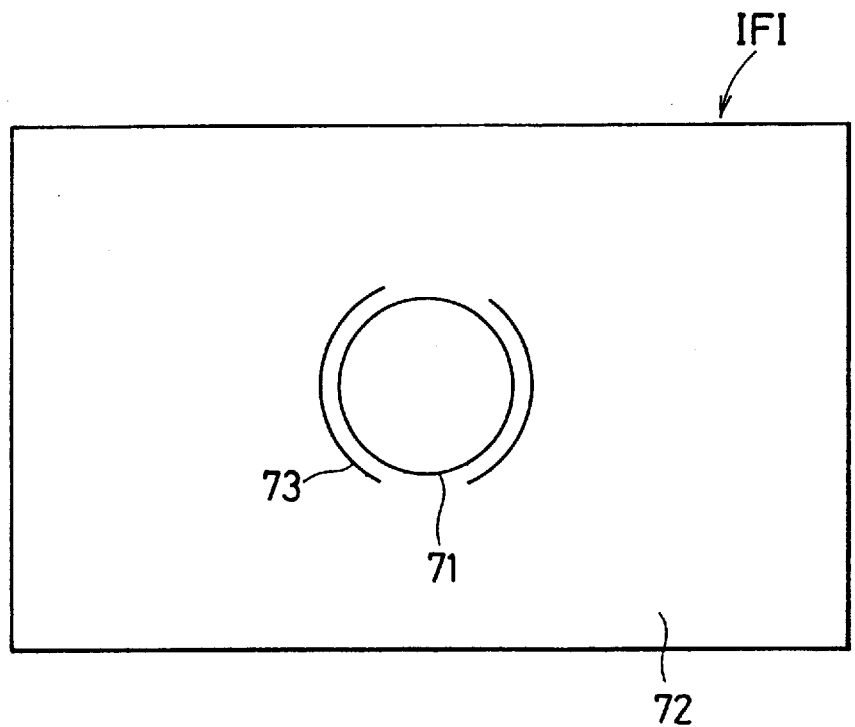
FIG. 7 is diagram showing marks indicative of light metering areas.

FIG. 7 is a diagram showing the light metering area, which is displayed in the in-frame display unit IFI on the viewfinder screen as shown in FIG. 5. Designated at 71 is a spot metering area, and at 72 a wide metering area. In the spot metering, the subject brightness is measured in a center portion of the subject covered by the spot metering area. In the wide metering, the subject brightness is measured in a peripheral portion of the subject around the spot metering area covered by the wide metering area. Designated at 73 is a mark indicating a spot metering coverage. The spot metering mark 73 is displayed in the in-frame display unit IFI by the IFI display control circuit 3. The spot metering mark 73 is also displayed in the on-body display unit OB by the on-body display control circuit 5 as shown in FIG. 6. In the wide metering, the subject brightness is measured with the use of both light metering areas 71, 72, and a wide metering mark 74 is displayed as shown in FIG. 6.

An automatic exposure circuit (AE circuit) 10 introduces the subject image transmitted through the taking lens to the distance measuring devices including a condenser lens, base section, and reference section, and calculates a defocus amount using a phase difference detection method. The CPU 1 sends a specified drive signal in accordance with the calculated defocus amount to the lens CPU 2, whereby the taking lens is driven to attain the in-focus condition. The distance measuring devices are disposed such that a local automatic focusing (AF) and a wide AF can be executed respectively. The local and wide AFs refer to measurement of the distance to the subject executed in a local AF area and a wide AF area. The wide AF includes a horizontal wide AF and a vertical wide AF. There are provided four local AF areas within the picture frame, and distance measurement is executed in any of the four local AF areas.

In FIG. 5, designated at L1 to L4 are marks indicative of the respective local AF areas. One of the marks L1 to L4 corresponding to the selected local AF area is displayed on the viewfinder screen. Designated at W1, W2 are respectively marks indicative of a horizontal wide AF area and a vertical wide AF area. The marks W1, W2 are displayed on the viewfinder screen respectively with the camera positioned horizontally and vertically in the case where the wide AF is selected. In the horizontal wide AF, the subject distance is measured using all the four local AF areas indicated by L1 to L4. On the contrary, in the vertical wide AF, the subject distance is measured using the three local AF areas indicated by L1 to L3. The set AF is also displayed on the on-body display unit OB as shown in FIG. 6. More specifically, a local AF mark 66 is lighted when the local AF is selected, while a wide AF mark 67 is lighted when the wide AF is selected.

A film advancing device 12 advances a film by one frame each time an exposure operation is completed to prepare for a next exposure operation. A film sensitivity reader circuit (DX circuit) 13 reads the sensitivity of the film loaded within the camera main body 20 electrically, magnetically, or optically by discriminating an identification mark provided in a specified position on an outer face of a film cartridge.

A function expansion card 14 is a card such as an integrated circuit (IC) card having photography conditions which provide various visual effects in a final picture written in an internal ROM. By loading the function expansion card 14 in the card holder 25 of the main body 20, contents of the card 14 are read and a photographing operation is made executable under the read photographing conditions. There are available a variety of function expansion cards such as a customized card. In the customized card are written initial values for various parameters of the camera which serve as basic photographing conditions. By loading the customized card in the card holder 25, reading and changing of the initial values are permitted. The changed initial values can be rewritten in the customized card.

An exposure control circuit 15 is adapted for executing exposure control of the camera in accordance with calculated shutter speed TV and aperture value AV.

Next, there will be described marks and indicators displayed on the in-frame and out-of-frame display units IFI, IFO and on-body display unit OB with reference to FIGS. 5 and 6.

In the in-frame display unit IFI, indicator 51, 52 at an upper center represent the front control dial Sf and rear control dial Sr respectively. The indicator 51, 52 are displayed to indicate that the front control dial Sf is manipulated to change the exposure mode and AF area and that the rear control dial Sr is manipulated to change an exposure adjustment amount and light metering area.

Designated at 53 is a frame indicative of a picture frame. The subject image falling within the picture frame (normal view frame) 53 on the viewfinder screen is to be photographed under a normal photographing operation. Designated at 54 is a wide view frame displayed when a wide view flag Fwide described later is set to 1. Together with the wide view frame 54, an indication "WIDE" is displayed in a right upper portion within the picture frame 53. The taking lens is driven toward a wide-angle limit by a specified amount so as to cause the subject image to be photographed to fall within the wide view frame 54. With the wide view frame 54, the operator is allowed to easily confirm a state of a peripheral region of the subject image to be photographed merely by looking through the viewfinder. The taking lens is returned to the in-focus position when the photographing operation is executed as will be described below.

Designated at 55 is a panorama frame which is displayed when a panorama adapter to be described below is attached to the camera main body 20. The panoramic photography mode is set when the operator desires to obtain a panorama picture; a picture printed long sideways. A construction for a panoramic photography will be described in detail with reference to FIGS. 8 to 10.

Designated at 56 is an action indicator which is displayed to inform the operator of an active state of a main subject image in the final picture. The action indicator 56 displays the levels of the active state (action levels) of the main subject image the final picture will provide, from the level at which the main subject image is totally still to the one at which the main subject image is rapidly moving. More specifically, speeds of the main subject along an optical axis and over a plane normal to the optical axis are calculated by measuring the subject distance at least twice. The action level is set based on relationship between these speeds and a shutter speed, and then the photographing operation is executed. The arrangement may be made such that the operator is allowed to set a desired action level using the action indicator 56.

Designated at 57 is a background unsharpness indicator which is displayed to inform the operator of how much the main subject image stands out of a background subject image, i.e. how unsharp the background subject image, in the final picture. The background unsharpness indicator 57 displays the levels of unsharpness of the background subject image relative to the main subject image the final picture will provide, from the level at which the background subject image is totally unsharp to the one at which both the main subject image and background subject image are focused. More specifically, the distance to the main subject (main subject distance) and the distance to the background subject (background distance) are detected using the corresponding AF areas. The background unsharpness level is set based on relationship between a ratio of the main subject distance to the background distance and depth of field, and then photographing operation is executed.

In this embodiment, there are provided five action levels and five background unsharpness levels. Designated at 58 is a level coordinate, and at 59 indices for indicating the level of visual effects (action level and background unsharpness level). One of the indices 59 corresponding to the set visual effect level is displayed. It should be appreciated that the level coordinate 58 and indices 59 are shared by the action and background unsharpness indicators 56, 57.

Since already described above, description on the AF area and light metering area will be omitted here.

In the out-of-frame display unit IFO, designated at 60 is a flash-on indicator, and at 61, 62 indicators displayed when charging of the flash device 11 is completed. The indicators 61, 62 indicates a flash mode in combination or by their displayed states. The indicator 61 indicates preliminary flash firing, whereas the indicator 62 indicates completion of the charging of the flash device 11.

Display segments "PAS" is an exposure mode indicator. When a program mode is set, "P" is displayed. When an aperture priority mode is set, "A" is displayed. When a shutter speed priority mode is set, "S" is displayed. When a manual mode is set, none of "PAS" is displayed. Four digits of display segments right of the display segment "PAS" in the drawing of FIG. 5 are adapted for displaying a shutter speed (hereinafter referred to as SS segment unit). Two digits of display segments to the right of the SS segment unit are adapted for displaying an aperture value (hereinafter referred to as AV segment unit). Arranged between the SS segment unit and AV segment unit is an exposure adjustment indicator wherein: "+" is displayed when an exposure adjustment value is positive while "−" being displayed when negative. A mark "AEL" indicates that the exposure value is being fixed.

In the on-body display unit OB, a display segment "M" indicates that the manual exposure mode is selected. A mark "AUTO" on the right of the charging completion indicator 62 are displayed when an automatic flash mode is selected. Designated at 63 is a self-timer indicator displayed when a self-timer is used, at 64 a film drive mode indicator for indicating which drive mode is set, a single drive mode or continuous drive mode. The single drive mode is set when only a rectangular display segment is displayed and, otherwise, the continuous drive mode is set. Further, in the continuous drive mode, a display segment "H" is displayed when the film is driven at high speeds while a display segment "L" is displayed when the film is driven at low speeds. A mark "ISO" is displayed to show that numerals displayed in the SS segment unit is a value of the ISO film speed. A mark "CARD" is displayed when a control is executed according to the function expansion card mounted to the camera main body 20. Designated at 65 is a film loading indicator in which the number of frames of film already used is indicated in one or two digits.

Figure 8:
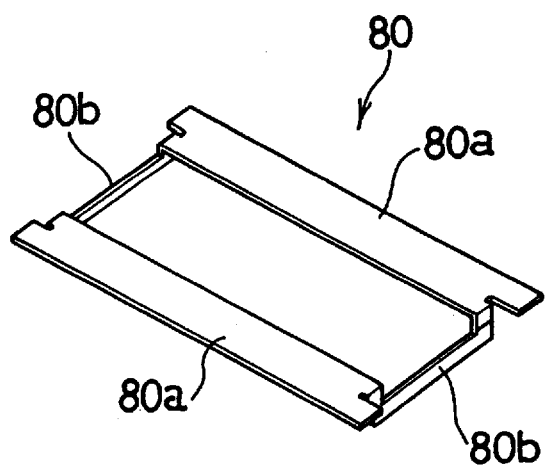
FIG. 8 is a perspective view of a masking unit to be used in a panoramic photographing operation.

Next, there will be described the construction for the panoramic photography with reference to FIGS. 8 to 10.

The panoramic photography is carried out when the photographed image is to be printed into a picture long sideways; a so-called panorama picture. An aspect ratio of the picture is, for example, set at 2:1. A masking unit 80 (panorama adaptor) shown in FIG. 8 is used to mask upper and lower portions of the image to be photographed so that the set aspect ratio is obtainable. The masking unit 80 has upper and lower masking members 80aa, 80ab, which are held with vertically space away from each other by such a distance as to set the aspect ratio of an image to be printed at, for example, 2:1. The masking unit 80 also has engaging members 80b, 80b which are engageable with the camera main body 20 in a manner to be described below.

Figure 9:
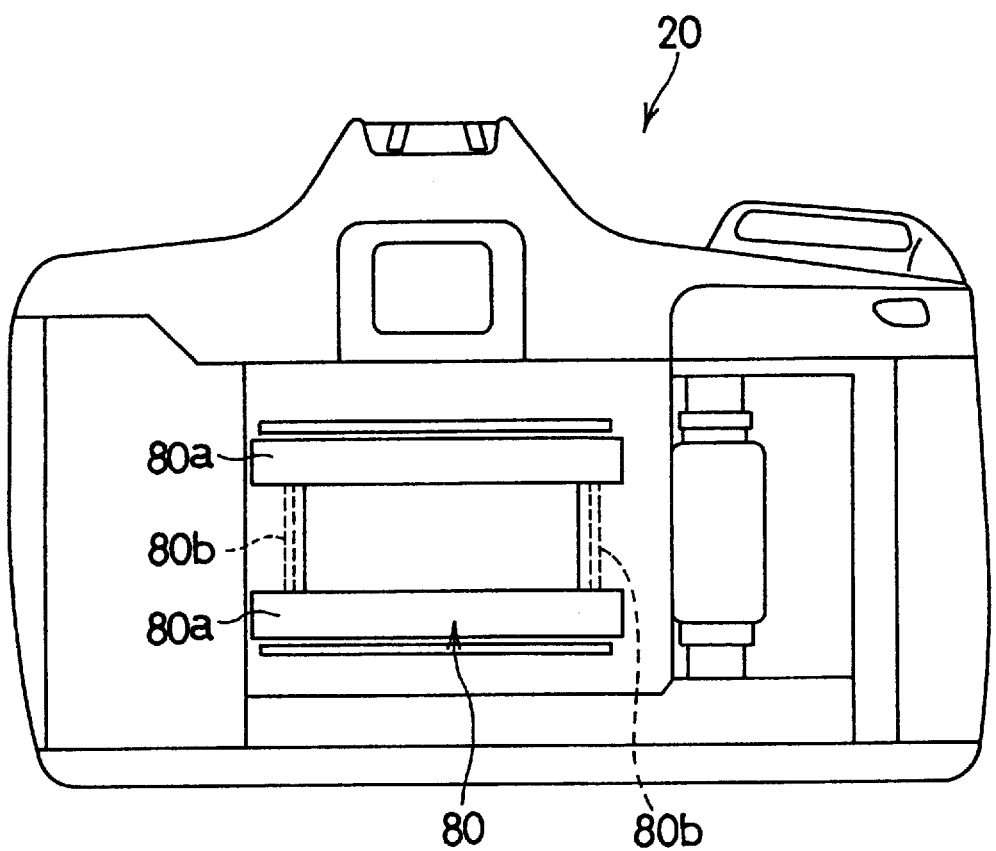
FIG. 9 is a diagram illustrating the camera from behind with a back cover open to show a state where the masking unit is mounted in a main body of the camera.

FIG. 9 is a rear view of the camera main body 20 with a back cover 27 open, showing a state where the masking unit 80 is mounted in the camera main body 20. As shown in FIG. 9, the masking unit 80 is disposed on the optical axis of the taking lens for masking specified upper and lower portions of the subject image transmitting through the taking lens by adjusting the upper and lower masking members 80aa, 80ab. Accordingly, the subject image long sideways is printed on an unillustrated film disposed behind the masking unit 80.

FIGS. 10A to 10C each show a mounted state of the masking unit 80, FIG. 10A being a diagram viewed from above, 10B being a diagram viewed from a direction A shown in FIG. 10A, and 10C being a diagram showing the panorama switch Span viewed from a direction B shown in FIG. 10B.

Designated at 20a is a frame constituting the camera main body 20. It will be appreciated that only one lateral portion of the camera is shown in these figures. Designated at 100 is a shutter device, and at 101 a film. A bent end portion of the engaging member 80b is engaged with an end 20b of the frame 20a, whereby the masking unit 80 is mounted to the camera main body 20 between the shutter device 100 and film 101. As shown in FIG. 10C, the panorama switch Span includes a fixed armature 102a and a movable armature 102b. A leading end of the movable armature 102b is bent at a right angle thereto, whereupon a contact member 102c is formed. The panorama switch Span is normally in the OFF state with the armatures 102a, 102b in contact with each other. When the masking unit 80 is mounted, the end of the engaging member 80b comes to contact with the contact member 102c, whereby moving the movable armature 102b away from the fixed armature 102a to turn on the switch Span. The masking unit 80, as shown in FIG. 10B, is fabricated such that upper and lower limits thereof substantially correspond with upper and lower limits of the picture frame 103.

Figure 11:
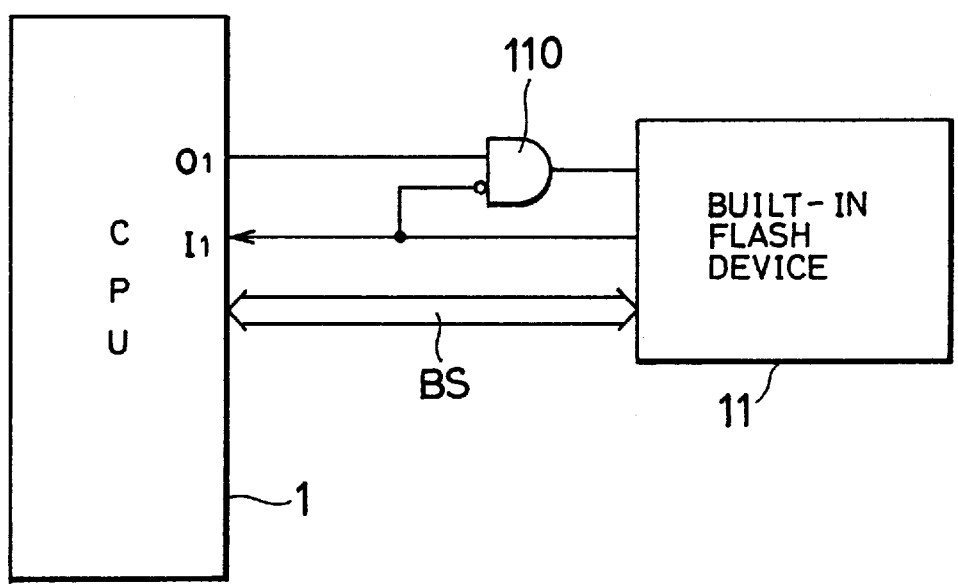
FIG. 11 is a circuit diagram showing a constructive connection between the built-in flash device and a CPU 1.

FIG. 11 is a circuit diagram showing connection between the built-in flash device 11 and CPU 1. Designated at 110 is an AND circuit. The CPU 1 and flash device 11 are connected with a control signal line BS. A charging control signal from an output port O1 of the CPU 1 is inputted to one input port of the AND circuit 110, while a charged state signal from the flash device 11 is inputted to the other input port thereof. The AND circuit 110 outputs the charging control signal from an output port thereof to the flash device 11.

Hereafter, the charging of the flash device 11 will be described. First of all, the CPU 1 sends a high level (H-level) charging control signal from the output port O1 to cause the flash device 11 to start charging. While remaining to be charged with electric energy, the flash device 11 sends a low level (L-level) charged state signal, which is inputted to the AND circuit 110 to be inverted. The AND circuit 110 outputs an H-level charged state signal to the CPU 1. The flash device 11 is charged while receiving the H-level charging control signal from the CPU 1. Upon charged with a specified amount of electric energy, the flash device 11 sends the H-level charged state signal (charging completion signal) to the AND circuit 110, which inverts the received signal and outputs the L-level charged state signal to the CPU 1. Thereupon, the charging of the flash device 11 is stopped. It will be appreciated that the charging control signal is used to control the firing of the flash device 11.

Next, operations of the camera in accordance with the invention will be described with reference to flow charts shown in FIGS. 12A to 65.

Before description is made on operations of the camera, main registers and main flags to be used will be described here.

MD: A mode register MD has various exposure modes; P-mode, A-mode, S-mode, and M-mode, as contents thereof. It should be understood that: P-mode is a program mode wherein an aperture value AV and a shutter speed TV are calculated from an obtained exposure value in accordance with a predetermined program line; A-mode is an aperture value priority mode wherein only the aperture value AV is manually settable; S-mode is a shutter speed priority mode wherein only the shutter speed TV is manually settable; and M-mode is a manual mode wherein both the aperture value AV and shutter value TV are manually settable.

MD1: A shift mode register MD1 has P-mode, PA-mode, and PS-mode as contents thereof. The PA-mode is a program mode wherein a new shutter speed TV is obtained when an aperture value AV is manually changed relative to photographing conditions determined by a program line. The new shutter speed TV, corresponding to the set aperture value AV, is obtained based on brightness of a subject when the aperture value is changed. Even if the brightness changes thereafter, only the shutter speed TV is changed. PS-mode is a program mode wherein a new aperture value AV is obtained when a shutter speed TV is manually changed relative to photographing conditions determined by a program line. The new aperture value AV, corresponding to the set shutter speed TV, is obtained based on brightness of a subject when the shutter speed is changed. Even if the brightness changes thereafter, only the aperture value AV is changed.

AFAR: An AF area register AFAR has W, L1, L2, L3, and L4 as contents thereof. W, L1, L2, L3, and L4 are indicative of the wide AF area, left, center, right and upper local AF areas respectively.

Fsp: A spot metering flag is indicative of the wide metering when set to 0 while indicative of the spot metering when set to 1.

Ffla: A flash mode flag Ffla is indicative of forcible flash mode when set to 0, automatic flash mode when set to 1, and wireless flash mode when set to 2. The forcible flash mode is a mode wherein the flash device 11 is forcibly fired in the pop-up state and is prohibited from firing in the accommodated state. The wireless flash mode is a mode wherein the flash firing photography is carried out with the use of an off-camera wireless flash device. Upon depression of the release button 24, an optical pulse signal is transmitted to the off-camera flash device, which in turn fires.

Fflm: A flash mode setting flag Fflm is indicative of a state where a flash mode has been set when set to 1, and another state where a flash mode has not been set when set to 0.

Fflp: A preliminary flash firing flag Fflp is indicative of unexecution of preliminary flash firing when set to 0, and execution thereof when set to 1. The preliminary flash firing is to fire the flash device preliminarily immediately before firing the flash device so as to make the opening of pupils of the subject smaller. In the case where the flash device is fired while the pupils of the subject being small, a so-called "red eye phenomenon" can be prevented from occurring.

Fflon: A flash firing flag Fflon is indicative of unexecution of the flash firing when set to 0, and execution thereof when set to 1.

Ffloff: A temporary prohibition flag Ffloff is indicative of prohibition of the flash firing for an immediately following photography operation when set to 1, and releasing from the prohibited state when set to 0.

Fim: An image indicator flag Fim is indicative of no display of image indicators when set to 0, and display thereof when set to 1.

Fwide: A wide view flag Fwide is indicative of a normal view mode when set to 0, and a wide view mode when set to 1.

Ffunc: A function flag Ffunc is indicative of a first function mode wherein the exposure mode and exposure adjustment amount are allowed to be changed when set to 0, and a second function mode wherein the AF area and light metering area are allowed to be changed when set to 1.

Ffuncm: A function mode flag Ffuncm is indicative of unexecution of the function mode when set to 0, and execution thereof when set to 1.

Fae: A brightness data flag Fae is indicative of a state where the brightness of the subject is not yet obtained when set to 0, and another state where it is already obtained when set to 1.

Fdr: A self/drive flag Fdr is indicative of the single drive mode when set to 1, self-timer drive mode when set to 2, high speed continuous drive mode when set to 3, and low speed continuous drive mode when set to 4.

Fael: An AE lock flag Fael indicates that a routine executed when the AE lock button Sael is turned on is being executed.

Fca1: A DX mode flag Fca1 is indicative of a first DX mode wherein the exposure adjustment amount is not stored when set to 1, and a second DX mode wherein it is stored when set to 2. However, in the case where a film having the same ISO speed with that of the previously loaded film is loaded, the exposure adjustment amount is unchaged.

Fca2: An automatic flash pop-up mode flag Fca2 is indicative of a mode wherein the flash device 11 is automatically popped up or fired when set to 1, and another mode wherein it is neither popped up nor fired when set to 2.

Fca3: An eye detection mode flag Fca3 is indicative of a first mode wherein the eye detection is carried out periodically each time the grip switch Sg is turned on when set to 1, and a second mode wherein it is carried out periodically regardless of the state of the switch Sg when set to 2.

Fisom: A flag Fisom is indicative of a state where a film speed ISO has been set when set to 1, and another state where a film speed ISO has not been set when set to 0.

Fc: A flag Fc is indicative of the DX mode when set to 1, automatic flash pop-up mode when set to 2, eye detection mode when set to 3, and initial value changeover mode when set to 0.

Fpan: A panorama flag Fpan is indicative of a normal photography mode when set to 0, and a panoramic photography mode (mounting of the masking unit 80 to the camera main body 20) when set to 1.

Fs1: An S1-ON flag Fs1 indicates that a routine executed when the switch S1 is turned on is being executed.

Fsm: An Sm setting mode flag Fsm is indicative of a state where the switch Sm is in ON-state just before the switch Sm is actuated when set to 1, and another state where the switch Sm is in OFF-state just before the switch Sm is actuated when set to 0.

Flags MDP, AFARP, and FspP are indicative of initial values of the mode register MD, AF area register AFAR, and spot metering flag Fsp respectively.

Figure 12A:
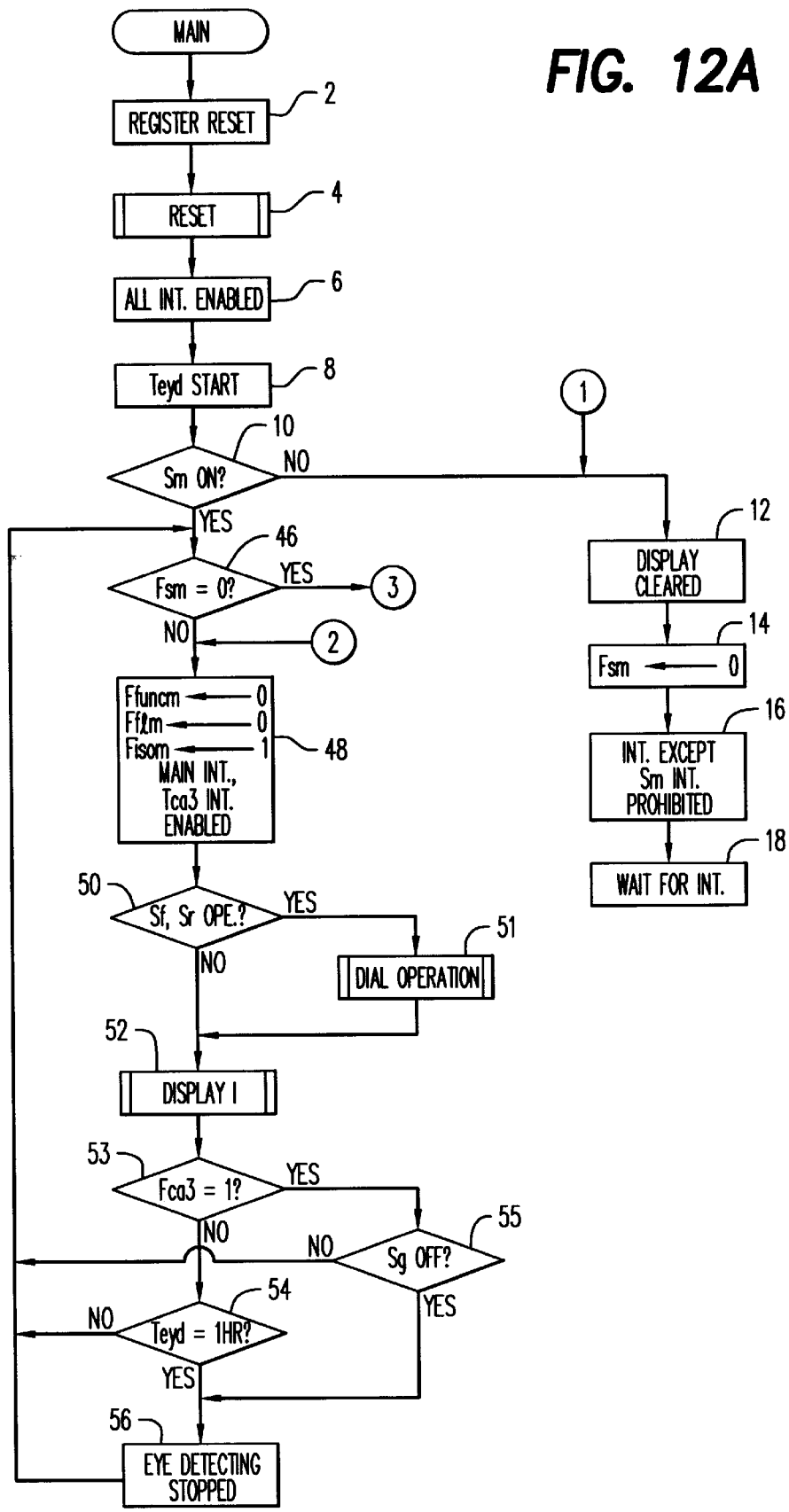
FIG. 12A is a flow chart showing a "Main Routine" which starts when a battery is mounted to the camera and ends upon completion of basic operations of the camera.

FIG. 12A is flow charts showing a "Main Routine" which lasts, following the loading of a battery in the camera or receipt of an interrupt signal from the main switch Sm after the loading of the battery, until execution of basic operations of the camera is completed.

When the battery is loaded in the camera main body 20, contents of various registers and flags provided in the CPU 1 are reset so as to reset photographing conditions previously set in the camera and the like to respective initial values in Steps #2 and #4. In Step #6, all the signals are enabled to interrupt. Subsequently, in Step #8, a timer Teyd is started. The timer Teyd is designed to stop time measuring operation by a timer Tca3 in eye detecting operation to save power described later, in the case where presence of eye has not been detected despite the fact that the eye detecting operation is executed for a specified period, e.g., 1 hour.

Figure 14:
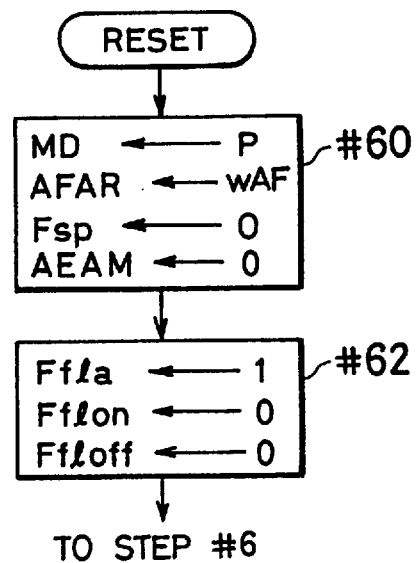
FIG. 14 is a flow chart showing a "Reset Routine"

FIG. 14 is a flow chart showing a "Reset Routine" executed in Step #4. In this subroutine, firstly in Step #60, the content of the mode register MD is reset to P-mode; the content of the AF area register AFAR is reset to wide AF; the spot metering flag Fsp is reset to wide metering; and the exposure adjustment amount AEAM is reset to 0. Subsequently, in Step #62, the flash mode flag Ffla is reset to 1, i.e. the flash mode is set to the automatic flash mode; the flash firing flag Fflon is reset to 0, i.e. the flash firing is prohibited; and the temporary prohibition flag Ffloff is reset to 0. Consequently, this subroutine returns to Step #6.

In Step #10, it is discriminated whether the main switch Sm is turned on. When the main switch Sm is not turned on, this routine proceeds to Step #12 in which the displays made in the in-frame display unit IFI, out-of-frame display unit IFO, and on-body display units 23 are cleared. In general, the main switch Sm is in OFF-state when the battery is loaded. In Step #14, the Sm flag Fsm is set to 0 to indicate that the main switch is in OFF-state. Subsequently, input of any interrupt signal except the one from the main switch Sm is prohibited in Step #16, and the main routine waits in stand-by for an interrupt signal from the main switch Sm in Step #18.

Figure 12B:
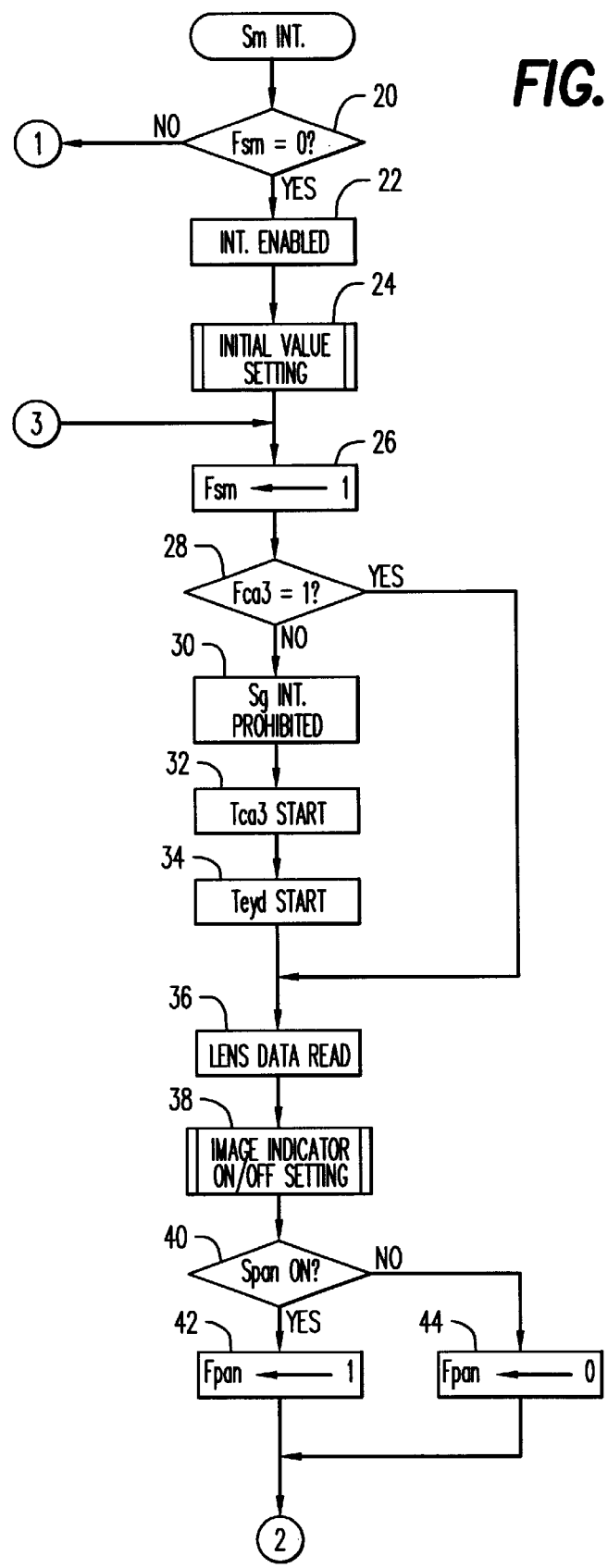
FIG. 12B is a flow chart showing an "Sm Interrupt Routine" which starts when a main switch is turned on after the battery is mounted.

It should be noted that in this embodiment, when the main switch Sm is not only turned on from off but also turned off from on, a "Sm Interrupt Routine" shown in FIG. 12B is executed. This makes it possible to turn off the main switch Sm even when executing other interrupt routines other than the "Sm interrupt Routine".

Firstly, it is discriminated in Step #20 whether the Sm flag Fsm is set to 0. When the flag Fsm is set to 1 (NO in Step #20), i.e., the main switch Sm is discriminated to be in ON-state just before actuated or the main switch Sm is turned off from on at this actuation, this subroutine proceed to Step #12. On the other hand, when the flag Fsm is set to 0, that is, the main switch Sm is discriminated to be in OFF-state just before actuated or the main switch Sm is turned on from off at this actuation, all the signals are enabled to interrupt in Step #22, and initial values for various photographing conditions are set in Step #24.

Figure 15:
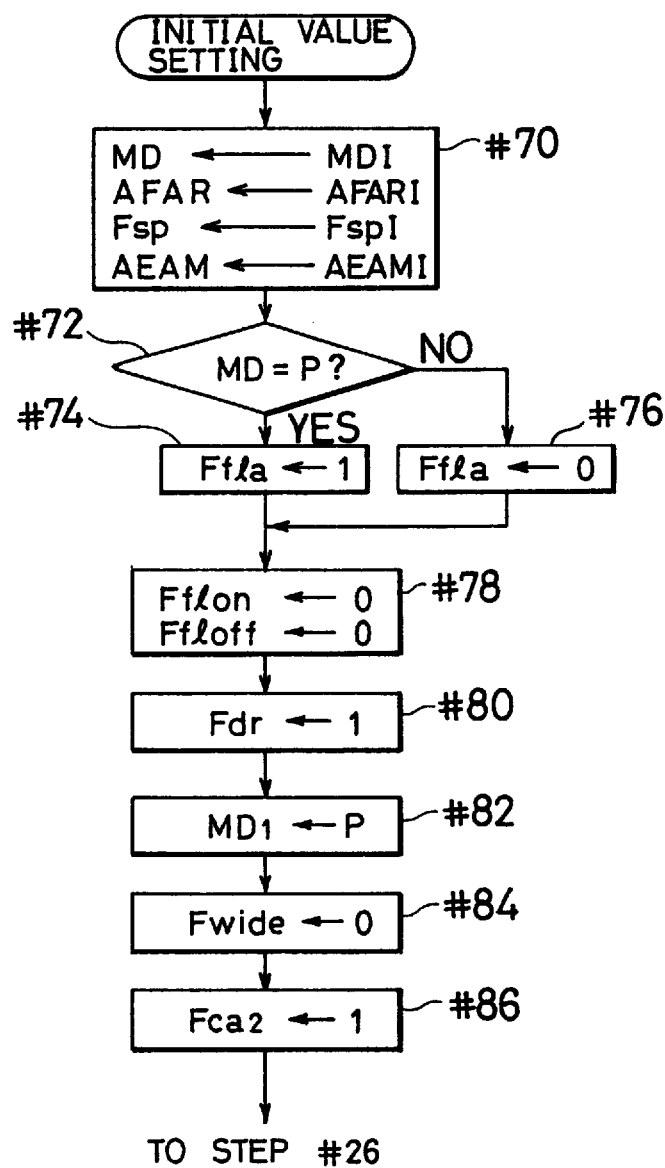
FIG. 15 is a flow chart showing an "Initial Value Setting Routine"

FIG. 15 is a flow chart showing an "Initial Value Setting Routine" executed in Step #24. In this subroutine, initial values read by the CPU 1 from the aforementioned customized card, or initial values changed thereafter are set as initial photographing conditions. More specifically, initial values MDI, AFARI, FspI, and AEAMI are set in the mode register MD, AF area register AFAR, spot metering flag Fsp and exposure adjustment amount AEAM respectively as contents thereof. It should be appreciated that each of the initial values MDI, AFARI, FspI, and AEAMI may be any content the register or flag has. Subsequently, it is discriminated whether the P-mode is set in the mode register MD in Step #72. If the P-mode is set in the mode register MD (YES in Step #72), the flash mode flag Ffla is set to 1, i.e. the flash mode is set to the automatic flash mode in Step #74. If the P-mode is not set in the mode register MD (NO in Step #72), the flash mode flag Ffla is set to 0, i.e. the flash mode is set to the forcible flash mode in Step #76. In Step #78, the flash firing flag Fflon and temporary prohibition flag Ffloff are set to 0, 0 respectively. In Step #80, the Fdr is set to 1, i.e., the single drive mode is set. The shift mode register MD1 is set to P-mode in Step #82, and the wide view flag Fwide is set to 0, i.e., the normal view mode is set, in Step #84, and the automatic flash pop-up mode flag Fca2 is set to 1, i.e., the flash device 11 is set to automatically popped up, in Step #86, this subroutine returns to Step #26 in which the flag Fsm is set to 1 to indicate that the main switch Sm is in ON-state.

Subsequently, it is discriminated whether the eye detection mode flag Fca3 is set to 1, i.e. a first eye detection mode is set, in Step #28. If the eye detection mode flag Fca3 is set to 1 (YES in Step #28), any interrupt signal from the grip switch Sg is prohibited in Step #30. Then, in Step #32, the timer Tca3 is started to measure a time during which the eye detecting operation is carried out periodically. Further, the timer Teyd is started at the same time when the main switch Sm is turned on. If, on the other hand, the eye detection mode flag Fca3 is set 2 (NO in Step #28), this subroutine proceeds directly to Step #36.

In Step #36, the various lens data inherent in the taking lens unit 21 is read by the CPU 1 from the lens CPU 2. Subsequently, an "Image Indicator ON/OFF Setting Routine" is executed in Step #38.

Figure 16:
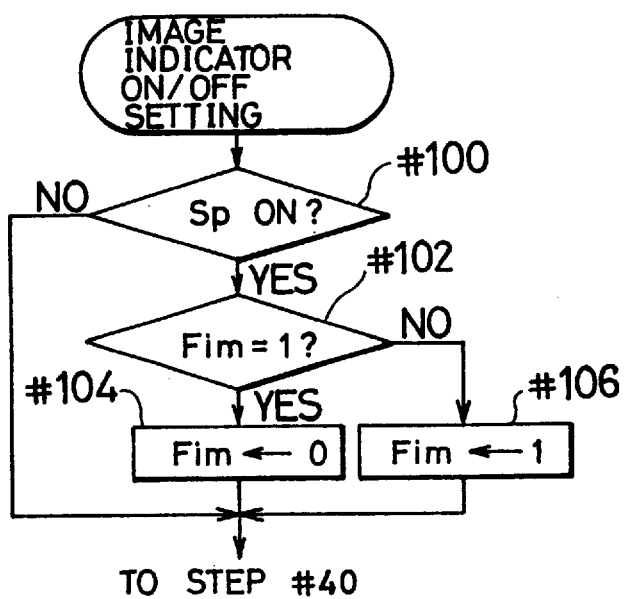
FIG. 16 is a flow chart showing an "Image Indicator Setting Routine"

FIG. 16 is a flow chart showing the "Image Indicator On/Off Setting Routine." In this subroutine, it is first discriminated whether the program set button Sp is in the ON state in Step #100. If the button Sp is in the ON state (YES in Step #100), it is discriminated whether the image indicator flag Fim is set to 1 in Step #102. If set to 1 (YES in Step #102), the flag Fim is set to 0 in Step #104. Conversely, if set to 0 (NO in Step #102), the flag Fim is set to 1 in Step #106. Then, this subroutine returns to Step #30. On the other hand, if the button Sp is in the OFF state (NO in Step #100), this subroutine returns to Step #40 without executing the above operations. Thus, the displayed state of the image indicators are alternately changed each time the main switch is turned on depressing the program set switch Sp.

Referring back to FIG. 12B, it is discriminated whether the panorama switch Span is in the ON state in Step #40. If the switch Span is in the ON state (YES in Step #40), the panorama flag Fpan is set to 1 in Step #42 on the assumption that the masking unit 80 has been mounted to the camera main body 20. On the contrary, if the switch Span is in the OFF state (NO in Step #40), the panorama flag Fpan is set to 0 in Step #44. In this way, when the panorama switch Span is in the ON State, the camera automatically enters the panoramic photography mode. Subsequently, this flow proceeds to Step #48 shown in FIG. 12A.

Next, when the main switch Sm is discriminated to be turned on in Step #10, this routine proceeds to Step #46 in which it is discriminated whether the flag Fsm is set to 0. When the flag Fsm is set to 0 (YES in Step #46), this routine proceeds to Step #26. This means the initial case where the battery is loaded and the main switch Sm is turned on. When the flag Fsm is set to 1 (NO in Step #46), this routine proceeds to Step #48. This means the after-case where the main switch Sm is turned on after the "Sm Interrupt Routine" is executed once or more.

In Step #48, the function mode flag Ffuncm is reset to 0, the flash mode setting flag Fflm is reset to 0, and a "Main Interrupt Routine" and "Tca3 Interrupt Routine" to be described later are enabled. It is discriminated whether either of the control dials Sf, Sr is being operated in Step #50. If neither of the control dials Sf, Sr is being operated (NO in Step #50), this routine proceeds to Step #52. On the other hand, if either of the control dials Sf, Sr is being operated (YES in Step #50), this routine proceeds to Step #51.

FIG. 17 is a flow chart showing a "Dial Operation Routine" executed in Step #51. In this subroutine, firstly, the set exposure mode is discriminated in Step #110. If the P-mode is set in the mode register MD, this subroutine returns to Step #52. If the A-mode is set in the mode register MD, it is discriminated whether the rear control dial Sr is being operated in Step #111. If the dial Sr is being operated (YES in Step #111), the aperture value AV is changed by, for example, 0.5 EV each time the dial Sr is operated in Step #112. If the dial Sr is not being operated, i.e. the front control dial Sf is being operated (NO in Step #111), this subroutine returns to Step #52. If the S-mode is set in the mode register MD, it is discriminated whether the front control dial Sf is being operated in Step #113. If the dial Sf is being operated (YES in Step #113), the shutter speed TV is changed by, for example, 0.5 EV each time the dial Sf is operated in Step #114. If the dial Sf is not being operated, i.e. the dial Sr is being operated (NO in Step #113), this subroutine returns to Step #52. If the M-mode is set in the mode register MD, it is discriminated whether the dial Sf is being operated in Step #115. If the dial Sf is being operated (YES in Step #115), the shutter speed TV is changed by, for example, 0.5 EV each time the dial Sf is operated in Step #116. If the dial Sr is being operated (NO in Step #115), the aperture value AV is changed by, for example, 0.5 EV each time the dial Sr is operated in Step #117. Then, this subroutine returns to Step #52.

Referring back to FIG. 12A, indications corresponding to the above-described operations are made in the on-body display unit OB shown in FIG. 6 in Step #52.

In any of flow charts showing Display Routines to be described below, (OB) means an indication displayed or cleared in the on-body display unit OB; (IFO) means an indication displayed or cleared in the out-of-frame display unit IFO; and (IFI) means an indication displayed or cleared in the in-frame display unit IFI.

FIG. 18 is a flow chart showing a "Display Routine I" In this subroutine, all the indications in the in-frame and out-of-frame display units IFI, IFO are cleared in Step #120. This arrangement takes it into consideration that the operator is not looking through the viewfinder 22 at the time when the main switch Sm is in the ON state. Accordingly, the indications indicative of photographing settings are displayed only in the on-body display unit OB in Step #122. Then, in Step #124, it is discriminated whether the wide AF is set in the AF area register AFAR. If the wide AF is set in the AF area register AFAR (YES in Step #124), the display of the local AF mark 66 is cleared in Step #126. On the other hand, if the local AF is set in the AF area register AFAR (NO in Step #124), the mark 66 is displayed in Step #128.

Next, the exposure adjustment amount AEAM is checked in Step #130. If the exposure adjustment amount AEAM is set negative, i.e. adjustment is to be made to decrease the exposure value, "−" is displayed in the exposure adjustment indicator of the on-body display unit OB in Step #132, if the exposure adjustment amount AEAM is set positive, i.e. adjustment is to be made to increase the exposure value, "+" is displayed in the exposure adjustment indicator in Step #136. Further, if the exposure adjustment amount AEAM is set zero, the exposure adjustment indicator is lighted off in Step #134. Thereafter, the aperture value AV or shutter speed TV is displayed in the SS or AV segment units in Step #138. Specifically, only the aperture value AV is displayed in the AV segment unit when A-mode is selected, only the shutter speed TV is displayed in the SS segment unit when S-mode is selected, and both the aperture value AV and the shutter speed TV are displayed in the SS and AV segment units when M-mode is selected. The set flash mode is displayed using the indicators 60, 61, 62 and mark "AUTO" in Step #140. In Step #142, the self/drive mode is displayed using the indicators 63, 64. In Step #144, the number of frames of the loaded film already used is displayed using the indicator 65 and a numerical value indicated therein. Consequently, in Step #146, other displays are cleared, and this subroutine returns to Step #53.

Figure 62A:
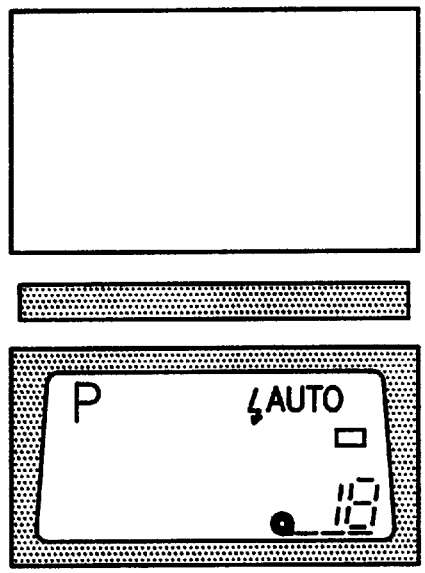
FIGS. 62A, 62B and 62C are diagrams showing displayed states of the respective display units after execution of the "Display Routine I," when the presence of eye is detected and a switch S1 is in the ON state, and when the switch S1 is in the OFF state.

An example of photographing settings displayed in the on-body display unit is shown in FIG. 62A. According to FIG. 62A, the P-mode is set as an exposure mode; the automatic flash mode is set without preliminary flash firing; the single drive mode is set; and 18 frames of the loaded film has been already used. As described above, at this stage, no indications are displayed in the in-frame and out-of-frame display units IFI, IFO.

Referring back to FIG. 12A, it is discriminated whether the eye detection mode flag Fca3 is set to 1 in Step #53. If the flag Fca3 is set to 2 (NO in Step #53), it is checked whether 1 hour has elapsed following the start of the timer Teyd in Step #54. If 1 hour has not elapsed yet (NO in Step #54), the eye detecting operation is repeated each time the timer Tca3 measures the specified time until the timer Teyd measures 1 hour. Upon lapse of 1 hour (YES in Step #54), the eye detecting operation is stopped, as described above, in Step #56. On the other hand, if flag Fca3 is set to 1, i.e. a first eye detection mode is set wherein the eye detecting operation is carried out periodically each time the grip Sg is turned on, this routine proceeds to Step #55 in which it is discriminated whether the grip switch Sg is turned off. When the grip switch Sg is turned on (NO in Step #55), this routine returns to Step #46. When the grip switch Sg is turned off (YES in Step #55), this routine proceeds to Step #56, and returns to Step #46.

Figure 13:
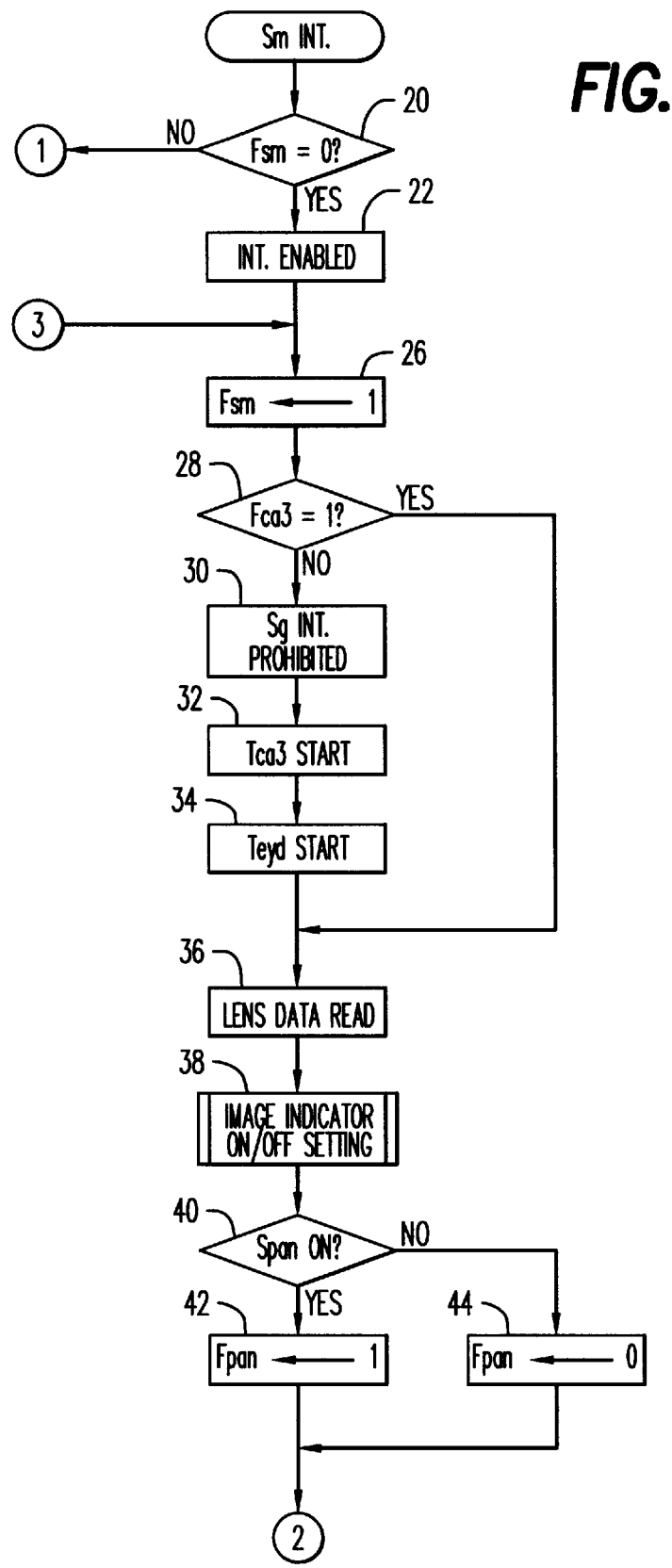
FIG. 13 is a flow chart showing another "Sm Interrupt Routine"

Also, in the invention, as shown in FIG. 13, it may be appreciated to eliminate Step #24 of the "Sm Interrupt Routine" shown in FIG. 12B. In this case, initial values are not set when the main switch Sm is turned on from off. The initial values set in the previous routine are maintained. In other words, initial values are set only when the program set button Sp is turned on.

Next, there will be described various Interrupt Routines executed after the main switch Sm is turned on. These Interrupt Routines are executed upon receipt of a specified interrupt signal. Upon completion, these routines returns to the steps where they are started.

Figure 19A:
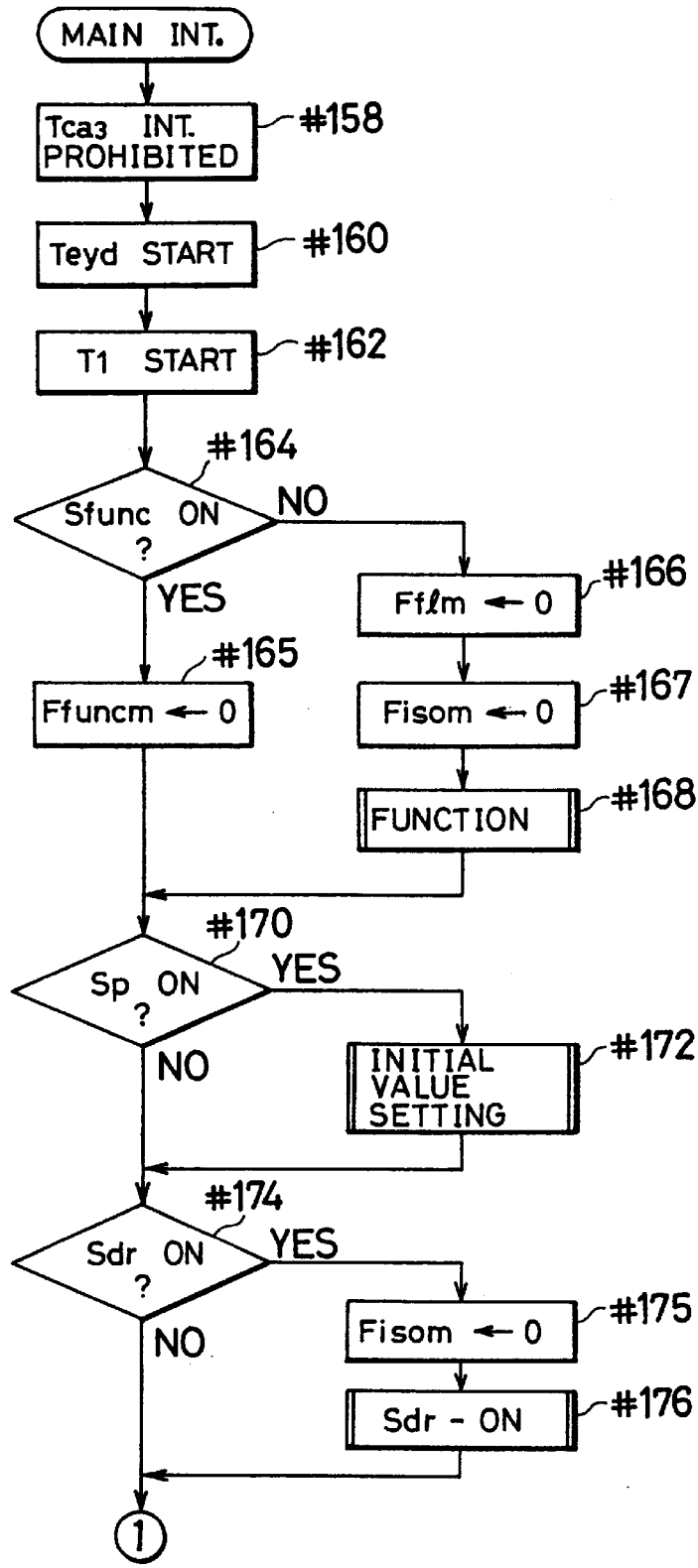
FIGS. 19A and 19B are flow charts showing a "Main Interrupt Routine"
Figure 19B:
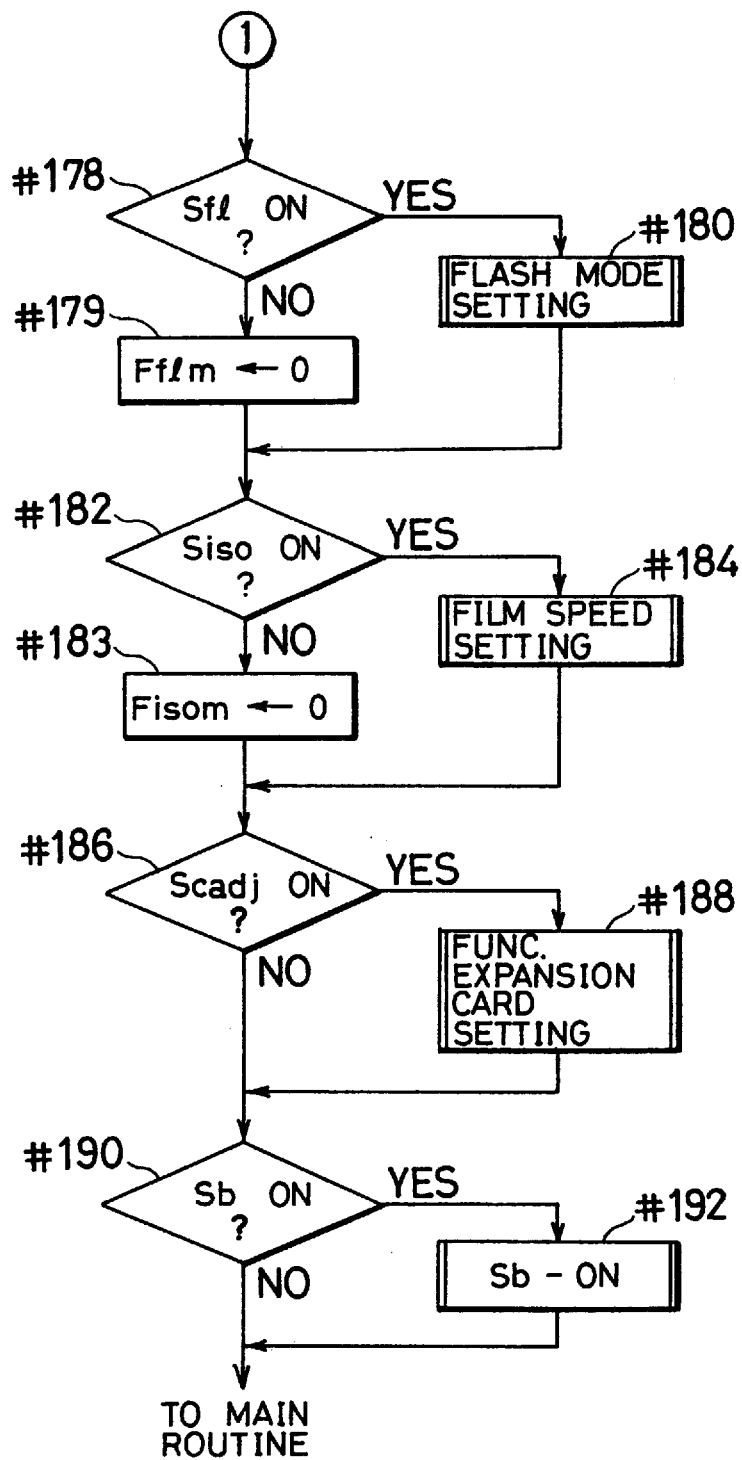

FIGS. 19A and 19B are flow charts showing a "Main Interrupt Routine." This routine is executed when any of the function button Sfunc, program set button Sp, self-timer/drive mode button Sdr, flash mode button Sfl, film speed button Siso, card adjustment button Scadj, and back cover switch Sb is turned on.

In the "Main Interrupt Routine," firstly, the eye detecting operation is prohibited in Step #158. The timers Teyd, T1 are started respectively in Steps #160, #162. Thereafter, the operated buttons and switches are discriminated and operations corresponding thereto are carried out.

In Step #164, it is discriminated whether the function button Sfunc is in the ON state. If the button Sfunc is in the ON state (YES in Step #164), the function mode flag Ffuncm is set to 0 to indicate that the function mode is not set in Step #165. If the button Sfunc is in the OFF state (NO in Step #164), the flash mode setting flag Fflm and the film speed setting mode flag Fisom are reset to 0 in Steps #166 and #167 respectively, and a "Function Routine" is executed in Step #168.

Figure 20:
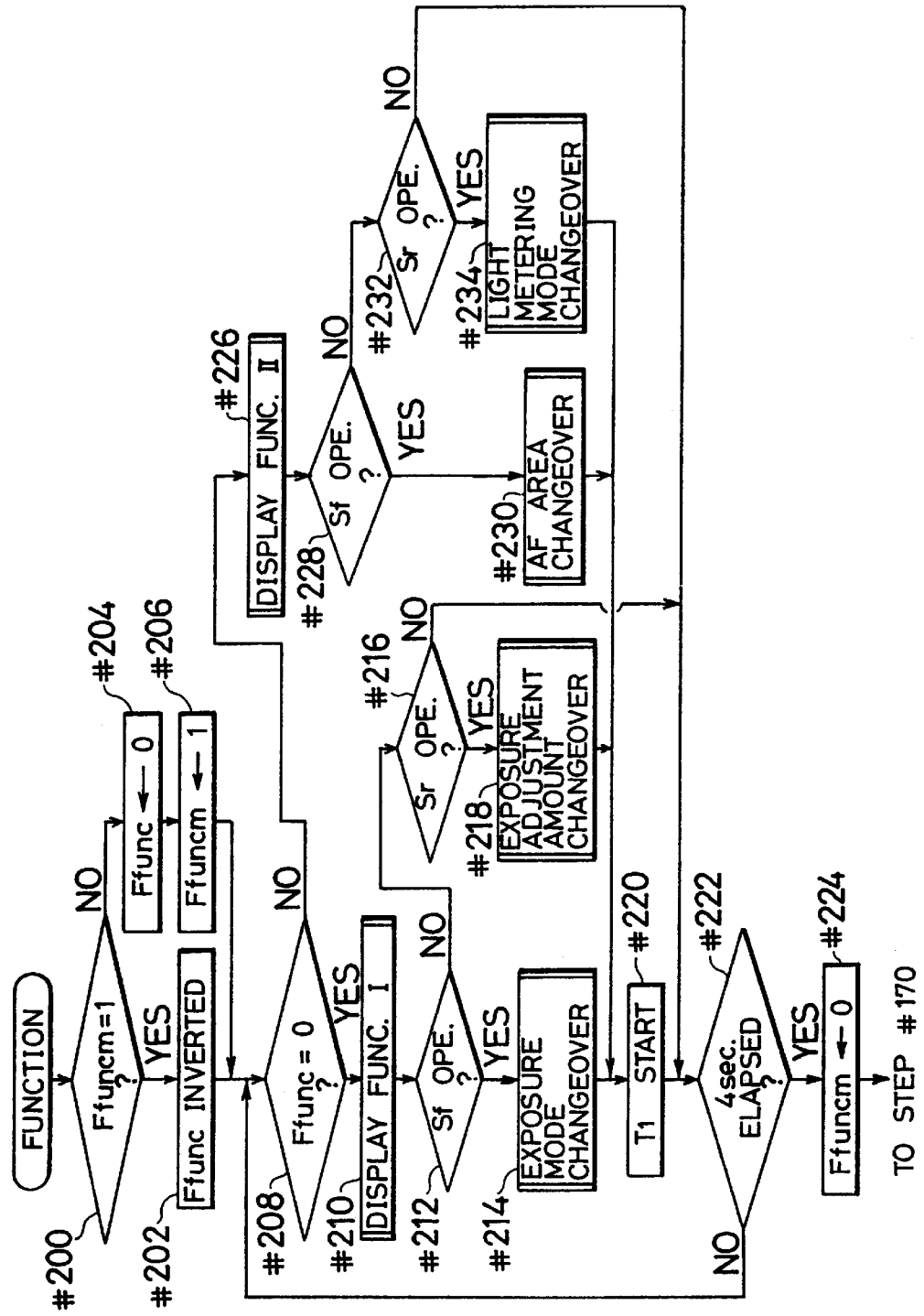
FIG. 20 is a flow chart showing a "Function Routine"

FIG. 20 is a flow chart showing the "Function Routine." In this subroutine, it is discriminated whether the function mode flag Ffuncm is set to 1 to check the setting of the function mode in Step #200. If the function mode is set (YES in Step #200), the state of the function flag Ffunc is inverted in Step #202 since a specific function mode is selected in the function mode. In other words, the state of the flag Ffunc is changed from ON to OFF, or from OFF to ON. On the other hand, if the flag Ffuncm is set to 0 (NO in Step #200), it means the camera has just entered the "Function Routine" from the "Main Routine." Accordingly, the function flag Ffunc is set to 0 in Step #204 and the function mode flag Ffuncm is set to 1 in Step #206. Then, this subroutine proceeds to Step #208 in which the state of the function flag Ffunc is discriminated. If the flag Ffunc is in the 0 (YES in Step #208), a "Display Function Routine I" is executed in Step #210.

Figure 21:
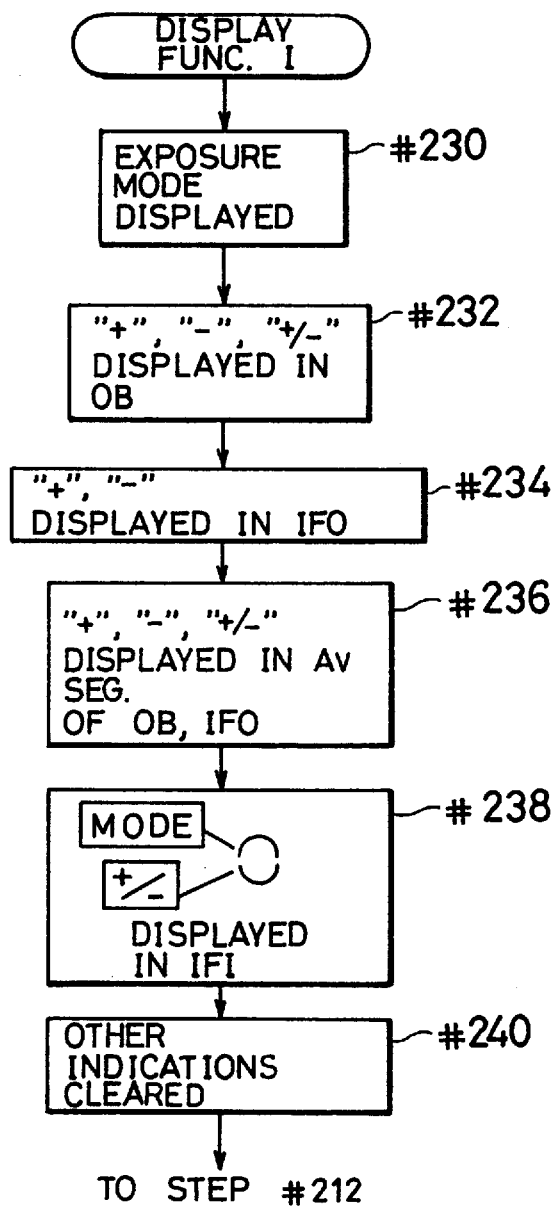
FIG. 21 is a flow chart showing a "Display Function Routine I"

FIG. 21 is a flow chart showing the "Display Function Routine I." In this subroutine, the exposure mode is displayed in the on-body display unit OB, in-frame and out-of-frame display units IFI, IFO in Step #230. Subsequently, reflecting the case where the exposure adjustment amount AEAM is positive, negative or 0, "+," "−," or "±" is displayed in the exposure adjustment indicator of the on-body display unit OB in Step #232. Further, "+" or "−" reflecting the positive or negative exposure adjustment amount AEAM is displayed in the out-of-frame display unit IFO in Step #234. It will be appreciated that no indication is displayed in the out-of-frame display unit when the exposure adjustment amount AEAM is 0. In Step #236, the exposure adjustment amount AEAM is displayed in the AV segment units of the on-body display unit OB and out-of-frame display unit IFO. A function 1 indicator including indicators 51, 52 and those on the left thereof in FIG. 5 is displayed in the in-frame display unit IFI in Step #238 so as to indicate that the exposure mode and exposure adjustment amount are allowed to be changed. Consequently, all the indications other than the above are cleared in the display units 23, IFI and IFO in Step #240, and this subroutine returns to Step #212.

Figure 63A:
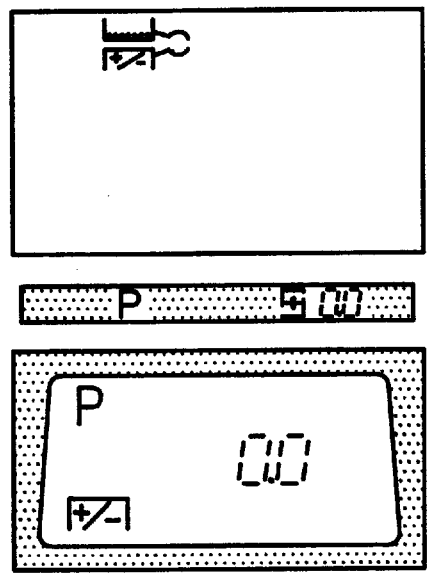
FIGS. 63A and 63B, are diagrams showing displayed states of the respective display units after execution of the "Display Function Routine I and "Display Function Routine II"

Displayed states of the display units 23, IFI and IFO at the time when the "Display Function Routine I" is completed are shown in FIG. 63A. When the function flag Ffunc is set at 0, the exposure mode and exposure adjustment amount are allowed to be changed. Accordingly, the indicators and numerical value in relation to those are displayed. As will be seen from FIG. 63A, the P-mode is set as an exposure mode and the exposure adjustment amount AEAM is set at 0.

Referring back to FIG. 20, it is discriminated whether the front control dial Sf has been operated in Step #212. If the dial Sf has been operated (YES in Step #212), an "Exposure Mode Changeover Routine" is executed in Step #214.

Figure 22:
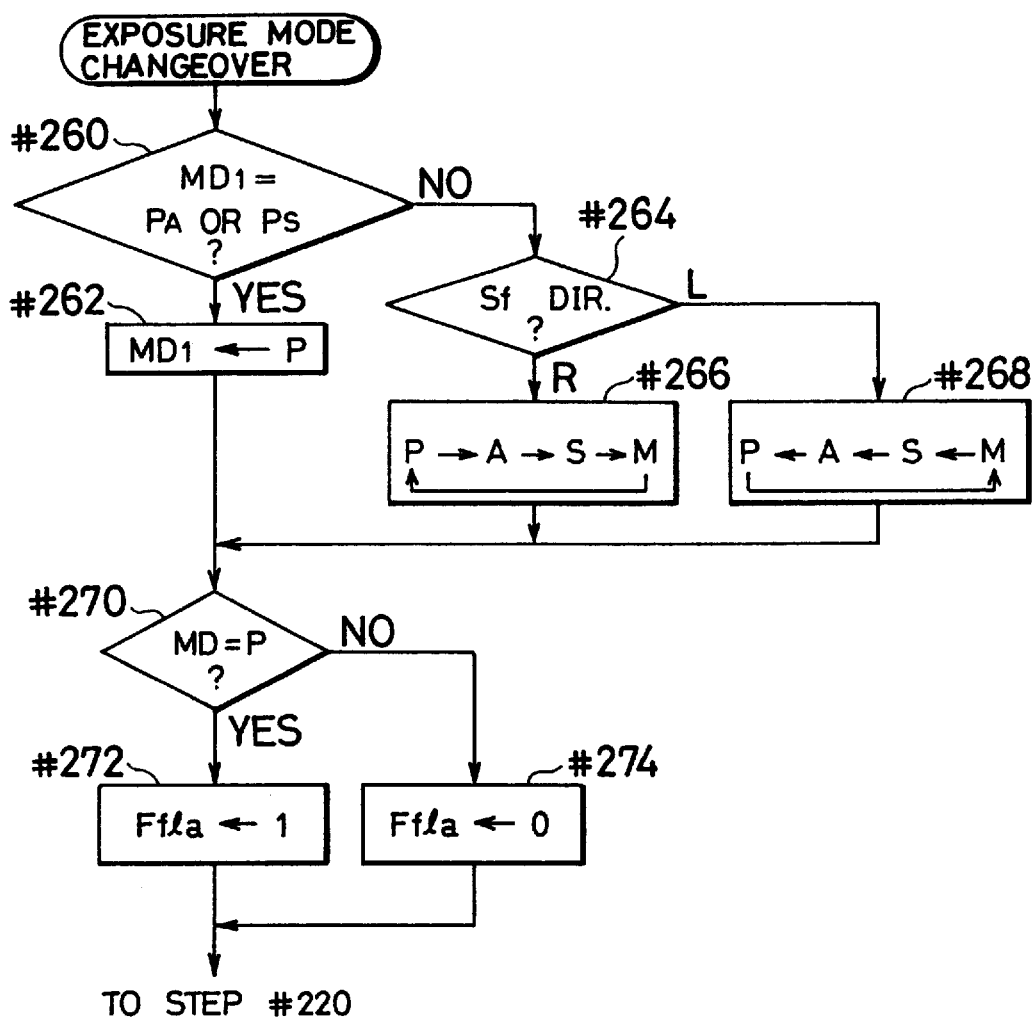
FIG. 22 is a flow chart showing an "Exposure Mode Changeover Routine"

FIG. 22 is a flow chart showing the "Exposure Mode Changeover Routine." In this subroutine, it is discriminated whether the content of the shift mode register MD1 is PA-mode or PS-mode in Step #260. If the content of the register MD1 is PA-mode or PS-mode (YES in Step #260), the content of the register MD1 is changed to P-mode in Step #262 and this subroutine proceeds to Step #270 in which it is discriminated whether the register MD is changed to P-mode. When changed to P-mode (YES in Step #270), this subroutine proceeds to Step #272 in which the flag Ffla is set to 1. When not changed to P-mode, the flag Ffla is set to 0 in Step #274. Thereafter, this subroutine returns to Step #220. In this way, the arrangement is such that the exposure mode is changed from PA-mode or PS-mode to another mode after changed to P-mode.

On the other hand, if the content of the register MD1 is neither PA-mode nor PS-mode, i.e. the content of the register MD1 is P-mode (NO in Step #260), the operated direction of the dial Sf is discriminated in Step #264. This discrimination is made because the exposure mode is changed according to the operated direction of the dial Sf. If the dial Sf is turned to the right (clockwise), the exposure mode is cyclically changed in the following order in Step #266: P→A→S→M→P. The exposure mode is changed to the next one each time the dial Sf is turned by the specified amount. Conversely, if the dial Sf is turned to the left (counterclockwise), the exposure mode is cyclically changed in the following order in Step #268: M→S→A→P→M. Upon changing the exposure mode, this subroutine proceeds to Step #270.

Relationship between the rotating direction of the front control dial Sf and a direction in which the exposure mode is changed is determined from the viewpoint of human engineering. Camera operators normally tend to think that a changing direction; P→A→S→M, is forward rather than another changing direction; M→S→A→P. Further, when the dial Sf is viewed from behind the camera main body, the camera operators normally tend to think that clockwise rotation thereof is forward rather than counter-clockwise rotation thereof. Accordingly, the arrangement is such that the exposure mode is changed in the direction P→A→S→M when the dial Sf is rotated clockwise as described above. It will be appreciated that the invention suffers no problem even if relationship of the exposure mode changing direction and rotating direction of the dial Sf is set inversely of the above relationship.

Referring back to FIG. 20, if the dial Sf has not been operated (NO in Step #212), it is discriminated whether the rear control dial Sr has been operated in Step #216. If the dial Sr has not been operated (NO in Step #216), this subroutine proceeds directly to Step #222. On the other hand, if the dial Sr has been operated (YES in Step #216), an "Exposure Adjustment Amount Changeover Routine" is executed in Step #218.

Figure 23:
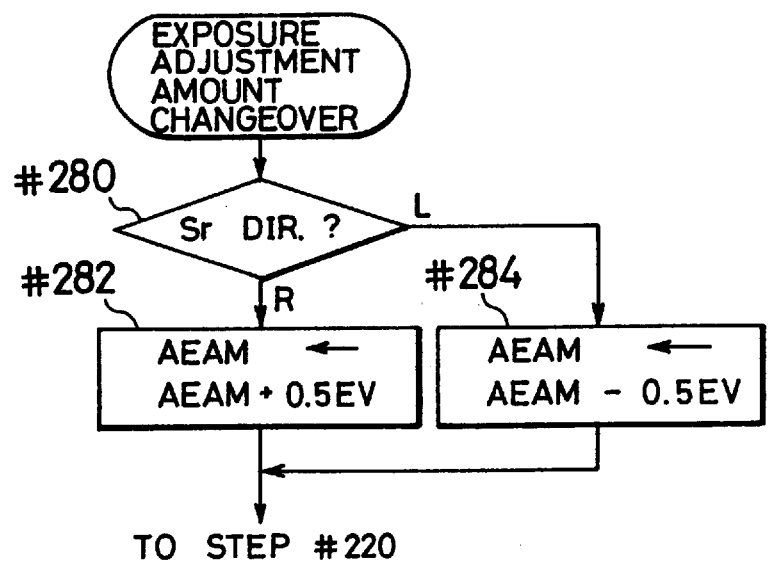
FIG. 23 is a flow chart showing an "Exposure Adjustment Amount Changeover Routine"

FIG. 23 is a flow chart showing the "Exposure Adjustment Amount Changeover Routine." In this subroutine, the operated direction of the dial Sr is first discriminated in Step #280. If the dial Sr is turned to the right (counter-clockwise), the exposure adjustment amount AEAM is increased by 0.5 EV in Step #282. The amount AEAM is increased by 0.5 EV each time the dial Sr is turned by the specified amount. Conversely, if the dial Sr is turned to the left (clockwise), the amount AEAM is decreased by 0.5 EV in Step #284. Then, this subroutine returns to Step #220.

Similarly to the relationship between the rotating direction of the dial Sf and the exposure mode changing direction, relationship between the rotating direction of the rear control dial Sr and a direction in which the exposure adjustment amount AEAM is changed is determined from the viewpoint of human engineering. In this way, rotation of the dial Sr is set to conform to the normal sense of the camera operators, thereby maximally preventing occurrences of maloperation.

Referring back to FIG. 20, upon completion of changing of the exposure mode or exposure adjustment amount AEAM, the timer T1 is reset and started in Step #220. Subsequently, it is discriminated whether 4 seconds have elapsed following start of the timer T1 in Step #222. A loop of Steps #208 to #222 is repeated until the timer T1 measures 4 seconds (NO in Step #222). Upon the timer T1 measuring 4 seconds (YES in Step #222), the function mode flag Ffuncm is reset to 0 in Step #224 and this subroutine returns to Step #170.

If the function flag Ffunc is set at 1 (YES in Step #208), a "Display Function Routine II" is executed in Step #226. It should be understood that the flag Ffunc can be set at 1 in Step #208 only in the case where the function button Sfunc is depressed while the timer T1 is on the way to measure 4 seconds. In this case, this subroutine is started from the beginning. However, in this run, the subroutine proceeds to Step #202 since the state of the flag Ffuncm is set to 1 in Step #206 in the last run. In Step #202, the state of the flag Ffunc is inverted to 1. Accordingly, the flag Ffunc can be discriminated to be set at 1 in Step #208. In other words, this subroutine never proceeds to Step #226 unless the switch Sfunc is depressed during execution of this subroutine.

Figure 24:
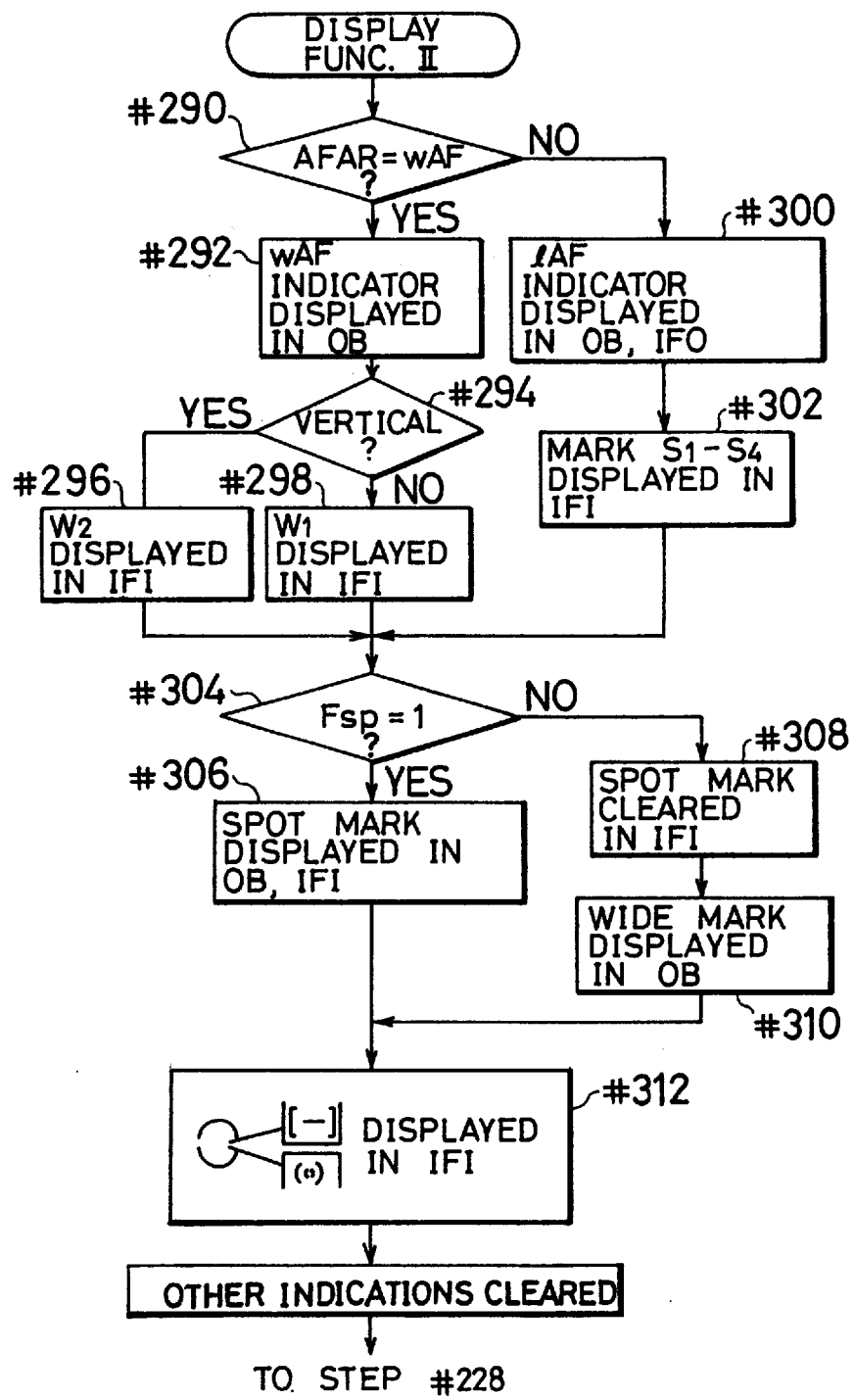
FIG. 24 is a flow chart showing a "Display Function Routine II"

FIG. 24 is a flow chart showing the "Display Function Routine II." In this subroutine, it is first discriminated whether the content of the AF area register AFAR is the wide AF mode in Step #290. If the wide AF mode is set (YES in Step #290), the wide AF indicator 67 is displayed in the on-body display unit OB in Step #292. Subsequently, it is discriminated whether the camera is held in the vertical position in Step #294. If the camera is held in the vertical position (YES in Step #294), the mark W2 is displayed in the in-frame display unit IFI in Step #296. If the camera is held in the horizontal position (NO in Step #294), the mark W1 is displayed in the display unit IFI in Step #298. On the other hand, if the content of the register AFAR is not the wide AF mode, i.e. the local AF mode is set (NO in Step #290), the local AF indicator 66 is displayed in the display unit OB and any of S1 to S4 indicative of the local AF is displayed in the SS segment unit of the out-of-frame display unit IFO in Step #300. Then, any of the mark S1 to S4 indicative of the selected local AF area is displayed in the display unit IFI in Step #302 and this subroutine proceeds to Step #304.

In Step #304, it is discriminated whether the spot metering flag Fsp is set at 1, i.e. the spot metering mode is set, in Step #304. If the spot metering mode is set (YES in Step #304), the spot metering mark 73 is displayed in the display units OB and IFI in Step #306. If the wide metering mode is set (NO in Step #304), the display of the mark 73 is cleared in the display unit IFI in Step #308 and the wide metering mark 74 is displayed in the display unit OB in Step #310. Subsequently, the indicators 51, 52 are displayed in the display unit IFI so as to inform the operator that the AF area and light metering area are allowed to be changed in Step #312. Consequently, all the indications except those displayed in Steps #292 to #312 are cleared in Step #314, and this subroutine returns to Step #228.

Figure 63B:
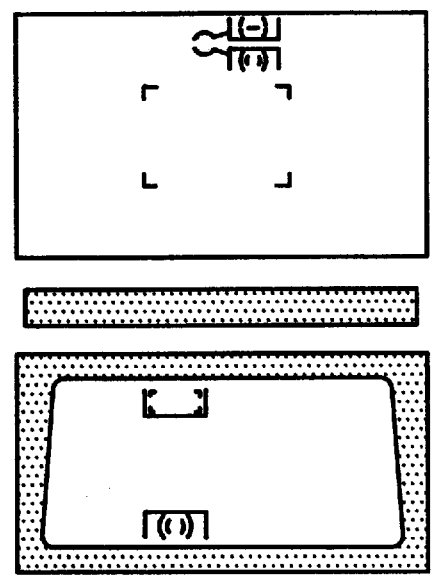

Displayed states of the display units 23, IFI and IFO at the time when the "Display Function Routine II" is completed are shown in FIG. 63B. When the function flag Ffunc is set at 1. the AF area and light metering area are allowed to be changed. Accordingly, the indicators in relation to those areas are displayed. As will be seen from FIG. 63B, the vertically positioned wide AF area and wide light metering are selected.

Referring back to FIG. 20, it is discriminated whether the front control dial Sf has been operated in Step #228. If the dial Sf has been operated (YES in Step #228), an "AF Area Changeover Routine" is executed in Step #230.

Figure 25:
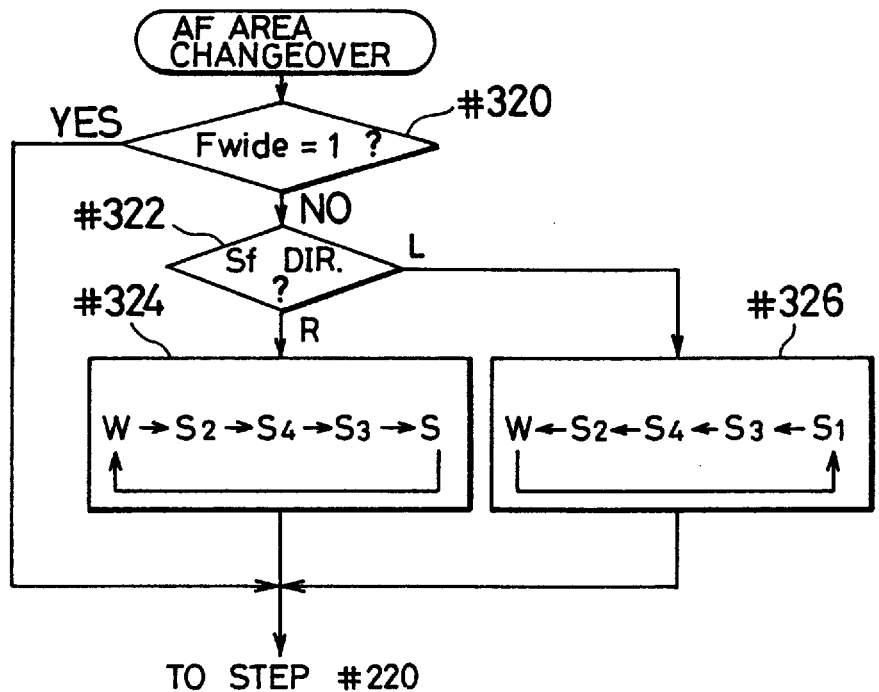
FIG. 25 is a flow chart showing an "AF Area Changeover Routine"

FIG. 25 is a flow chart showing the "AF Area Changeover Routine." In this subroutine, it is first discriminated whether the wide view flag Fwide is set at 1, i.e. the wide view mode is set, in Step #320. If the wide view mode is set (YES in Step #320), this subroutine directly returns to Step #220. On the other hand, if the normal view mode is set (NO in Step #320), the operated direction of the dial Sf is discriminated in Step #322. This discrimination is made because the AF area is changed according to the operated direction of the dial Sf. If the dial Sf is turned to the right (clockwise), the AF area is changed in the following order in Step #324: W→S2→S4→S3→S1→W. The AF area is changed to the next one each time the dial Sf is turned by the specified amount. Conversely, if the dial Sf is turned to the left (counterclockwise), the AF area is changed in the following order in Step #326: S1→S3→S4→S2→W→S1. Then, this subroutine returns to Step #220.

Relationship between the rotating direction of the dial Sf and a direction in which the AF area is changed is also determined from the viewpoint of human engineering. In this way, rotation of the dial Sf is set to conform to the normal sense of the camera operators, thereby maximally preventing occurrences of maloperation.

Referring back to FIG. 20, if the dial Sf has not been operated (NO in Step #228), it-is discriminated whether the rear control dial Sr has been operated in Step #232. If the dial Sr has not been operated (NO in Step #232), this subroutine directly proceeds to Step #222. On the other hand, if the dial Sr has been operated (YES in Step #234), a "Light Metering Mode Changeover Routine" is executed in Step #234.

Figure 26:
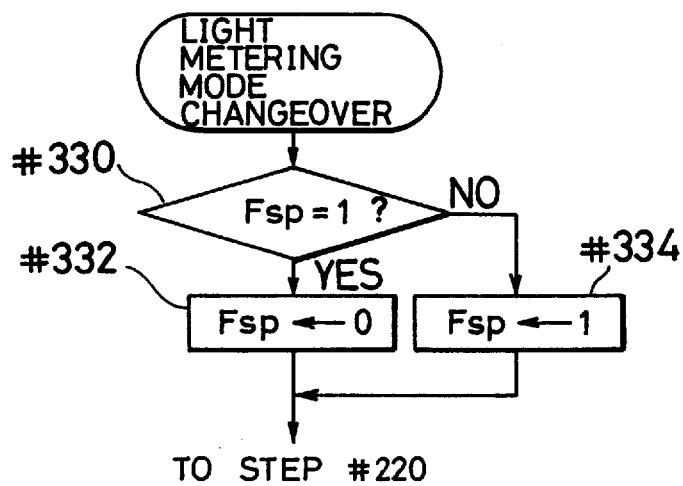
FIG. 26 is a flow chart showing a "Light Metering Mode Changeover Routine"

FIG. 26 is a flow chart showing the "Light Metering Mode Changeover Routine." In this subroutine, it is first discriminated whether the spot metering flag Fsp is set at 1 in Step #330. If the spot metering mode is set (YES in Step #332), the light metering mode is changed to the wide metering mode, i.e. the flag Fsp is set to 0, in Step #332 and this subroutine returns to Step #220. On the other hand, if the wide metering mode is set (NO in Step #332), the light metering mode is changed to the spot metering mode, i.e. the flag Fsp is set to 1, in Step #334 and this subroutine returns to Step #220.

Referring back to FIG. 20, upon completion of the changing of the AF area or light metering area, the timer T1 is restarted in Step #220 and it is discriminated whether 4 seconds have elapsed following start of the timer T1 in Step #222. Upon the timer T1 measuring 4 seconds (YES in Step #222), the function mode flag Ffuncm is reset to 0 in Step #224 and this subroutine returns to Step #170.

Referring back to FIGS. 19A and 19B, it is discriminated whether the program set button Sp is in the ON state in Step #170. If the button Sp is in the OFF state (NO in Step #170), this routine proceeds to Step #174. On the other hand, if the button Sp is in the ON state (YES in Step #170), the "Initial Value Setting Routine" in step 172. Being described with reference to FIG. 15, the "Initial Value Setting Routine" is not to be described here to avoid repetition.

Subsequently, it is discriminated whether the self-timer/drive button Sdr is in the ON state in Step #174. If the button Sdr is in the OFF state (NO in Step #174), this routine proceeds to Step #178. On the other hand, if the button Sdr is in the ON state (YES in Step #174), the flag Fisom is reset to 0 in Step #175, and a "Sdr-On Routine" is executed in Step #176.

Figure 27:
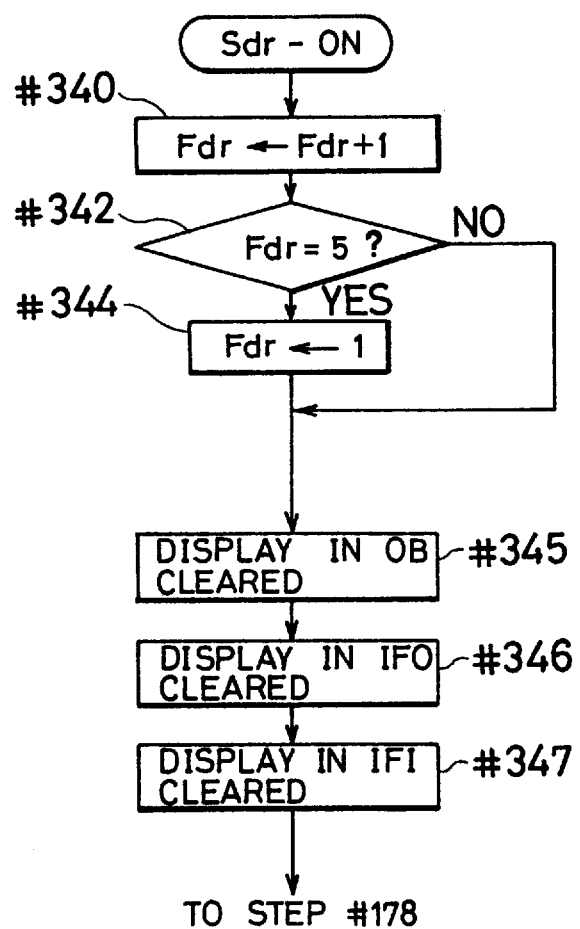
FIG. 27 is a flow chart showing an "Sdr-On Routine"

FIG. 27 is a flow chart showing the "Sdr-On Routine." In this subroutine, the content of the self-timer/drive flag Fdr is incremented by one in Step #340 each time the button Sdr is turned on. Then, in Step #342, it is discriminated whether the flag Fdr is set at 5. If the flag Fdr is set at any of 1, 2, 3, and 4 (NO in Step #342), this subroutine proceeds to Step #345 in which the displays in the display unit OB are cleared, if any. The displays in the display units IFO and IFI are cleared in Steps #346 and #347 respectively, if any. Thereafter, this subroutine returns to Step #178. If set at 5 (YES in Step #342), the flag Fdr is set to 1 in Step #344 and this subroutine returns to Step #178. In this way, each time the button Sdr is turned on, the self-timer/drive mode is changed in the following order: single drive mode→self-timer mode→high speed continuous drive mode→low speed continuous drive mode.

Referring back to FIGS. 19A and 19B, it is discriminated whether the flash mode button Sfl is in the ON state in Step #178. If the button Sfl is in the OFF state (NO in Step #178), this routine proceeds to Step #182 after the flag Fflm is reset to 0 in Step #179. On the other hand, if the button Sfl is in the ON state (YES in Step #178), a "Flash Mode Setting Routine" is executed in Step #180.

Figure 28:
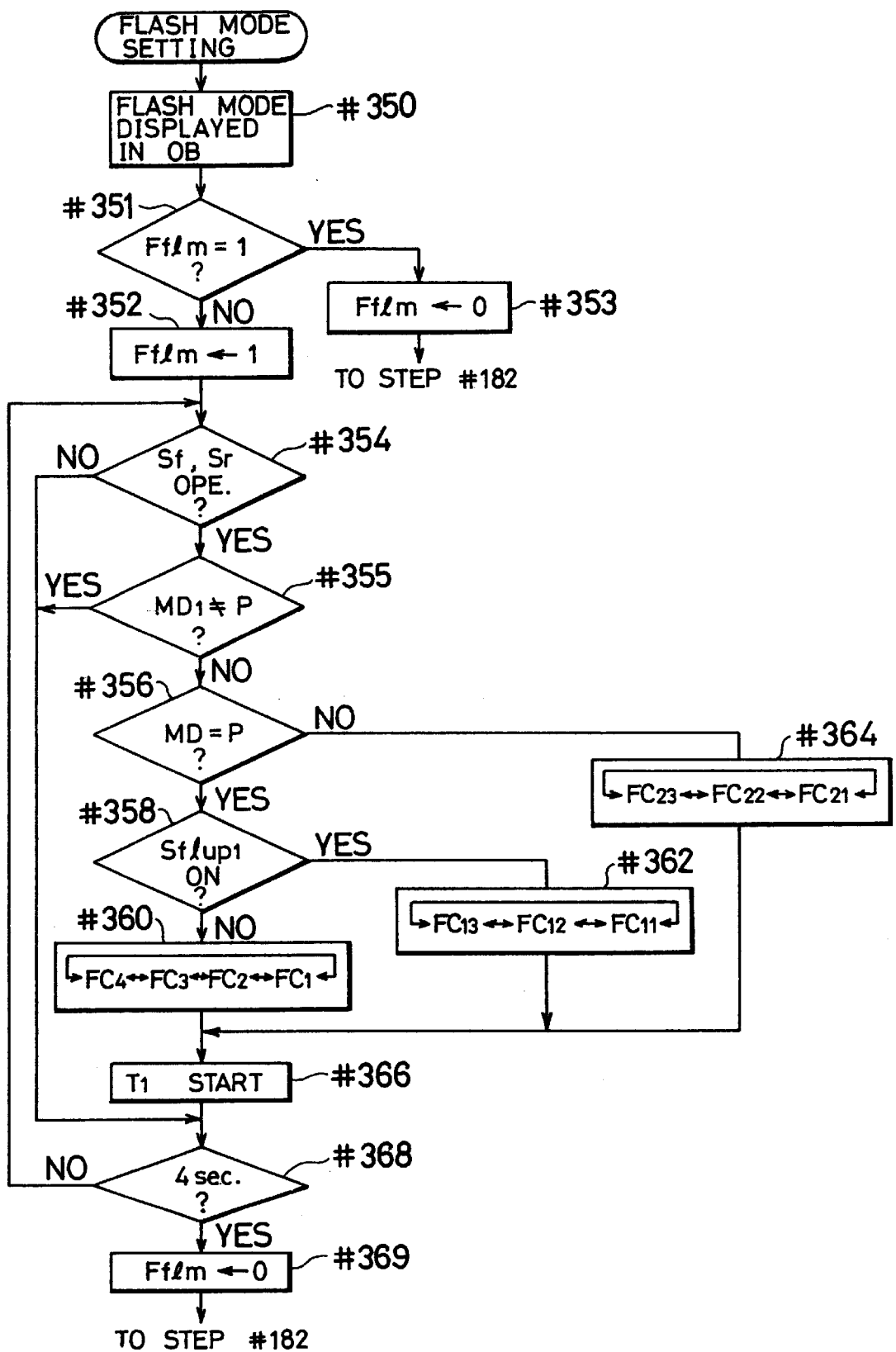
FIG. 28 is a flow chart showing a "Flash Mode Setting Routine"

FIG. 28 is a flow chart showing the "Flash Mode Setting Routine" executed in Step #180. In this subroutine, the flash mode is first displayed in the on-body display unit OB in Step #350 (see TABLE-1 below). Subsequently, it is discriminated whether the flag Fflm is set to 1 in Step #351. When the flag Fflm is set to 1, the flag Fflm is reset to 0 in Step #353, and this subroutine returns to Step #182. This makes it possible to escape this subroutine if the flash mode button Sfl is turned on in a state where a flash mode has been already set. When not set to 1, the flag Fflm is set to 1 and this subroutine proceeds to Step #354.

it is discriminated whether either the front or rear control dial Sf or Sr has been operated in Step #354. Since no distinction is made between the front and rear control dials in discriminating the dial operation, the processing carried out when the front control dial Sf is operated is the same as the one carried out when the rear control dial Sr is operated. If neither of the control dials has been operated (NO in Step #354), this subroutine proceeds to Step #368 in which it is discriminated whether the timer T1 started in Step #162 measures 4 seconds. Upon the lapse of 4 seconds, this subroutine return to Step #182 after the flag Fflm is reset to 0 in Step #369.

On the other hand, if either of the control dials has been operated (YES in Step #354), it is discriminated whether the content of the shift mode register MD1 is other than P-mode, namely PA-mode or PS-mode, in Step #355. If the content of the shift mode register MD1 is either PA-mode or PS-mode (YES in Step #355), this subroutine proceeds to Step #368. If, on the other hand, the content of the mode shift register MD1 is P-mode (NO in Step #355), it is discriminated whether the P-mode is set in the mode register MD in Step #356. If the P-mode is set in the mode register MD (YES in Step #356), it is further discriminated whether the flash switch Sflup1 is in the ON state in Step #358. If the built-in flash device 11 is in the accommodated state (NO in Step #358), this subroutine proceeds to Step #360 in which flag set states FC1 to FC4 are cyclically changed over, each time the control dial is operated, according to its operated direction.

The display manners of the flash mode according to the flash set states are determined as in TABLE-1 below, and the flash mode is displayed in accordance with the TABLE-1.

TABLE 1

| MD1 | Fflon | Fflp | Ffla | Ffloff | DISPLAY |
|---|---|---|---|---|---|
| P | 0 | * | * | * | OFF |
| P | * | * | * | 1 | OFF |
| P | 1 | 0 | 0 | 0 | ⚡ |
| P | 1 | 0 | 1 | 0 | ⚡ AUTO |
| P | 1 | * | 2 | 0 | ⚡⚡ ON OFF |
| P | 1 | 1 | 0 | 0 | ⚡⚡ |
| P | 1 | 1 | 1 | 0 | ⚡⚡ AUTO |
| PA, PS | * | * | * | * | OFF |

Note: (*) denotes any state of a flag

The flag set state FC1 indicates a state where the flash firing flag Fflon is indicative of execution of flash firing and the flash mode flag Ffla is indicative of the wireless flash mode (Fflon=1, Ffla=2), i.e. a flash firing state with the use of a wireless flash device. In this state, the indicators 61, 62 are alternately or merely displayed on and off in the on-body display unit OB. The flag set state FC2 indicates a state where the flash firing flag Fflon is indicative of unexecution of flash firing and the flash mode flag Ffla is indicative of the forcible flash mode (Fflon=0, Ffla=0), i.e. a flash non-firing state independently of the type of flash mode. In this state, "OFF" is displayed with the use of SS segment unit and the indicator 62 is displayed in the on-body display unit OB. The flag set state FC3 indicates a state where the preliminary flash firing flag Fflp is indicative of execution of the preliminary flash firing and the flash mode flag Ffla is indicative of the automatic flash mode (Fflp=1, Ffla=1). In this state, the indicators 61, 62 and mark "AUTO" are displayed in the on-body display unit OB. The flag set state FC4 indicates a state where the preliminary flash firing flag Fflp is indicative of unexecution of the preliminary flash firing and the flash mode flag Ffla is indicative of the automatic flash mode (Fflp=0, Ffla=1). In this state, the indicator 62 and mark "AUTO" are displayed in the on-body display unit OB.

If the flash switch Sflup1 is in the ON state, i.e. the flash device is in the pop-up state (YES in Step #358), this subroutine proceeds to Step #362 in which flag set states FC11 to FC13 are cyclically changed over, each time the control dial is operated, according to its operated direction.

The flag set state FC11 indicates a state where the flash mode flag Ffla is indicative of the wireless flash mode (Ffla=2). In this state, the indicators 61, 62 are alternately or merely displayed on and off in the on-body display unit OB. The flag set state FC12, similar to the state FC3, indicates a state where the preliminary flash firing flag Fflp is indicative of execution of the preliminary flash firing and the flash mode flag Ffla is indicative of the automatic flash mode (Fflp=1, Ffla=1). In this state, the indicators 61, 62 and mark "AUTO" are displayed in the on-body display unit OB. The flag set state FC13, similar to the state FC4, indicates a state where the preliminary flash firing flag Fflp is indicative of unexecution of the preliminary flash firing and the flash mode flag Ffla is indicative of the automatic flash mode (Fflp=0, Ffla=1). In this state, the indicator 62 and mark "AUTO" are displayed in the on-body display unit OB. The display manners of the flag set states FC11 to FC13 are also determined in accordance with TABLE-1.

Figure 66:
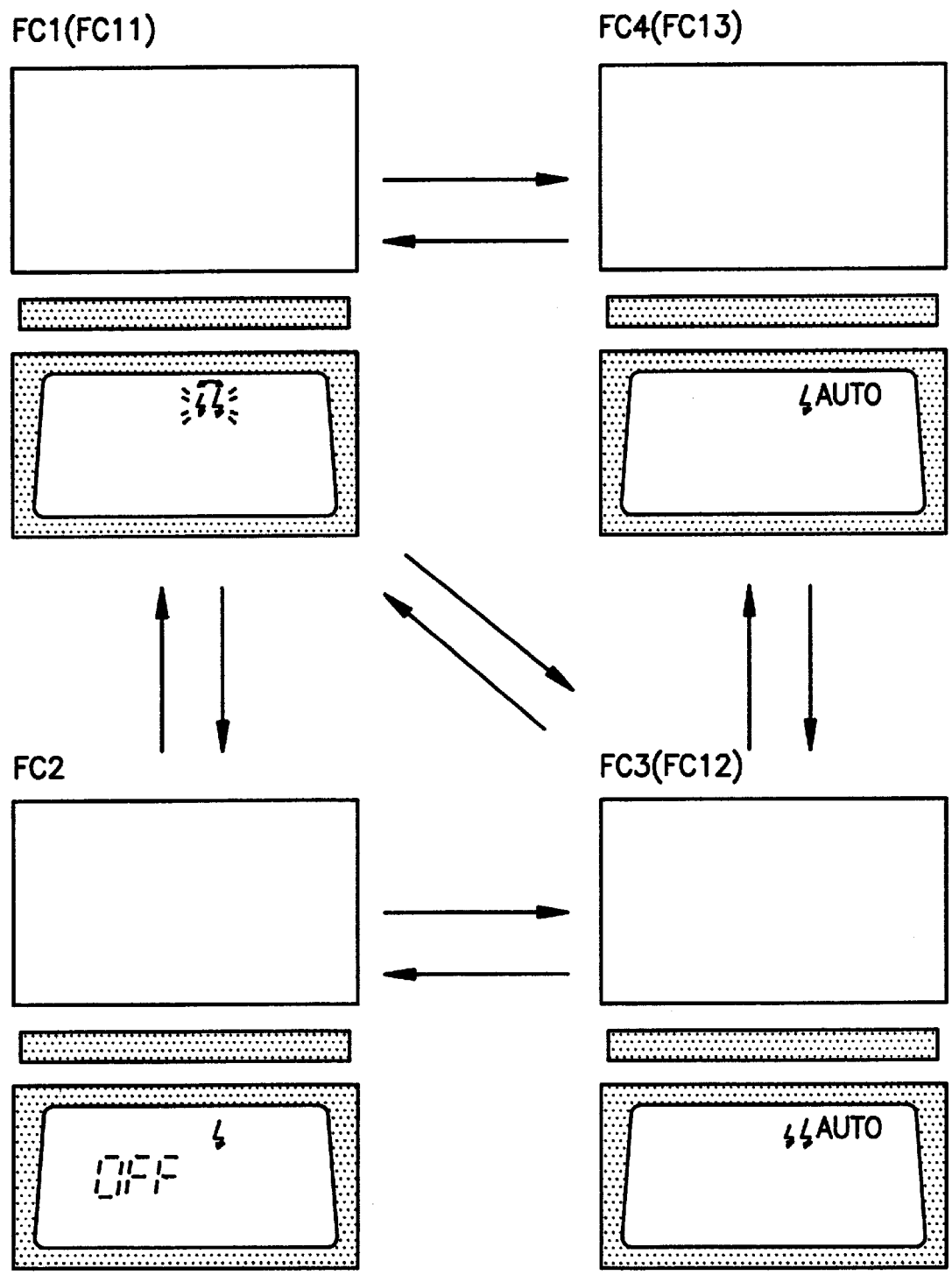
FIGS. 66 and 67 are diagrams showing display manners of respective flag set states in the "Flash Mode Setting Routine"

FIG. 66 shows display manners of the respective flag set states of Steps #360 and #362. As will be apparent from this figure, the displays corresponding to the respective flag set states are made only in the on-body display unit OB.

If the content of the mode register MD is other than P-mode; A-mode, S-mode or M-mode (NO in Step #356), this subroutine proceeds to Step #364 in which flag set states FC21 to FC23 are cyclically changed over, each time the control dial is operated, according to its operated direction.

The flag set state FC21, similar to the state FC11, indicates a state where the flash mode flag Ffla is indicative of the wireless flash mode (Ffla=2). In this state, the indicators 61, 62 are alternately or merely displayed on and off in the on-body display unit OB. The flag set state FC22 indicates a state where the preliminary flash firing flag Fflp is indicative of execution of the preliminary flash firing and the flash mode flag Ffla is indicative of the forcible flash mode (Fflp=1, Ffla=0). In this state, the indicators 61, 62 are displayed in the on-body display unit OB. The flag set state FC23 indicates a state where the preliminary flash firing flag Fflp is indicative of unexecution of the preliminary flash firing and the flash mode flag Ffla is indicative of the forcible flash mode (Fflp=0, Ffla=0). In this state, only the indicator 62 is displayed in the on-body display unit OB.

Figure 67:
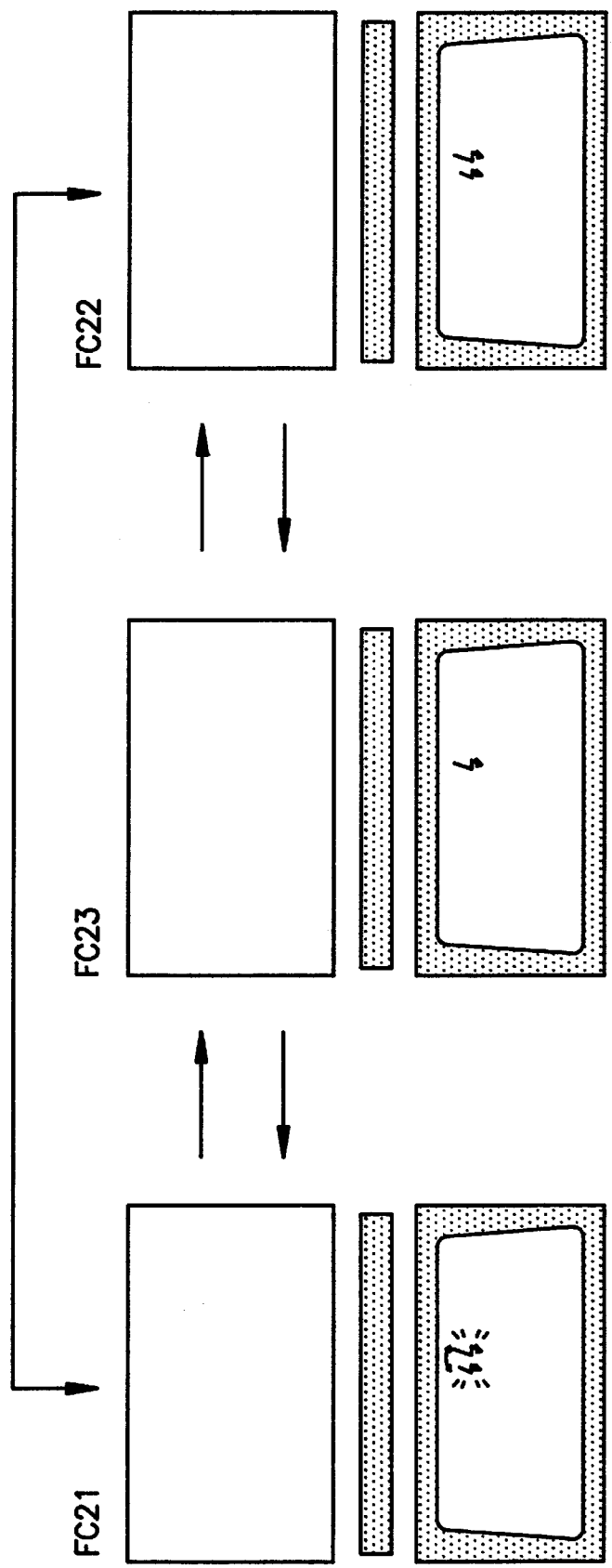

FIG. 67 shows display manners of the respective flag set states of Step #364. As will be apparent from this figure, the displays corresponding to the respective flag set states are made only in the on-body display unit OB.

In Steps #360, #362, and #364, the flag set states are changed cyclically in the following order: FC1→FC2→FC3→FC4→FC1 when the control dial Sf or Sr is turned to the right, while changed cyclically in the reverse order: FC4→FC3→FC2→FC1→FC4 when the control dial is turned to the left.

After the display corresponding to the flag set state is made in Step #360, #362 or #364, the timer T1 is restarted in Step #366. In Step #368, it is checked whether 4 seconds has been elapsed following the start of the timer T1. While the timer T1 is on the way to measure 4 seconds, this subroutine waits for further control dial operation. However, upon lapse of 4 seconds, this subroutine returns to Step #182 after the flag Fflm is reset to 0 in Step #369.

Figure 29:
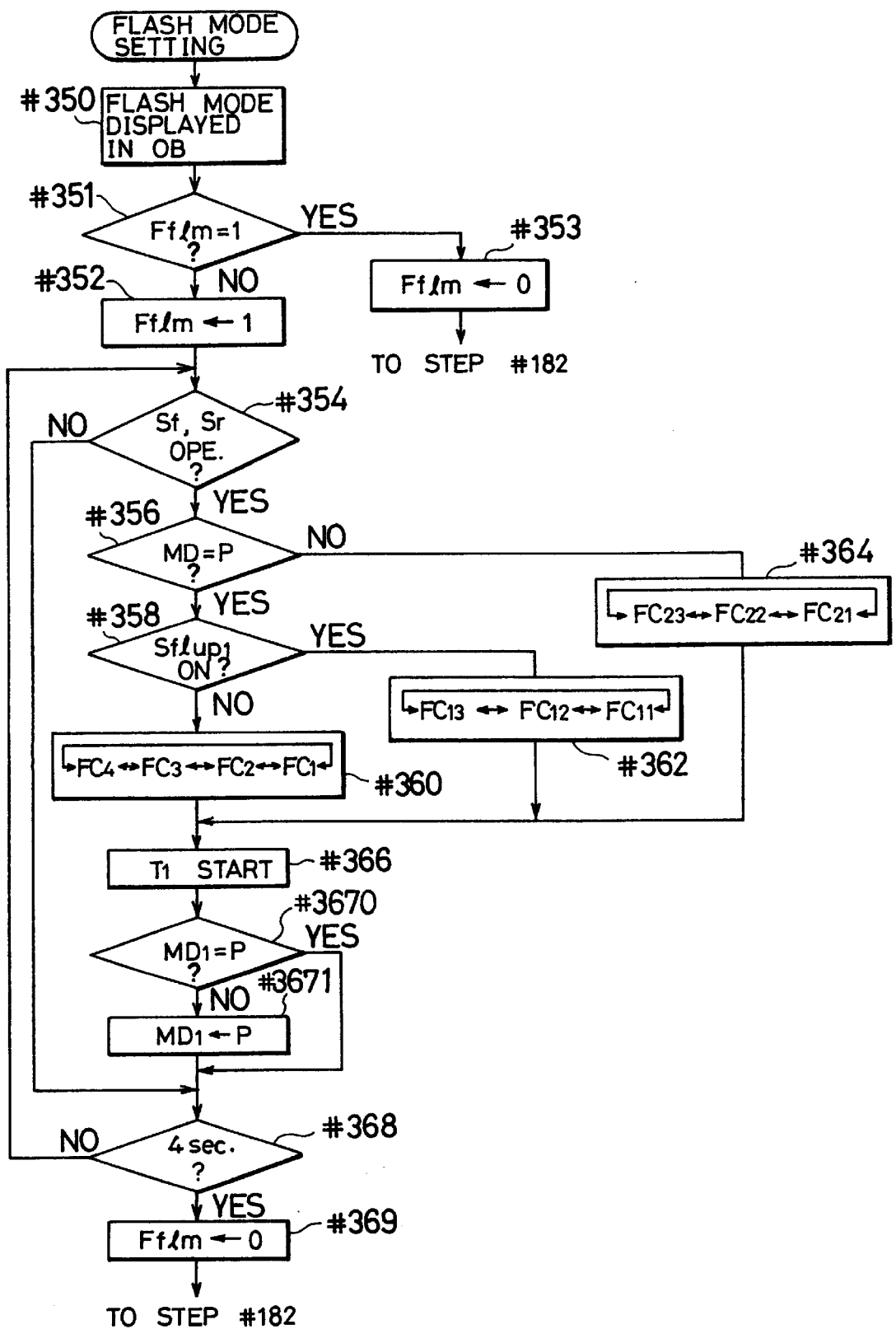
FIG. 29 is a flow chart showing another "Flash Mode Setting Routine"

Also, it may be appreciate to replace the "Flash Mode Setting Routine" shown in FIG. 28 with another "Flash Mode Setting Routine" shown in FIG. 29 in which Step #355 of the subroutine of FIG. 28 is eliminated and new Steps #3670 and #3671 are added between Step #366 and Step #368 of the subroutine of FIG. 28. In the subroutine of FIG. 28, the flash mode cannot be changed in PA-mode and PS-mode. However, in another subroutine of FIG. 29, the flash mode can be changed even in PA-mode and PS-mode. If the flash mode is changed, PA-mode and PS-mode are canceled. Specifically, in Step #3670, it is discriminated whether the content of the shift mode register MD1 is P-mode. If the content of the shift mode register MD1 is either PA-mode or PS-mode (NO in Step #3670), the shift register MD1 is changed to P-mode in Step #3671, i.e., PA-mode or PS-mode is canceled. If the content of the mode shift register MD1 is P-mode (YES in Step #3670), this subroutine proceeds to Step #368.

Referring back to FIGS. 19A and 19B, it is discriminated whether the film speed button Siso is in the ON state in Step #182. If the button Siso is in the OFF state (NO in Step #182), this subroutine proceeds to Step #186 after the flag Fisom is reset to 0 in Step #183. On the other hand, if the button Siso is in the ON state (YES in Step #182), a "Film Speed Setting Routine" is executed in Step #184.

Figure 30:
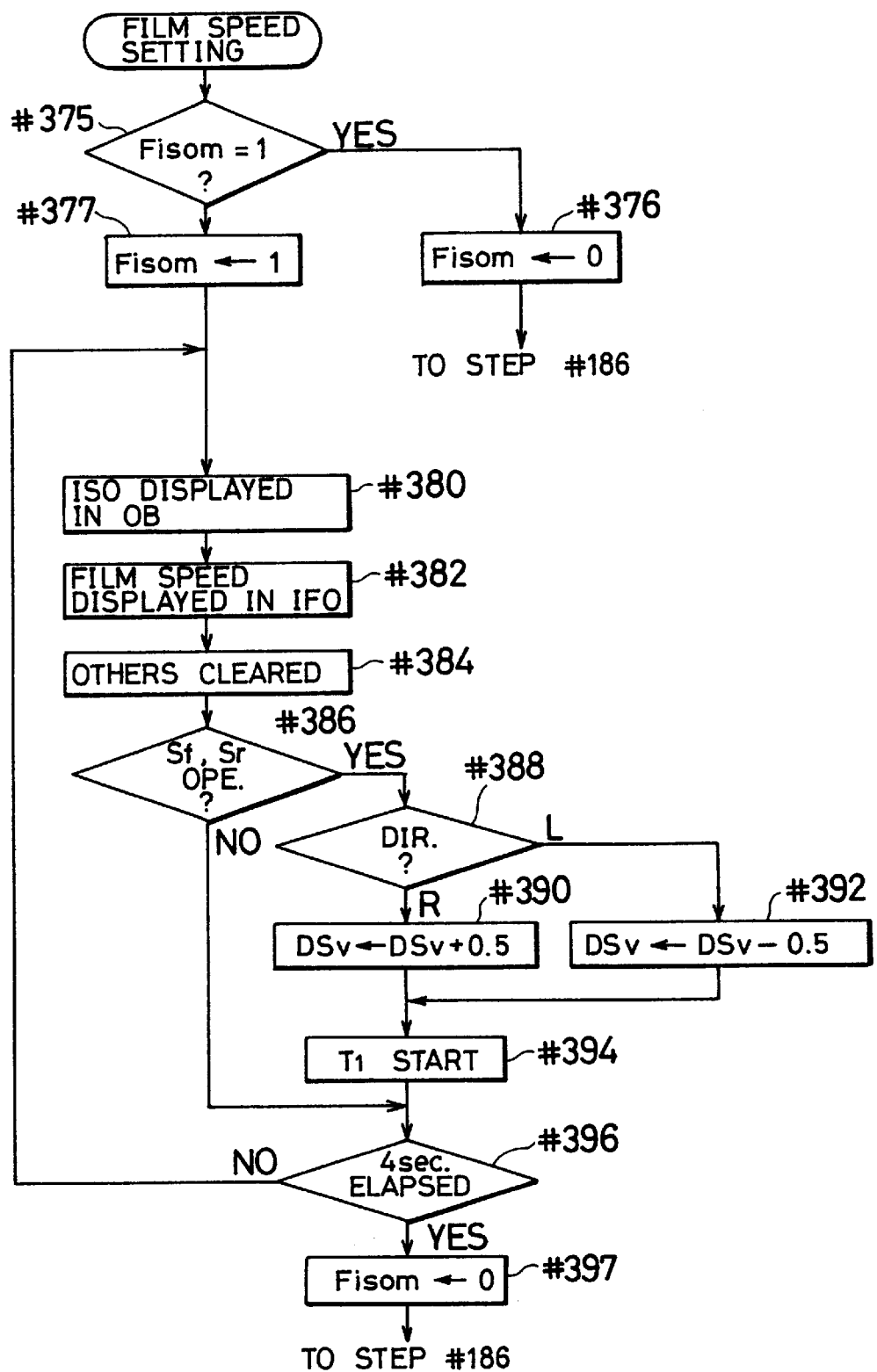
FIG. 30 is a flow chart showing a "Film Speed Setting Routine"

FIG. 30 is a flow chart showing the "Film Speed Setting Routine" executed in Step #184. In this subroutine, firstly, in Step #375, it is discriminated whether the flag Fisom is set to 1, i.e., whether a film speed has been set. When set to 1, this subroutine proceeds to Step #376 in which the flag Fisom is reset to 0, and returns to Step #186. This enables escaping from the "Film Speed Setting Routine" when a film speed has been already set. On the other hand, when not set to 1, this subroutine proceeds to Step #377 in which the flag Fisom is set to 1, and proceeds to Step #380 in which the mark "ISO" and film speed are displayed in the on-body display unit OB. Then, in Step #382, the film speed are displayed in the out-of-frame display unit IFO. The film speed is calculated by adding a sensitivity adjustment amount DSv to the film sensitivity Sv, and the calculated film speed is displayed. In Step #384, all the indications except the mark "ISO" and film speed are cleared in the displayed units IFI, IFO and OB. Subsequently, it is discriminated whether either the front or rear control dial Sf or Sr has been operated in Step #386. It should be noted that no distinction is made between the front and rear control dials in discriminating the control dial operation. Accordingly, the processing carried out when the front control dial Sf is operated is the same as the one carried out when the rear control dial Sr is operated. If neither of the control dials has been operated (NO in Step #386), this subroutine proceeds to Step #396 in which it is discriminated whether 4 seconds have been elapsed following the start of the timer T1 in Step #162. Upon lapse of 4 seconds in Step #396, this subroutine returns to Step #186 after the flag Fisom is reset to 0 in Step #397.

On the other hand, if either of the control dial has been operated (YES in Step #386), the operated direction thereof is discriminated in Step #388. If the control dial is turned to the right, the sensitivity adjustment amount DSv is increased by 0.5 EV in Step #390 each time the control dial is operated. On the contrary, if the control dial is turned to the left, the sensitivity adjustment amount DSv is decreased by 0.5 EV in Step #392 each time the control dial is operated.

Upon adjusting the sensitivity adjustment amount DSv, the timer T1 is restarted in Step #394. This subroutine recycles the aforementioned Steps #380 to #394 until the timer T1 measures 4 seconds.

Referring back to FIGS. 19A and 19B, it is discriminated whether the card adjustment button Scadj is in the ON state in Step #186. If the button Scadj is in the OFF state (NO in Step #186), this routine proceeds to Step #190. If, on the other hand, the button Scadj is in the ON state (YES in Step #186), a "Function Expansion Card Setting Routine" is executed in Step #188.

Figure 31A:
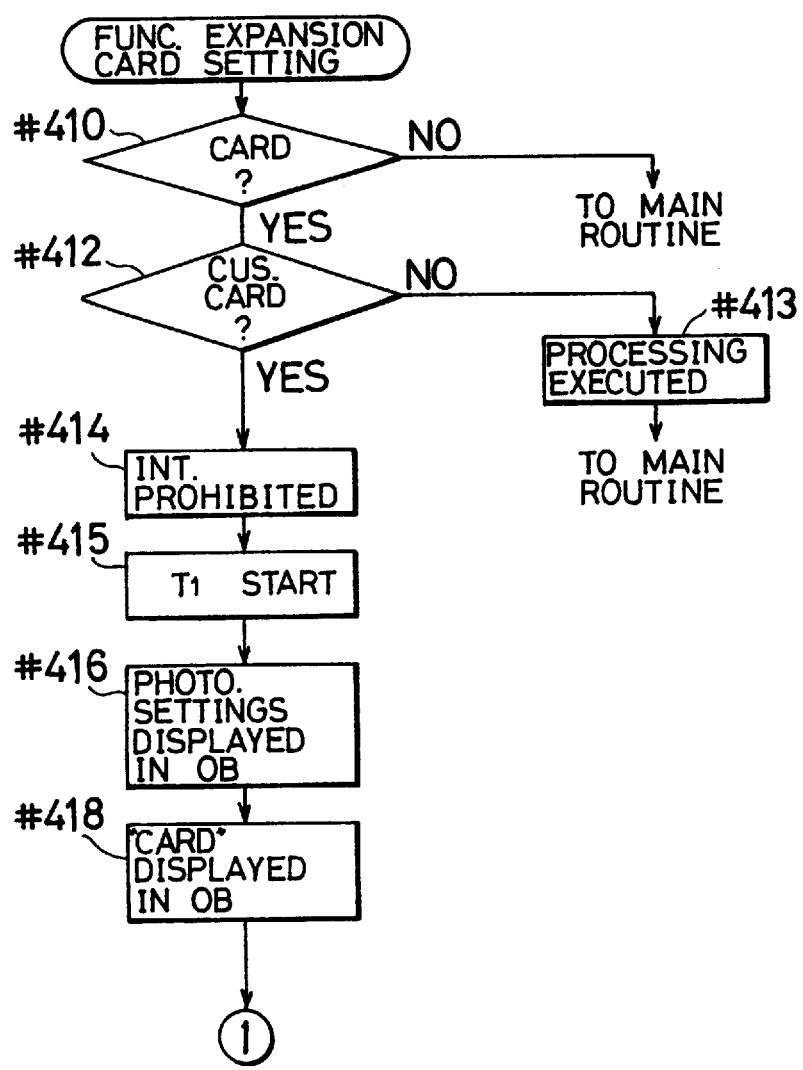
FIGS. 31A and 31B are flow charts showing a "Function Expansion Card Setting Routine"
Figure 31B:
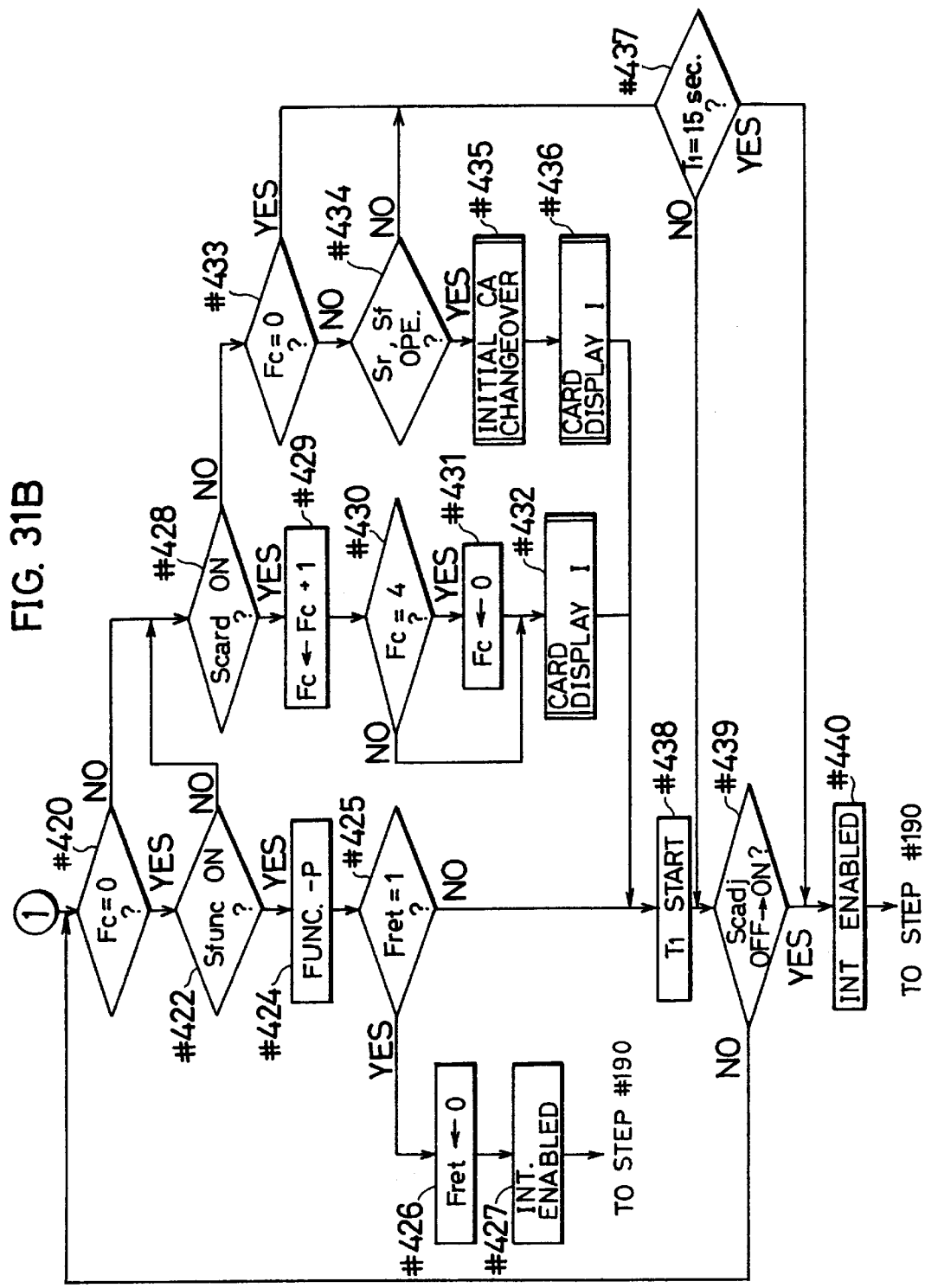

FIGS. 31A and 31B are flow charts showing the "Function Expansion Card Setting Routine." In this subroutine, it is first discriminated whether any function expansion card is mounted in the card holder 25 in Step #410. The camera is constructed such that the presence or absence of the function expansion card mounted in the card holder 25 can be automatically detected. For example, a movable armature may be disposed in the slit of the holder 25 to which the card is inserted. The movable armature is caused to move upon contact with the card inserted to the holder 25 and thereby comes to contact with a fixed armature provided in the holder 25. The insertion of the card to the card holder 25 may be automatically detected upon contact of the movable armature with the fixed armature. Alternatively, the camera may be provided with a card mount button or the like. This button is manually turned on when the card is mounted in the holder 25. The presence of the card in the holder 25 may be detected in accordance with an ON-signal from the card mount button.

If no function expansion card is mounted (NO in Step #410), the interrupt routine ends and returns to any possible step in the main routine. On the other hand, if any function expansion card is mounted (YES in Step #410), it is discriminated whether the mounted card is a customized card in Step #412. If the mounted card is other than the customized card (NO in Step #412), a processing according to the type of the mounted card (stored contents) is executed in Step #413. Then, this subroutine returns to any possible step in the main routine. In this embodiment, description is not given to processings in connection with function expansion cards other than the customized card.

If the customized card is mounted in the holder 25 (YES in Step #412), the other interrupt routines are prohibited in Step #414 and the timer T1 is started in Step #415. Subsequently, the current photographing settings and the mark "CARD" are displayed in the on-body display unit OB respectively in Steps #416 and #418. Subsequently, it is discriminated whether the flag Fc is set to 0 in Step #420. If the flag Fc is set to 0, i.e. the initial values are allowed to be changed (YES in Step #420), it is discriminated whether the function button Sfunc is in the ON state in Step #422. If the button Sfunc is in the ON state (YES in Step #422), a "Function-P Routine" is executed in Step #424.

Figure 32:
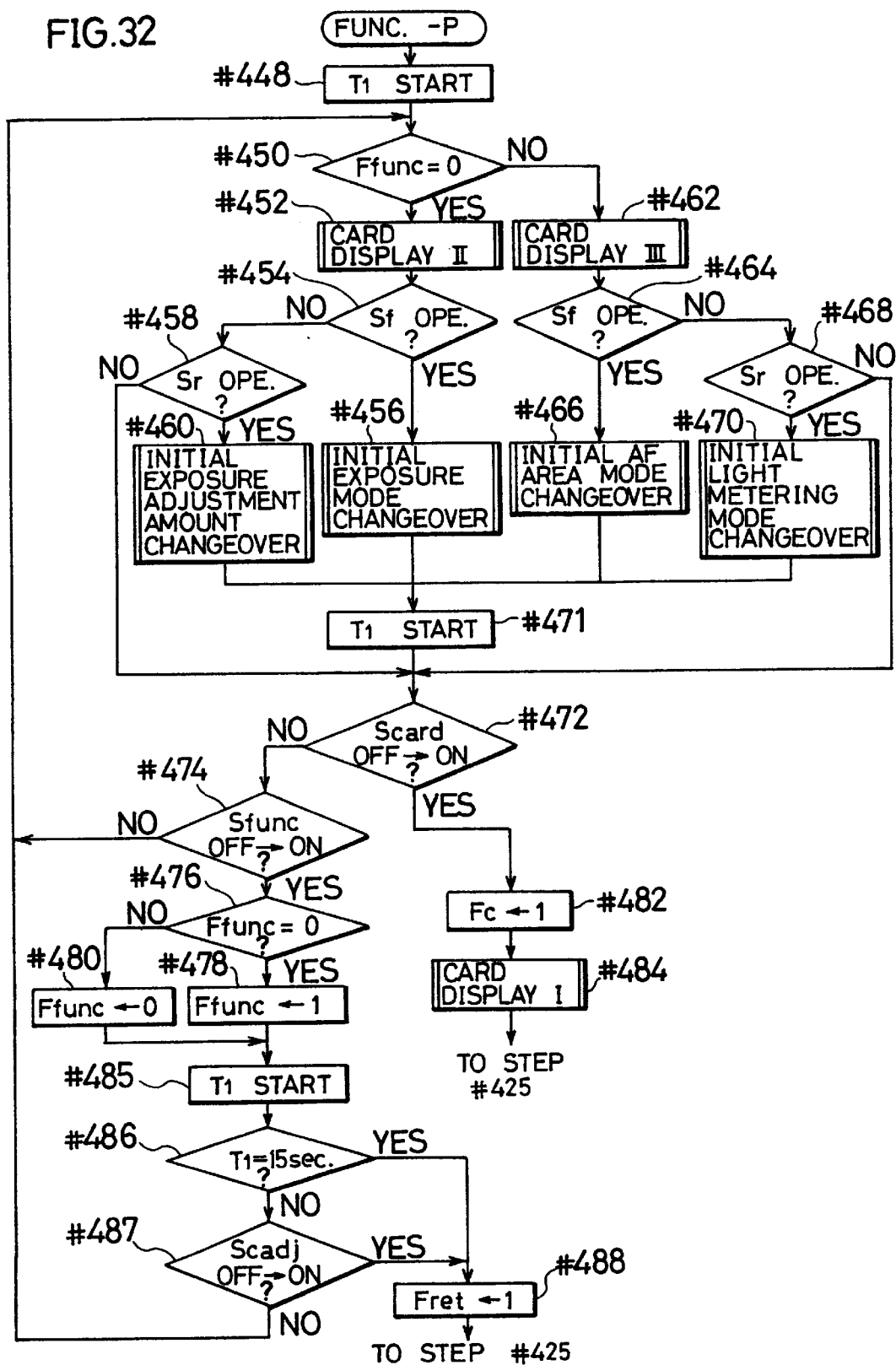
FIG. 32 is a flow chart showing a "Function-P Routine"

FIG. 32 is a flow chart showing the "Function-P Routine." This subroutine is executed to change the initial values read from the customized card. Firstly, the timer T1 is started in Step #448 to render escape from the "Function-P Routine" after lapse of a predetermined time, e.g., 15 seconds in this embodiment. Subsequently, it is discriminated whether the function flag Ffunc is set at 0 in Step #450. If the flag Ffunc is set at 0 (YES in Step #450), a "CARD Display Routine II" is executed in Step #452.

Figure 33:
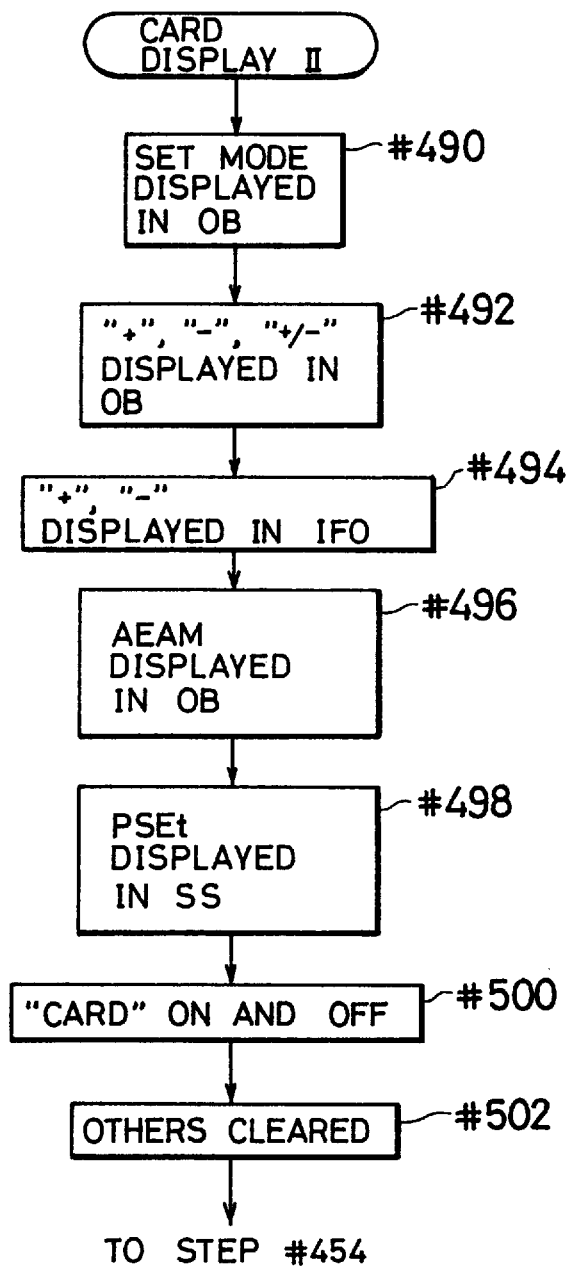
FIG. 33 is a flow chart showing a "CARD Display Routine II"

FIG. 33 is a flow chart showing the "CARD Display Routine II." In this subroutine, the contents corresponding to the state of the function flag Ffunc are displayed in the on-body display unit OB in Steps #490, #492. Specifically, the set exposure mode is displayed in the on-body display unit OB in Step #490. In addition, any of "+," "−" and "±" corresponding to the set exposure adjustment amount is displayed in the exposure adjustment indicator of the on-body display unit OB in Step #492. Subsequently, in Step #494, either "+" or "−" corresponding to the mark displayed in Step #492 is displayed in the out-of-frame display unit IFO unless the exposure adjustment amount is 0. The exposure adjustment amount AEAM is displayed in the AV segment unit of the on-body display unit OB in Step #496, and a mark "PSEt" is displayed in the SS segment unit in Step #498 to show that a customized card in connection with program setting is set and being driven. "t" in the indication "PSEt" is displayed in a simplified manner using segments Sg1 to Sg4 (see FIG. 6) of the SS segment unit. In Step #500, the mark "CARD" indicative of the mounting of the function expansion card is displayed on and off in the on-body display unit OB. Consequently, all the indications except those displayed in Steps #490 to #500 are cleared in Step #502 and this subroutine returns to Step #454.

Referring back to FIG. 32, it is discriminated whether the front control dial Sf has been operated in Step #454. If the dial Sf has been operated (YES in Step #454), an "Initial Exposure Mode Changeover Routine" is executed in Step #456.

Figure 34:
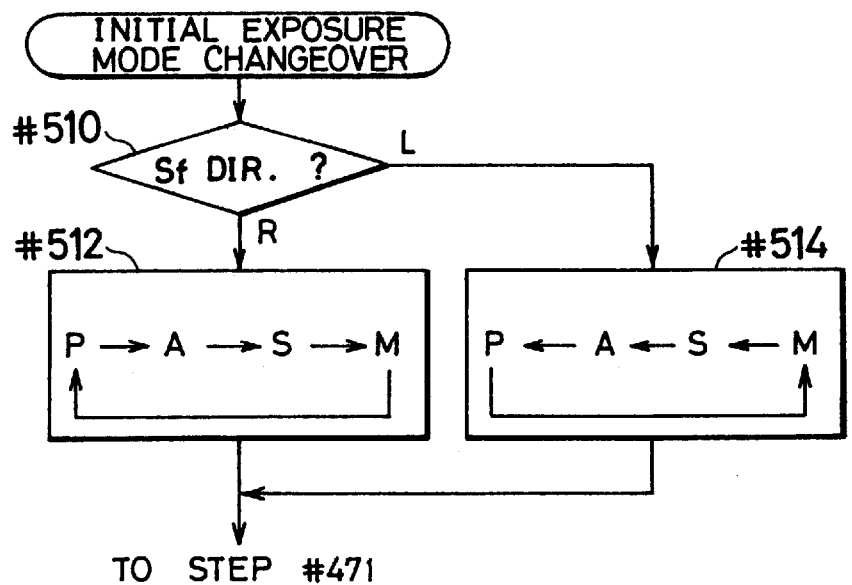
FIG. 34 is a flow chart showing an "Initial Exposure Mode Changeover Routine"

FIG. 34 is a flow chart showing the "Initial Exposure Mode Changeover Routine." In this subroutine, an initial exposure mode; an exposure mode set when the camera is activated, is changed according to operation of the front control dial Sf. Accordingly, the operated direction of the dial Sf is discriminated in Step #510. Specifically, if the dial Sf is turned to the right, the initial value MDP of the mode register MD is cyclically changed over in the following order: P→A S→M→P in Step #512 each time the dial Sf is operated. On the other hand, if the dial Sf is turned to the left, the initial value MDP of the mode register MD is cyclically changed over in the following order: M→S→A→P→M in Step #514 each time the dial Sf is operated. Consequently, this subroutine returns to Step #471.

Referring back to FIG. 32, unless the front control dial Sf has been operated (NO in Step #454), it is discriminated whether the rear control dial Sr has been operated in Step #458. Unless the dial Sr has been operated (NO in Step #458), this subroutine proceeds to Step #472. If, on the other hand, the dial Sr has been operated (YES in Step #458), an "Initial Exposure Adjustment Amount Changeover Routine" is executed in Step #460.

Figure 35:
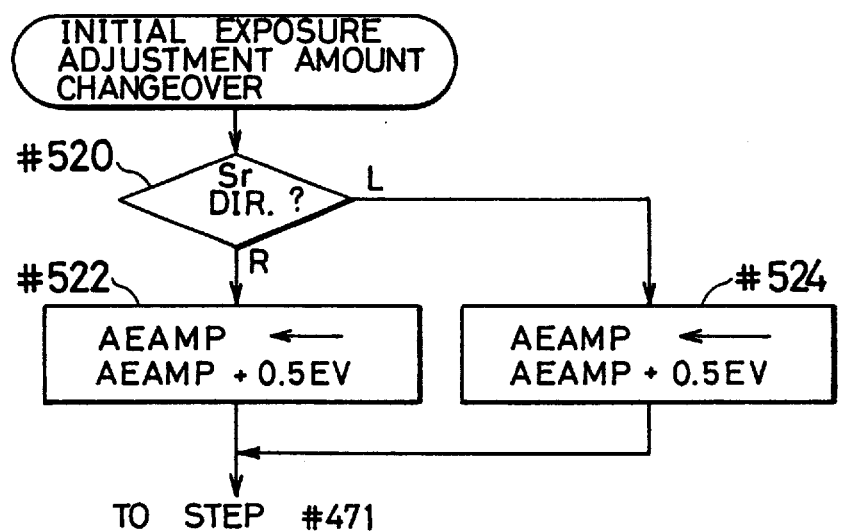
FIG. 35 is a flow chart showing an "Initial Exposure Adjustment Amount Changeover Routine"

FIG. 35 is a flow chart showing the "Initial Exposure Adjustment Amount Changeover Routine." In this subroutine, the operated direction of the rear control dial Sr is discriminated in Step #520. Specifically, if the dial Sr is turned to the right, the initial exposure adjustment amount AEAMP is increased by 0.5 EV in Step #522 each time the dial Sr is operated. On the other hand, if the dial Sr is turned to the left, the initial exposure adjustment amount AEAMP is decreased by 0.5 EV in Step #524 each time the dial Sr is operated. Consequently, this subroutine returns to Step #471.

Referring back to FIG. 32, if the function flag Ffunc is set at 1 (NO in Step #450), a "CARD Display Routine III" is executed in Step #462.

Figure 36:
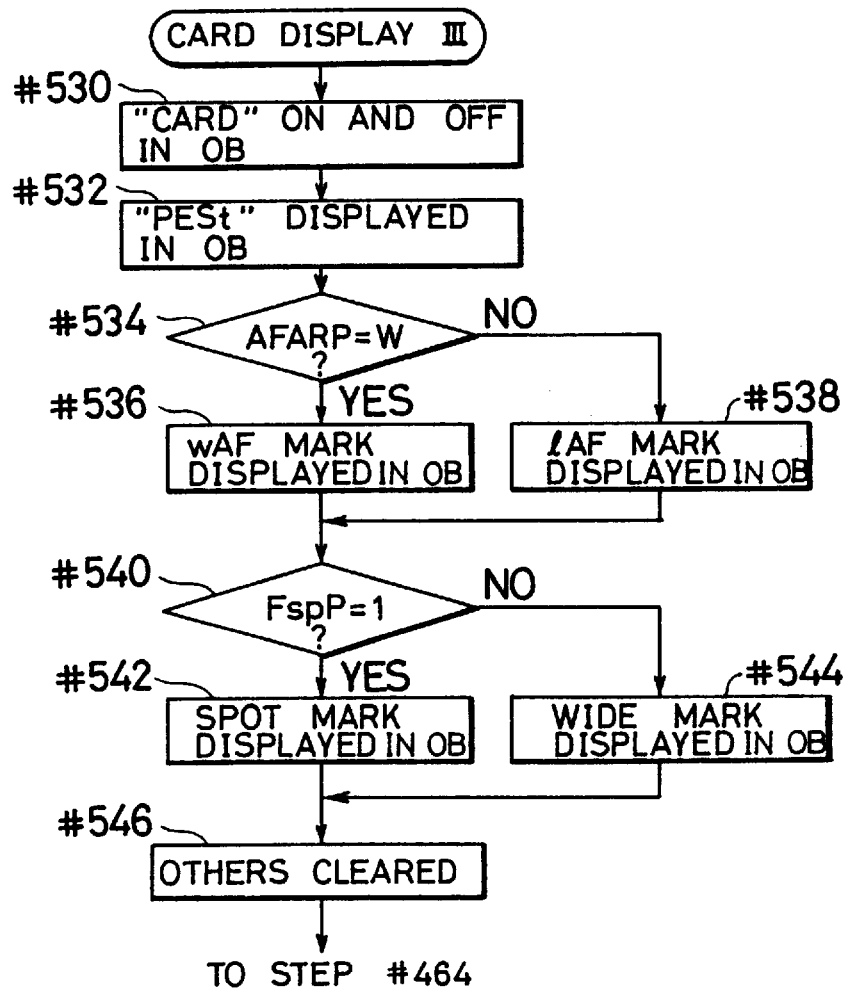
FIG. 36 is a flow chart showing a "CARD Display Routine III"

FIG. 36 is a flow chart showing the "CARD Display Routine III." In this subroutine, the mark "CARD" is displayed on and off in the on-body display unit OB in Step #530 and the indication "PSEt" is displayed in the SS segment unit of the on-body display unit OB in Step #532. Subsequently, it is discriminated whether the initial value AFARP of the AF area register AFAR is set at W, i.e. the initial AF area is wide AF area in Step #534. If the initial AF area is wide AF area (YES in Step #534), the wide AF mark 67 is displayed in the on-body display unit OB in Step #536. On the other hand, if initial AF area is any one of the local AF areas (NO in Step #534), the local AF mark 66 is displayed in the on-body display unit OB.

Subsequently, in Step #540, it is discriminated whether the flag FspP is set at 1, i.e. the spot metering mode is set as an initial light metering mode. If the spot metering mode is set as an initial light metering mode (YES in Step #540), the spot metering mark 73 is displayed in the on-body display unit OB in Step #542. On the other hand, if the wide metering mode is set as an initial light metering mode (NO in Step #540), the wide metering mark 74 is displayed in the on-body display unit OB in Step #544. Consequently, all the indications except those displayed in Steps #530 to #544 are cleared in Step #546 and this subroutine returns to Step #464.

Referring back to FIG. 32, it is discriminated whether the front control dial Sf has been operated in Step #464. If the dial Sf has been operated (YES in Step #464), an "Initial AF Area Mode Changeover Routine" is executed in Step #466.

Figure 37:
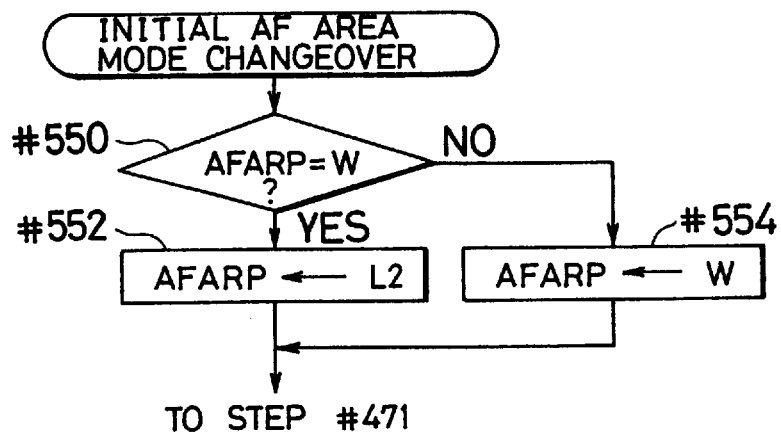
FIG. 37 is a flow chart showing an "Initial AF Area Mode Changeover Routine"

FIG. 37 is a flow chart showing the "Initial AF Area Mode Changeover Routine." In this subroutine, it is first discriminated whether the content of the register AFARP is W, i.e. the wide AF area mode is set as an initial AF area mode in Step #550. If the wide AF area mode is set as an initial AF area mode (YES in Step #550), the content of the register AFARP is changed to L2 indicative of the center local AF area in Step #552 (see FIG. 5). On the other hand, if the local AF area mode is set as an initial AF area mode (NO in Step #550), the content of the register AFARP is changed to W in Step #554. Then, this subroutine returns to Step #471. In this way, the initial AF area mode is alternately changed each time the front control dial Sf is operated.

Referring back to FIG. 32, unless the front control dial Sf has been operated (NO in Step #464), it is further discriminated whether the rear control dial Sr has been operated in Step #468. Unless the dial Sr has been operated (NO in Step #468), this subroutine proceeds to Step #471. On the other hand, if the dial Sr has been operated (YES in Step #468), an "Initial Light Metering Mode Changeover Routine" is executed in Step #470.

Figure 38:
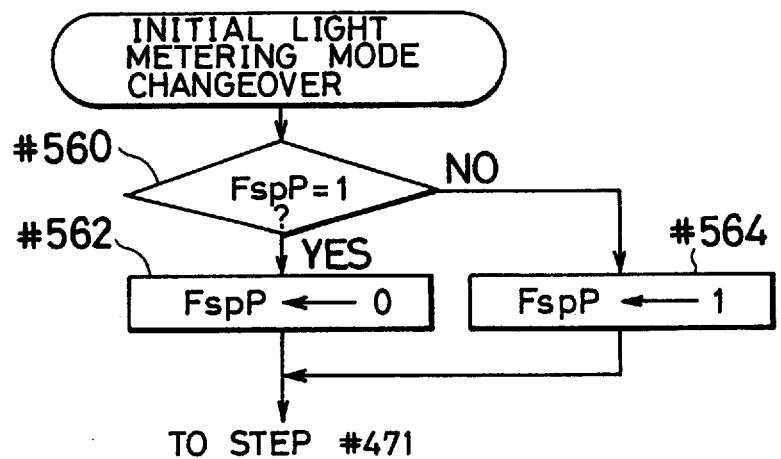
FIG. 38 is a flow chart showing an "Initial Light Metering Mode/Changeover Routine"

FIG. 38 is a flow chart showing the "Initial Light Metering Mode Changeover Routine." In this subroutine, it is first discriminated whether the flag FspP is set at 1, i.e. the spot metering mode is set as an initial light metering mode in Step #560. If the spot metering mode is set as an initial light metering mode (YES in Step #550), the flag FSPP is set to 0 in Step #562. On the other hand, if the wide metering mode is set as an initial light metering mode (NO in Step #550), the flag FspP is set to 1 in Step #564. Then, this subroutine returns to Step #471. In this way, the initial light metering mode is alternately changed each time the rear control dial Sr is operated.

Referring back to FIG. 32, upon completion of the changing of initial modes in Steps #456, #460, #466 and #470, the timer T1 is started in Step #471. Then, it is discriminated whether the card button Scard has been just turned on, i.e. the operator has selected a mode other than the initial value changeover mode in Step #472. If the card button scard is in the OFF state (NO in Step #472), it means that the initial value changeover mode is still effective. Accordingly, it is discriminated whether the function button Sfunc has been just turned on in Step #474. If the button Sfunc has not been turned on (NO in Step #474), this subroutine returns to Step #450. If the button Sfunc has been just turned on (YES in Step #474), it is further discriminated whether the function flag Ffunc is set at 0 in Step #476. If set to 0 (YES in Step #476), the flag Ffunc is set to 1 in Step #478. If set to 1 (NO in Step #476), the flag Ffunc is set to 0 in Step #480. Thereafter, this subroutine proceeds to Step #485 in which the timer T1 is started, and in Step #486 in which it is discriminated whether 15 seconds have been elapsed following the start of the timer T1. Upon lapse of 15 seconds (YES in Step #486), this subroutine returns to Step #425 after a flag Fret is set to 1 in Step #488. The flag Fret is adapted for discriminating whether the "Function-P Routine" reaches a condition returning to the "Main Interrupt Routine", specifically, whether 15 seconds have been elapsed after the start of the timer T1, or whether the card adjustment button has been turned on. The flag Fret is indicative of the state of reaching the returning condition when set to 1 and the state of not reaching the returning conditions when set to 0. When not measuring 15 seconds (NO in Step #486), this subroutine proceeds to Step #487 in which it is discriminated whether the card adjustment button Scadj has been turned on. When turned on (YES in Step #487), this subroutine proceeds to Step #488. When not turned on (NO in Step #487), this subroutine returns to Step #450. In this way, the state of the flag Ffunc is alternately changed each time the function button Sfunc is turned on.

On the other hand, if the card button Scard has been just turned on (YES in Step #472), the flag Fc is set to 1 in Step #482 on the assumption that a mode other than the initial value changeover mode has been selected. Consequently, a "CARD Display Routine I" is executed in Step #484, and this subroutine returns to Step #425.

Figure 39:
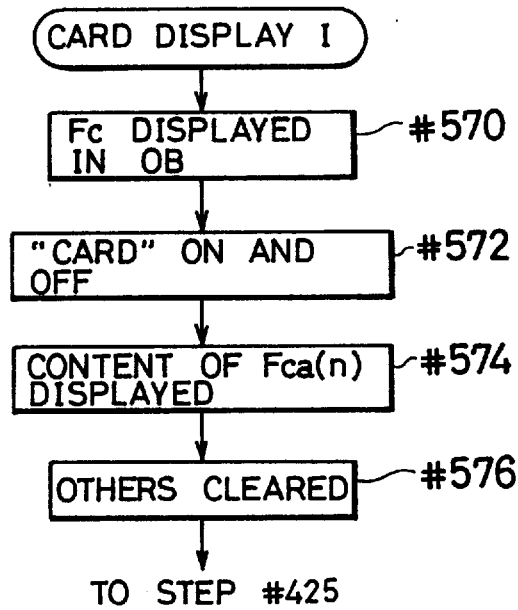
FIG. 39 is a flow chart showing a "CARD Display Routine I"

FIG. 39 is a flow chart showing the "CARD Display Routine I." In this subroutine, the content of the flag Fc, namely any one of "1," "2," and "3," is displayed in the SS segment unit of the on-body display unit OB in Step #570. In Step #572, the mark "CARD" is displayed on and off in the on-body display unit OB. Further, the content of the flag Fca(n) is displayed using one of the digits provided in the film loading indicator 65 in Step #574. It should be understood that (n) of the flag Fca(n) denotes the content of the flag Fc. Consequently, all the indications except those displayed in Steps #570 to #574 are cleared in Step #576 and this subroutine returns to Step #425.

Referring back to FIGS. 31A and 31B, in Step #425, it is discriminated whether the flag Fret is set to 1, i.e., whether the returning condition has been reached. When the flag Fret is not set to 1, this subroutine proceeds to Step #438. On the other hand, when the flag Fret is set to 1, this subroutine proceeds to Step #426 in which the flag Fret is reset to 0. Then, this subroutine returns to Step #190 after the interrupt routines are enabled in Step #427.

Next, if the content of the flag Fc is other than 0 (NO in Step #420), it is discriminated whether the card button Scard is in the ON state in Step #428. If the button Scard is in the ON state (YES in Step #428), the content of the flag Fc is incremented by one in Step #429. In Step #430, it is discriminated whether the flag Fc has been incremented to 4. If Fc<4 (NO in Step #430), this subroutine proceeds directly to Step #432. On the other hand, if Fc=4 (YES in Step #430), the flag Fc is set to 0 in Step #431. In Step #432, it is executed the "CARD Display Routine I" described above.

If, on the other hand, the card button is in the OFF state (NO in Step #428), it is discriminated whether the flag Fc is set to 0 in Step #433. If the flag Fc is set to 0 (YES in Step #433), this subroutine proceeds to Step #437 in which it is discriminated whether 15 seconds have been elapsed following the start of the timer T1. Upon lapse of 15 seconds, this subroutine proceeds to Step #440. It should be noted that in this subroutine, the timer T1 is started just after this subroutine is started or after each appropriate operation is completed. Unless any appropriate switch is actuated within 15 seconds after the start of the timer T1, this subroutine returns to Step #190. When not measuring 15 seconds, this subroutine proceeds to Step #439. If the flag set at 1, 2, or 3 (NO in Step #433), it is discriminated whether either of the control dials is being operated in Step #434. If either of the control dials is being operated (YES in Step #434), an "Initial CA Changeover Routine" is executed in Step #435. It should be noted that the initial CA denotes initial states of the flags Fca1, Fca2, and Fca3.

Figure 40:
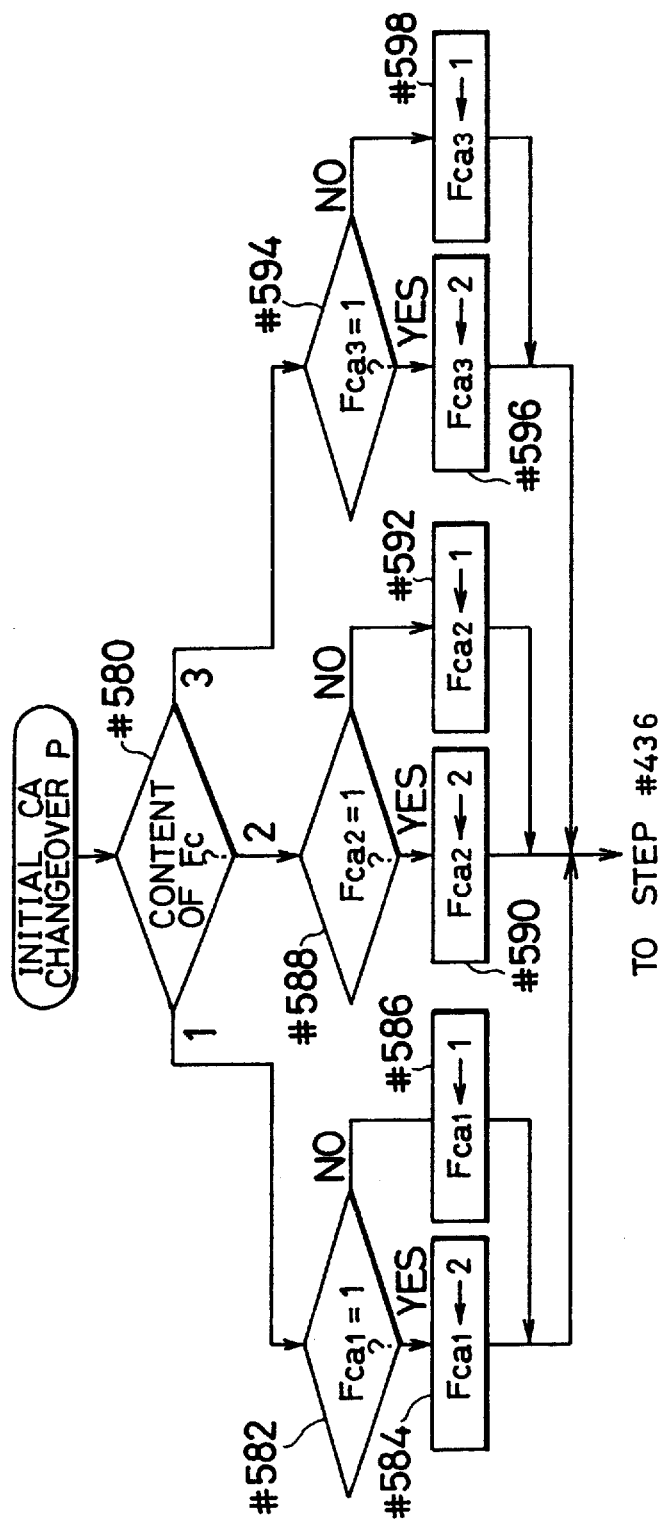
FIG. 40 is a flow chart showing an "Initial CA Changeover Routine"

FIG. 40 is a flow chart showing the "Initial CA Changeover Routine." In this subroutine, the content of the flag Fc is first discriminated in Step #580. If the flag Fc is set at 1, it is discriminated whether the DX mode flag Fca1 is set at 1 in Step #582. If set at 1 (YES in Step #582), the flag Fca1 is set to 2 in Step #584. On the other hand, if set at 2 (NO in Step #582), the flag Fca1 is set to 1 in Step #586. Then, this subroutine returns to Step #436.

If the flag Fc is set at 2, it is discriminated whether the automatic flash pup-up mode flag Fca2 is set at 1 in Step #588. If set at 1 (YES in Step #588), the flag Fca2 is set to 2 in Step #590. On the other hand, if set at 2 (NO in Step #588), the flag Fca2 is set to 1 in Step #592.

Then, this subroutine returns to Step #436.

Further, if the flag Fc is set at 3, it is discriminated whether the eye detection mode flag Fca3 is set at 1 in Step #594. If set at 1 (YES in Step #594), the flag Fca3 is set to 2 in Step #596. On the other hand, if set at 2 (NO in Step #594), the flag Fca3 is set to 1 in Step #598. Then, this subroutine returns to Step #436.

Referring back to FIGS. 31A and 31B, upon completion of execution of the "Initial CA Changeover Routine," the aforementioned "CARD Display Routine I" is executed in Step #436, and this subroutine proceeds to Step #439 after the timer T1 is started in Step #438.

Subsequently, in Step #439, it is discriminated whether the card adjustment button Scadj has been just turned on. If the button Scadj is in the OFF state (NO in Step #439), this subroutine returns to Step #420. If, on the contrary, the button Scadj has been just turned on, this subroutine returns to Step #190 after interrupt routines are enabled in Step #440. As described above, since the initial values of the photographing conditions cannot be changed unless the customized card is mounted, the customized card serves as a switch used when the various initial values are changed. The customized card is detachably mountable to the camera. This eliminates the likelihood that the initial values are inadvertently changed by another person in the case where the camera is lent to him. In view of this, the customized card enables the operator to own a camera suited to his preferences in taking pictures.

The customized card may be fabricated such that the new initial values are written over the old ones therein while the "Function Expansion Card Setting Routine" returns to Step #190. This obviates the need for a troublesome operation to set the initial values each time the "Function Expansion Card Setting Routine" is executed. Further, with the customized card, even if the operator is using a borrowed camera, he is allowed to operate the camera under the photographing conditions suited to his preferences.

Referring back to FIGS. 19A and 19B, it is discriminated whether the back cover switch Sb is in the ON state in Step

190. If the switch Sb is in the OFF state (NO in Step #190), the "Interrupt Routine" returns to the "Main Routine." On the other hand, if the switch Sb is in the ON state (YES in Step #190), an "Sb-ON Routine" is executed in Step #192.

Figure 41:
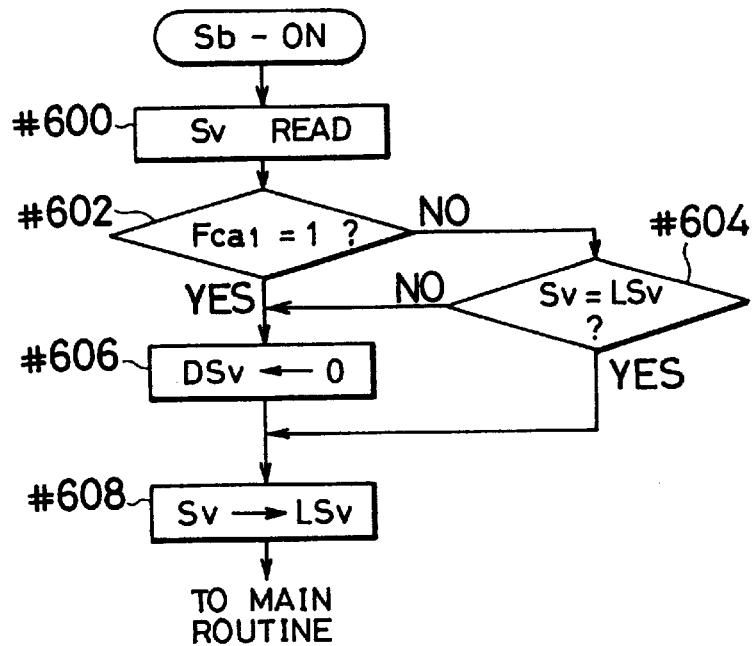
FIG. 41 is a flow chart showing an "Sb-ON Routine"

FIG. 41 is a flow chart showing the "Sb-ON Routine." In this subroutine, firstly, the film sensitivity Sv is read in accordance with the code provided in the suitable position on the outer face of the film cartridge containing the film in Step #600. The read data Sv is stored in a memory provided in the camera main body 20. The reading of the film sensitivity Sv is carried out by the DX circuit 13 in proximity to or in contact with the film cartridge loaded in the camera main body 20 by reading the code representative of the film sensitivity provided in the film cartridge electrically, magnetically or optically. Upon completion of the reading of the film sensitivity Sv, it is discriminated whether the DX mode flag Fca1 is set at 1 in Step #602.

If the DX mode flag Fca1 is set at 2 (NO in Step #602), it is discriminated whether the film sensitivity Sv read in Step #600 is equal to the film sensitivity LSv of the film loaded last time in Step #604. If Sv=LSv (YES in Step #604), the film sensitivity Sv read in this run is stored as the film sensitivity LSv in Step #608, and this subroutine returns to the "Main Routine." On the other hand, if the DX mode flag Fca1 is set at 1 (YES in Step #602) or if Sv≠LSv (NO in Step #604), the sensitivity adjustment amount DSv is reset to 0 in Step #606. Consequently, this subroutine returns to the "Main Routine" after the film sensitivity Sv is stored as the film sensitivity LSv in Step #608. In other words, in the case where the film sensitivity of the film loaded this time is equal to that of the last loaded film when the DX mode flag Fca1 is set at 2, the last sensitivity adjustment amount is continued to be used.

Figure 42:
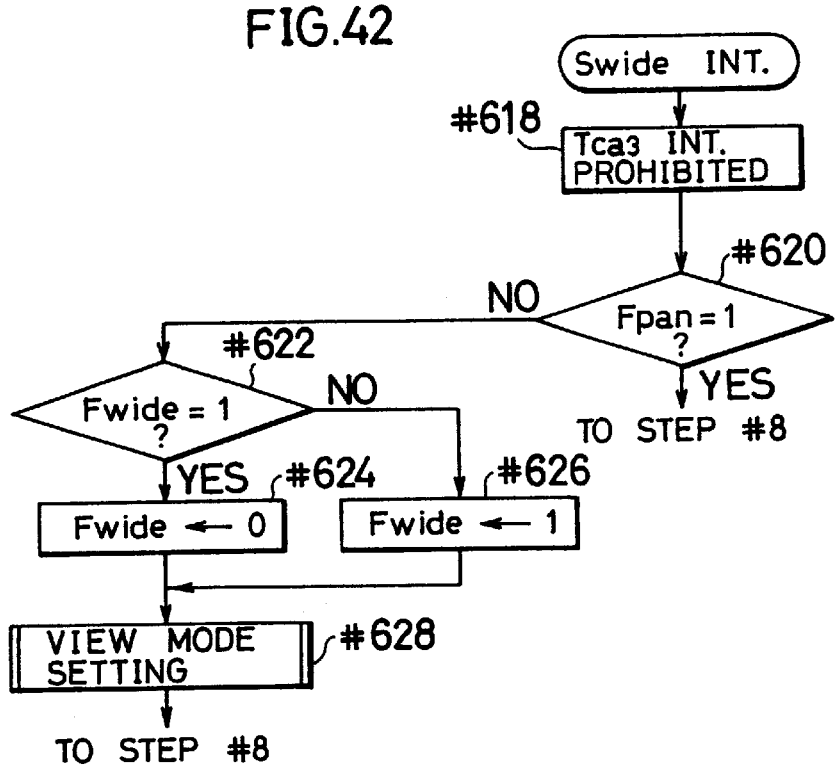
FIG. 42 is a flow chart showing an "Swide Interrupt Routine"

Next, an "Swide Interrupt Routine" will be described with reference to FIG. 42. In this routine, after the "Tca3 Interrupt Routine" is prohibited in Step #618, it is discriminated whether the panorama flag Fpan is set at 1 in Step #620. If the flag Fpan is set at 1, i.e. the masking unit 80 is mounted in the camera main body 20 for the panoramic photography (YES in Step #620), this subroutine returns to Step #8 of the "Main Routine" without setting the wide view mode. If, on the contrary, the flag Fpan is set at 0 (NO in Step #620), it is discriminated whether the wide view flag Fwide is set at 1, i.e. the wide view mode is set, in Step #622. If set at 1 (YES in Step #622), the flag Fwide is set to 0, i.e. the view mode is changed to the normal view mode in Step #624. On the other hand, if set at 0 (NO in Step #622), the flag Fwide is set to 1, i.e. the view mode is changed to the wide view mode in Step #626. Upon completion of the changing of the view mode, a "View Mode Setting Routine" is executed in Step #628. Then, this subroutine returns to Step #8 of the "Main Routine."

Figure 43:
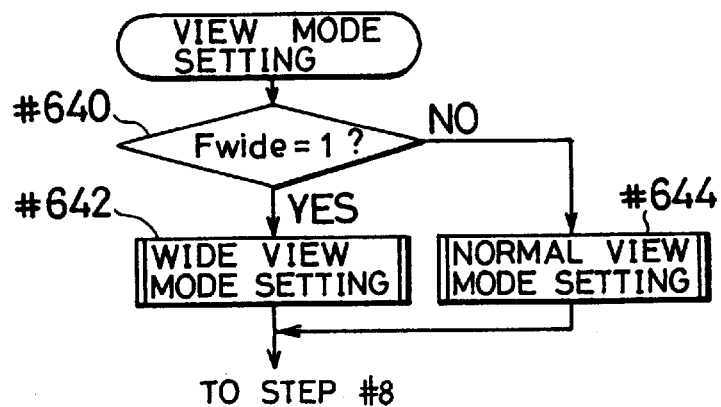
FIG. 43, is a flow chart showing a "View Mode Setting Routine"

FIG. 43 is a flow chart showing the "View Mode Setting Routine." In this subroutine, it is first discriminated whether the wide view flag Fwide is set at 1 in Step #640. If the flag Fwide is set at 1 (YES in Step #640), a "Wide View Mode Setting Routine" is executed in Step #642. On the other hand, if the flag Fwide is set at 0 (NO in Step #642), a "Normal View Mode Setting Routine" is executed in Step #644. Then, this subroutine returns to Step #8 of the "Main Routine."

Figure 44:
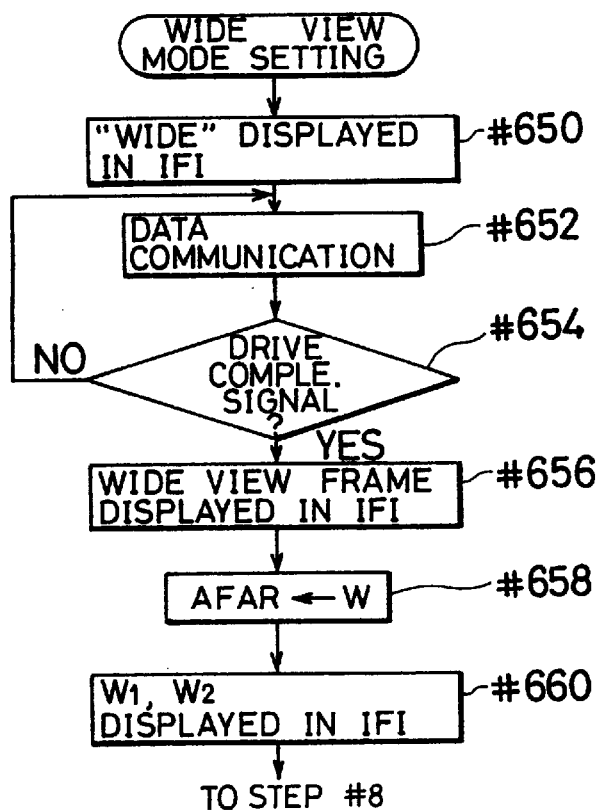
FIG. 44 is a flow chart showing a "Wide View Mode Setting Routine"

FIG. 44 is a flow chart showing the "Wide View Mode Setting Routine." In this subroutine, firstly, the mark "WIDE" is displayed in the in-frame display unit IFI in Step #650. Subsequently, the CPU 1 and lens CPU 2 carry out data communication therebetween in Step #652. Specifically, in this data communication, the CPU 1 sends a signal representative of setting of the wide view mode to the lens CPU 2. Upon receipt of this signal, the taking lens is driven toward the wide-angle limit by a specified amount in the taking lens unit 21 to attain a focal length corresponding to the wide view mode. When the driving of the taking lens is completed, the lens CPU 2 sends a first drive completion signal to the CPU 1 in Step #654. Upon receipt of the first drive completion signal (YES in Step #654), the CPU 1 causes the wide view frame 54 to be displayed in the in-frame display unit IFI in Step #656 to notify the operator looking through the viewfinder that the wide view mode is selected and that the setting thereof is completed.

Thereafter, the AF area register AFAR is forcibly set at W, namely wide AF area, in Step #658. Consequently, either one of the marks W1 and W2 corresponding to the posture of the camera is displayed in the in-frame display unit IFI in Step #660, and this subroutine returns to Step #8 of the "Main Routine."

Figure 45:
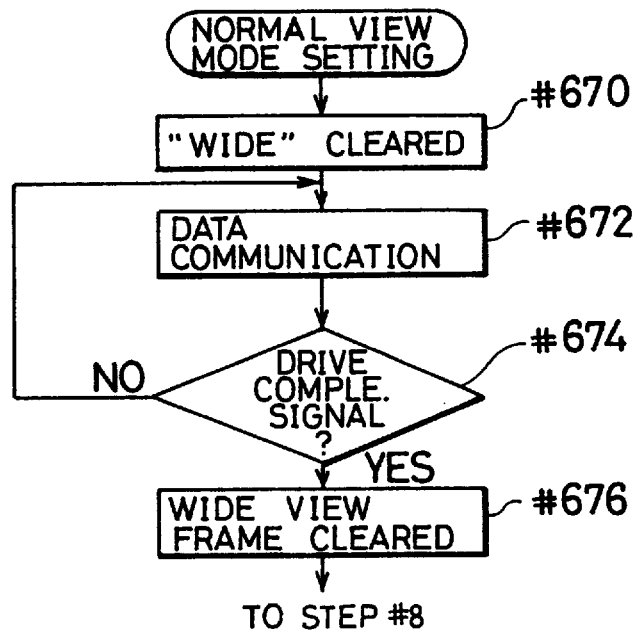
FIG. 45 is a flow chart showing a "Normal View Mode Setting Routine"

FIG. 45 is a flow chart showing the "Normal View Mode Setting Routine." In this subroutine, firstly in Step #670, the display of the mark "WIDE" is cleared in the in-frame display unit IFI if the mark "WIDE" is displayed therein. Subsequently, the CPU 1 and lens CPU 2 carry out data communication therebetween in Step #672. Specifically, in this data communication, the CPU 1 sends a signal representative of setting of the normal view mode to the lens CPU 2. Upon receipt of this signal, the taking lens is driven toward the telephoto limit to attain a focal length corresponding to the normal view mode if the taking lens is in such a position where the wide view is obtained on the viewfinder screen. When the driving of the taking lens is completed, the lens CPU 2 sends a second drive completion signal to the CPU 1 in Step #674. Upon receipt of the second drive completion signal, the CPU 1 causes the display of wide view frame 54 to be cleared in the in-frame display unit IFI in Step #676 to notify the operator that the normal view mode is selected and the setting thereof is completed. Then, this subroutine returns to Step #8 of the "Main Routine." The wide view frame 54 may be displayed off at the same time when the mark "WIDE" is displayed off in Step #670.

FIGS. 68A and 68B show displayed states of the display units IFI, IFO, 23 in the wide view mode and normal view mode respectively. As shown in FIG. 68A, in the wide view mode, the mark "WIDE." wide view frame 54 and horizontal wide AF area mark W1 are displayed in the in-frame display unit IFI. In addition, the background unsharpness indicator is displayed in the display unit IFI. In the display units IFO and OB, the already set photographing conditions are displayed. FIG. 68B shows displayed states of the display units IFI, IFO and OB, which are obtainable when the view size changeover switch Swide is turned on in the state shown in FIG. 68A. In this figure, the displays of the mark "WIDE" and wide view frame 54 are cleared in the display unit IFI.

FIGS. 69A and 69B show displayed states of the display units IFI, IFO and OB in the wide view mode, which are obtainable when the switch S1 is turned off and when it is turned on respectively.

Figure 46:
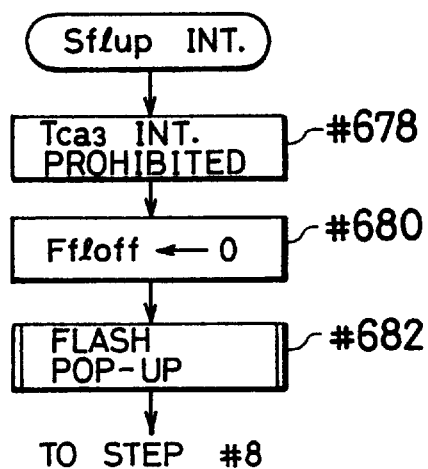
FIG. 46 is a flow chart showing an "Sflup Interrupt Routine"

Next, an "Sflup Interrupt Routine" will be described with reference to FIG. 46. In this routine, first, the "Tca3 Interrupt Routine" is prohibited in Step #678. When the flash pop-up button Sflup is turned on, the temporary prohibition flag Ffloff is reset to 0 in Step #680. Then, a "Flash Pop-up Routine" is executed in Step #682.

Figure 47:
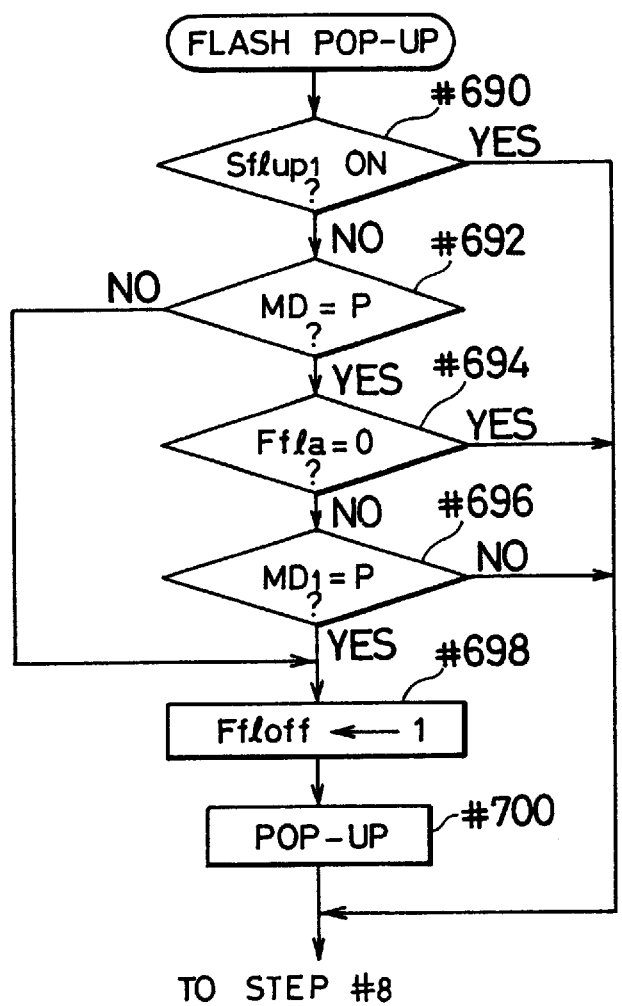
FIG. 47 is a flow chart showing a "Flash Pop-Up Routine"

FIG. 47 is a flow chart showing the "Flash Pop-Up Routine."In this subroutine, it is first discriminated whether the flash switch Sflup1 is in the ON state in Step #690. If the switch Sflup1 is in the ON state, i.e. the built-in flash device 11 is already in the pop-up state (YES in Step #690), the "Sflup Interrupt Routine" returns to Step #8 of the "Main Routine." On the other hand, if the switch Sflup1 is in the OFF state, i.e. the flash device 11 is in the accommodated state (NO in Step #690), the following operations are carried out in the subsequent steps.

Specifically, it is discriminated whether the P-mode is set in the mode register MD in Step #692. If the P-mode is not set in the register MD (NO in Step #692), this subroutine proceeds to Step #698. If, on the other hand, the P-mode is set in the register MD (YES in Step #692), it is discriminated whether the flash mode flag Ffla is set at 0 in Step #694. If the flag Ffla is set at 0 (YES in Step #694), this subroutine returns to Step #8 of the "Main Routine" since the forcible flash mode is set. If the flag Ffla is set at 1 or 2 (NO in Step #694), it is discriminated whether the P-mode is set in the shift mode register MD1 in Step #696. If the PA-mode or PS-mode is set in the register MD1 (NO in Step #696), this subroutine returns to Step #8 of the "Main Routine." On the other hand, the P-mode is set in the register MD1 (YES in Step #696), the temporary prohibition flag Ffloff is set to 1 in Step #698. Consequently, the flash device 11 is caused to pop up by retracting the stopper with the use of the actuator 8 in Step #700 and this subroutine returns to Step #8 of the "Main Routine."

Figure 48:
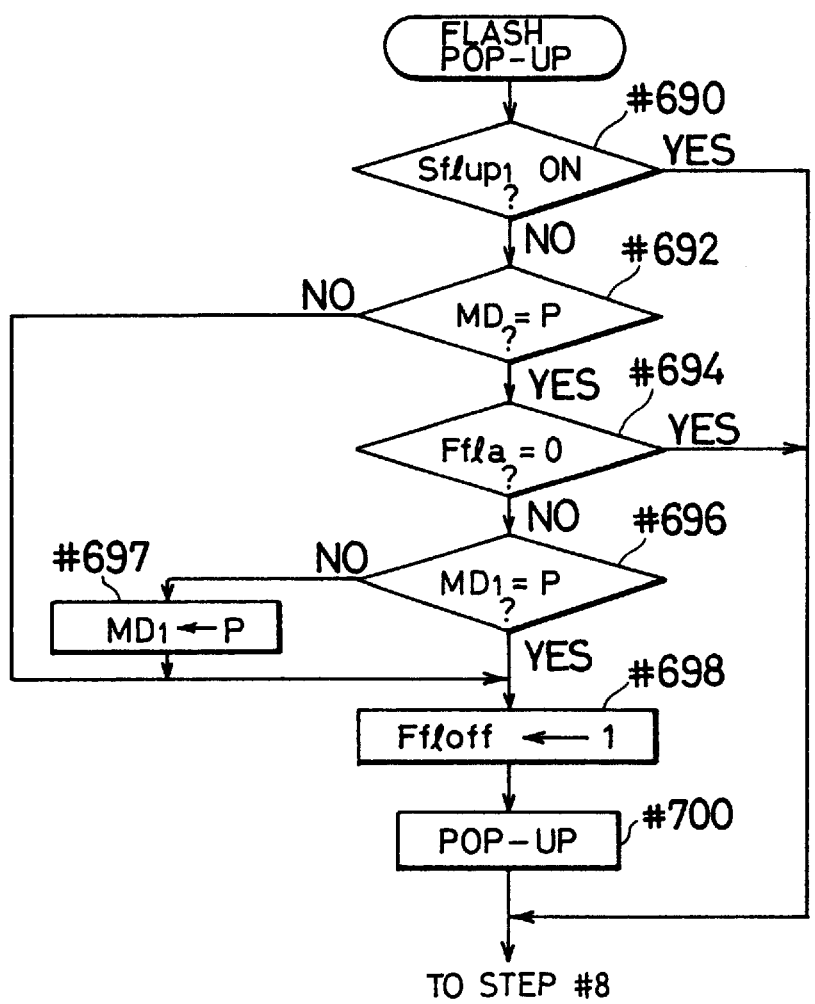
FIG. 48 is a flow chart showing another "Flash Pop-Up Routine"

In the subroutine shown in FIG. 47, the built-in flash device 11 cannot be popped up when the exposure mode is set in PA-mode or PS-mode. However, it may be appreciate to enable pop-up of the flash device 11 even when PA-mode or PS-mode is set as shown in FIG. 48. In this case, if the flash device 11 is popped up, PA-mode or PS-mode is canceled. Specifically, if P-mode is not set in the shift mode register MD1 (NO in Step #696), the subroutine proceeds to Step #698 after the shift mode register MD1 is changed to P-mode in Step #697.

Figure 49:
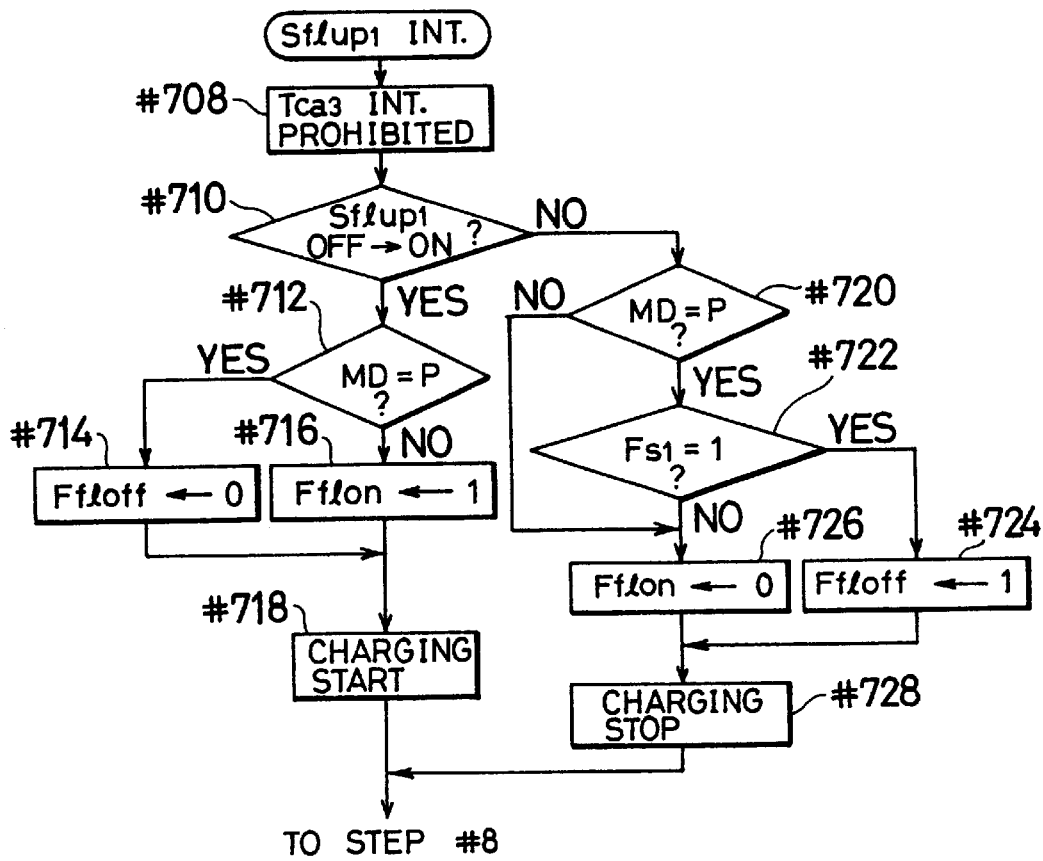
FIG. 49 is a flow chart showing an "Sflup1 Interrupt Routine"

Next, an "Sflup1 Interrupt Routine" will be described with reference to FIG. 49. This interrupt routine is started when the flash pop-up button Sflup is turned on or when the flash device 11 is operated to return to the accommodated state.

In this routine, first, the "Tca3 Interrupt Routine" is prohibited in Step #708. Subsequently, it is first discriminated the flash switch Sflup1 has been just turned on in Step #710. In other words, it is discriminated whether the state of the flash device 11 has been just changed from the accommodated state to the pop-up state. If the switch Sflup1 has been just turned on (YES in Step #710), it is discriminated whether the P-mode is set in the mode register MD in Step #712. If the P-mode is set in the register MD (YES in Step #712), the temporary prohibition flag Ffloff set to 1 in Step #698 is reset to 0 in Step #714. In the case where the flash device 11 is not actually brought into the pop-up state due to the presence of an obstacle or other causes, the temporary prohibition mode set in Step #698 is kept effective. If the P-mode is not set in the register MD (NO in Step #712), the flash firing flag Fflon is set to 1 in Step #716. Then, the charging of the flash device 11 is started in Step #718 and this routine returns to Step #8 of the "Main Routine." The flash device is designed to be charged with electric energy in the pop-up state without fail.

On the other hand, if the state of the switch Sflup1 has been just turned off, i.e. the flash device 11 is brought into the accommodated state (NO in Step #710), it is discriminated whether the P-mode is set in the mode register MD in Step #720. If the P-mode is not set in the register MD (NO in Step #720), the flash firing flag Fflon is reset to 0 in Step #726 and this routine proceeds to Step #728. If the P-mode is set in the register MD (YES in Step #720), it is discriminated whether the S1-ON flag Fs1 is set at 1 in Step #722. The flag Fs1 indicates that an "S1-ON Interrupt Routine" described hereinafter with reference to FIGS. 51B, 51C is being executed. The flag Fs1 indicates current execution of the "S1-ON Interrupt Routine" when set to 1, while indicating unexecution of the same when set to 0.

If the flag Fs1 is set at 1 (YES in Step #722), the temporary prohibition flag Ffloff is set to 1 in Step #724. If, on the other hand, the flag Fs1 is set at 0 (NO in Step #722) the flash firing flag Fflon is reset to 0 in Step #726. Subsequently, the charging of the flash device 11 is stopped in Step #728 and this routine returns to Step #8 of the "Main Routine."

Figure 50:
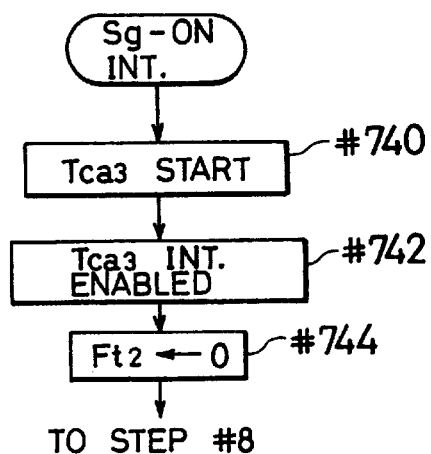
FIG. 50 is a flow chart showing an "Sg-ON Interrupt Routine"
Figure 51A:
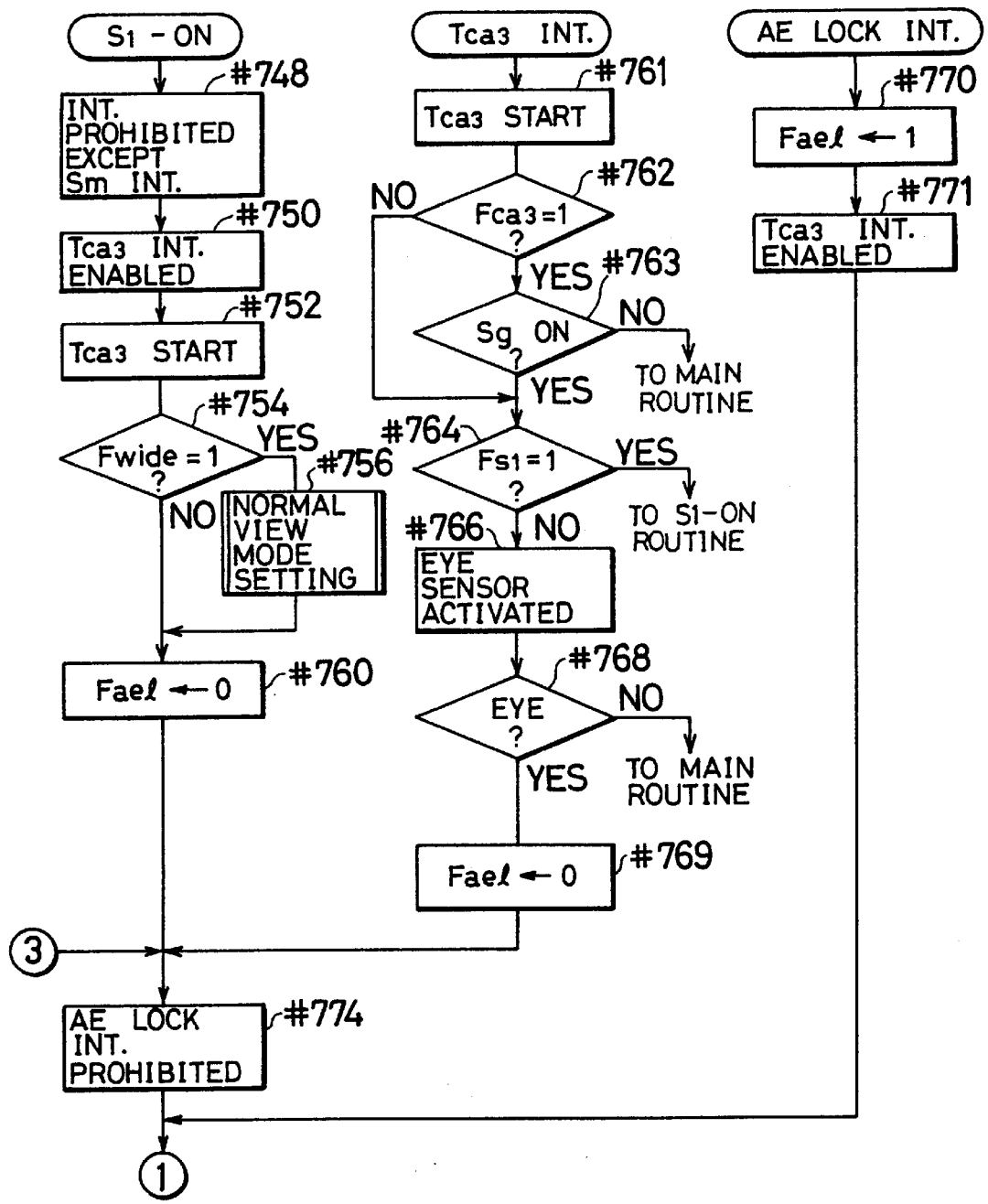
Figure 51D:
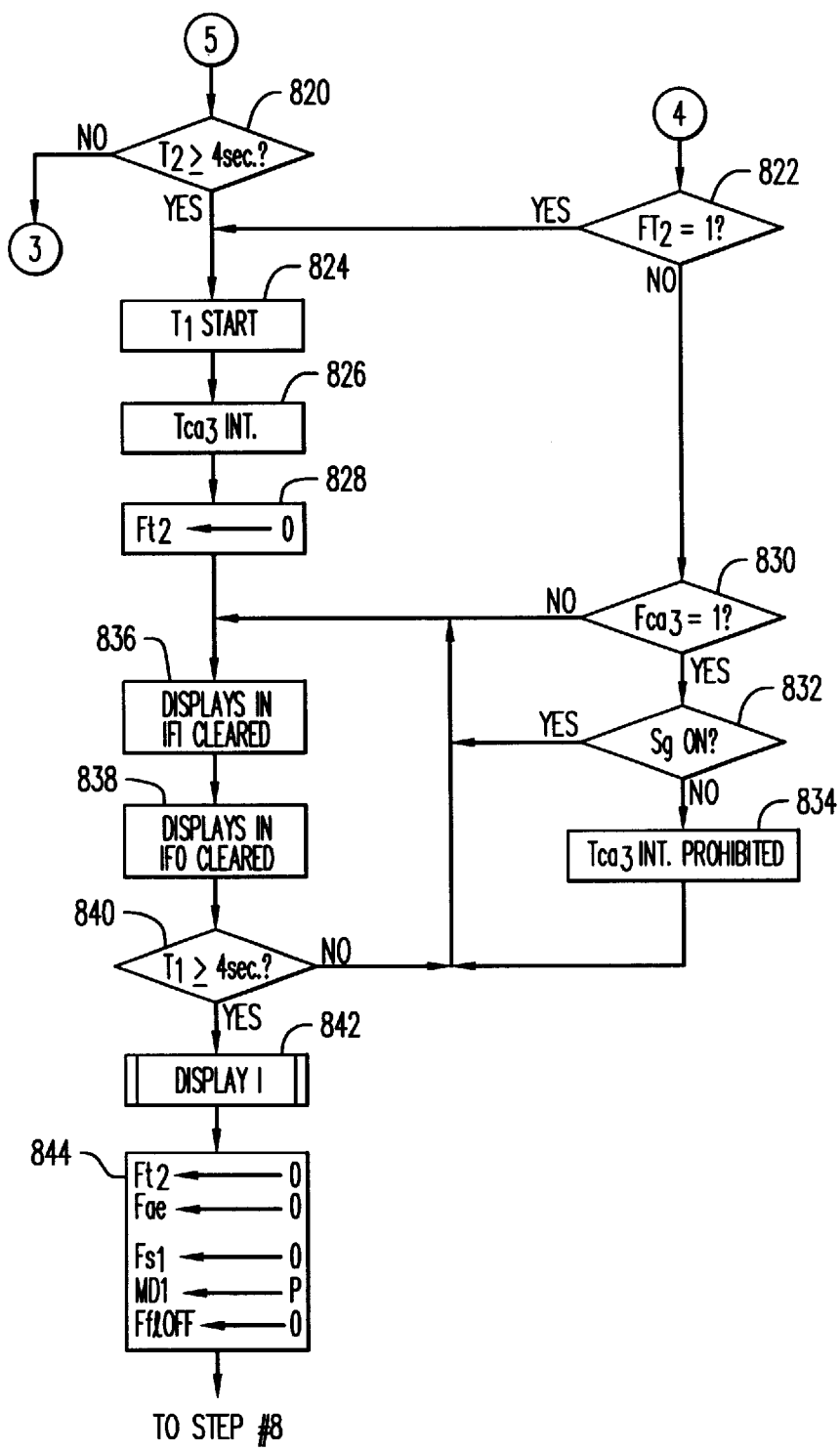

Next, an "Sg-ON Interrupt Routine" will be described with reference to FIG. 50. This interrupt routine is started when the grip switch Sg is turned on. Firstly, the timer Tca3 is started in Step #740 and execution of the "Tca3 Interrupt Routine" described with reference to FIG. 51A is enabled in Step #742. Consequently, a flag Ft2 to be described below is reset to 0 in Step #744 and this routine returns to Step #8 of the "Main Routine." The "Tca3 Interrupt Routine" is executed upon the timer Tca3 measuring a specified time.

Next, there will be described the "S1-ON Interrupt Routine" with reference to FIGS. 51A to 51D. In this routine, firstly, the interrupt routines except the "Sm Interrupt Routine" are prohibited in Step #748, and execution of the "Tca3 Interrupt Routine" is enabled in Step #750 and the timer Tca3 is reset and started in Step #752. Subsequently, it is discriminated whether the wide view flag Fwide is set at 1 in Step #754. If the flag Fwide is set at 1 (YES in Step #754), the "Normal View Mode Setting Routine" described with reference to FIG. 45 is executed in Step #756 and this routine proceeds to Step #760 in which the flag Fael is set to 0, and proceeds to Step #774. If the flag Fwide is set at 0 (NO in Step #754), this routine proceeds directly to Step #760 since the normal view mode is already set.

When, as described above, the "Tca3 Interrupt Routine" is started upon lapse of the specified time after the grip switch Sg is turned, the timer Tca3 is reset and started in Step #761. Then, it is discriminated whether the flag Fca3 is set to 1 in Step #762. When the flag Fca3 is set to 1, it is discriminated whether the grip switch Sg is turned on. When the grip switch Sg is not turned on, this routine returns to the "Main Routine." When the grip switch Sg is turned on, this routine proceeds to Step #764. When the flag Fca3 is not set to 1 (NO in Step #762), this routine directly proceeds to Step #764.

In Step #764, it is discriminated whether the S1-ON flag Fs1 is set at 1. If the flag Fs1 is set at 1 (YES in Step #764), this routine returns to the step where it is started on the assumption that it is started during the execution of the "S1-ON Interrupt Routine." On the other hand, if the flag Fs1 is set at 0, the eye sensor 6 is activated in Step #766. Then, it is discriminated whether the presence of eye has been detected in Step #768. If the presence of eye has been detected (YES in Step #768), this routine proceeds to Step #774 after the flag Fael is set to 0 in Step #769. If the absence of eye has been detected (NO in Step #768), this routine returns to the "Main Routine."

When the AE lock button Sael is turned on, an "AE Lock Interrupt Routine" is started. This routine interrupts into the "S1-ON Interrupt Routine" in Step #776 after setting the AE lock flag Fael to 1 in Step #770 and enabling the "Tca3 Interrupt Routine."

In Step #774, execution of the "AE Lock Interrupt Routine" is prohibited. Subsequently, the S1-ON flag Fs1 is set to 1 in Step #776 and a "Display Routine II" is executed in Step #778.

Figure 52A:
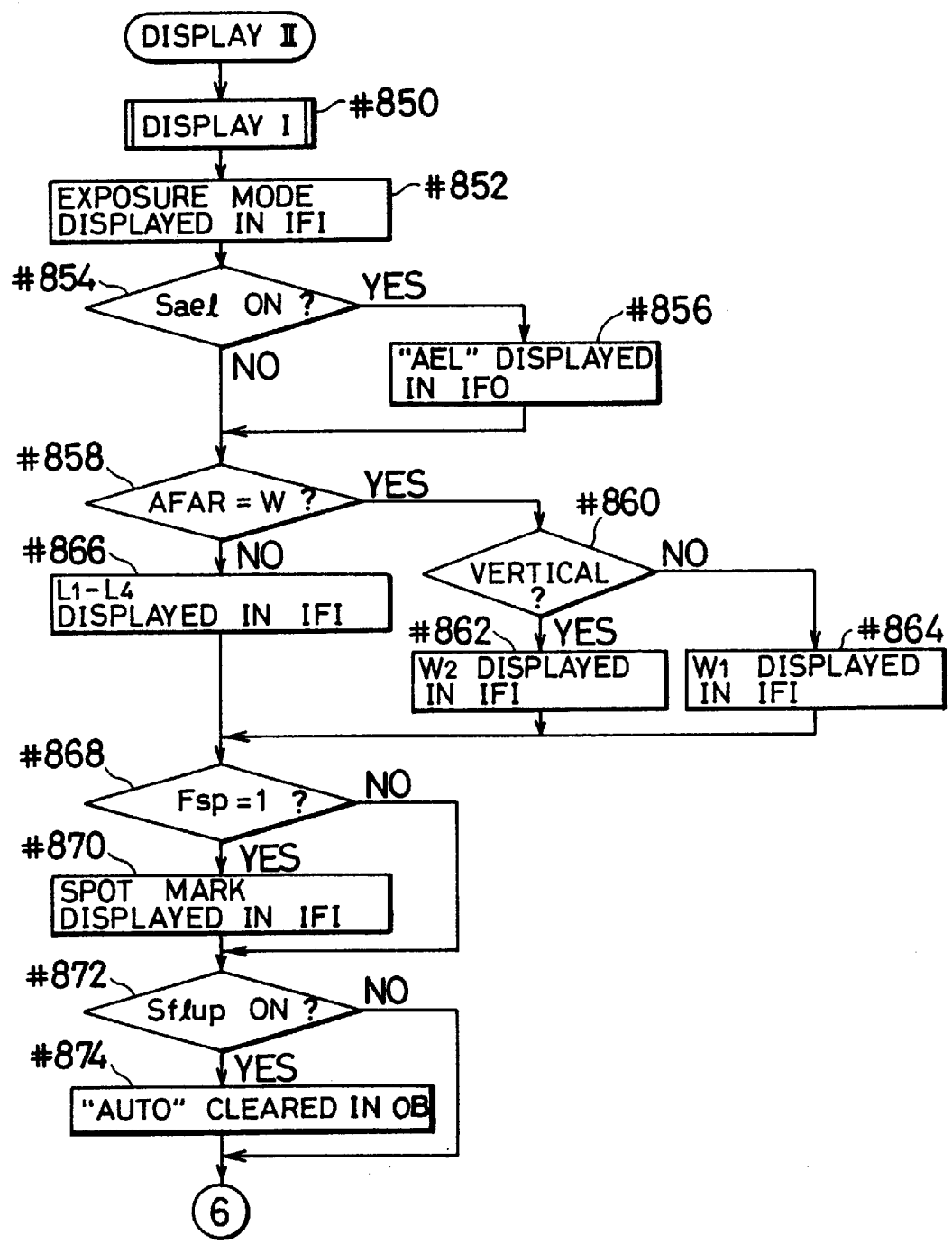

FIGS. 52A and 52B are flow charts showing the "Display Routine II." In this subroutine, firstly, the "Display Routine I" described with reference to FIG. 18 is executed in Step #850 and the following operations are carried out in the subsequent steps.

Specifically, the exposure mode such as P-mode is displayed in the in-frame display unit IFI in Step #852 and it is discriminated whether the AE lock button Sael is in the ON state in Step #854. If the button Sael is in the ON state (YES in Step #854), the mark "AEL" is displayed in the out-of-frame display unit IFO in Step #856. If the button Sael is in the OFF state (NO in Step #854), the mark "AEL" is not displayed. Then, it is discriminated whether the AF area register AFAR is set at W. i.e., the wide AF area is set in Step #858. If the wide AF area is set (YES in Step #858), it is discriminated whether the camera is held in the vertical position in Step #860. If the camera is held in the vertical position (YES in Step #860), the mark W2 is displayed in the display unit IFI in Step #862. On the other hand, if the camera is held in the horizontal position (NO in Step #860), the mark W1 is displayed in the display unit IFI in Step #864. If the register AFAR is set at any one of L1 to L4 (NO in Step #858), any one of the marks L1 to L4 indicative of the local AF area is displayed in the display unit IFI in Step #866.

Subsequently, in Step #868, it is discriminated whether the spot metering flag Fsp is set at 1. If the flag Fsp is set at 1 (YES in Step #868), the spot metering mark 73 is displayed in the display unit IFI in Step #870. On the other hand, if the flag Fsp is set at 0 (NO in Step #868), this subroutine skips to Step #872 because the mark 73 is not to be displayed.

In Step #872, it is discriminated whether the flash pop-up button Sflup is in the ON state. If the button Sflup is in the ON state (YES in Step #872), the display of the mark "AUTO" is cleared in the display unit IFO in Step #874. If the button Sflup is in the OFF state (NO in Step #872), this subroutine skips to Step #880 because the mark "AUTO" remains to be displayed in the display unit IFO. Then, in Step #880, a "Flash Mode Display Routine" is executed.

Figure 53:
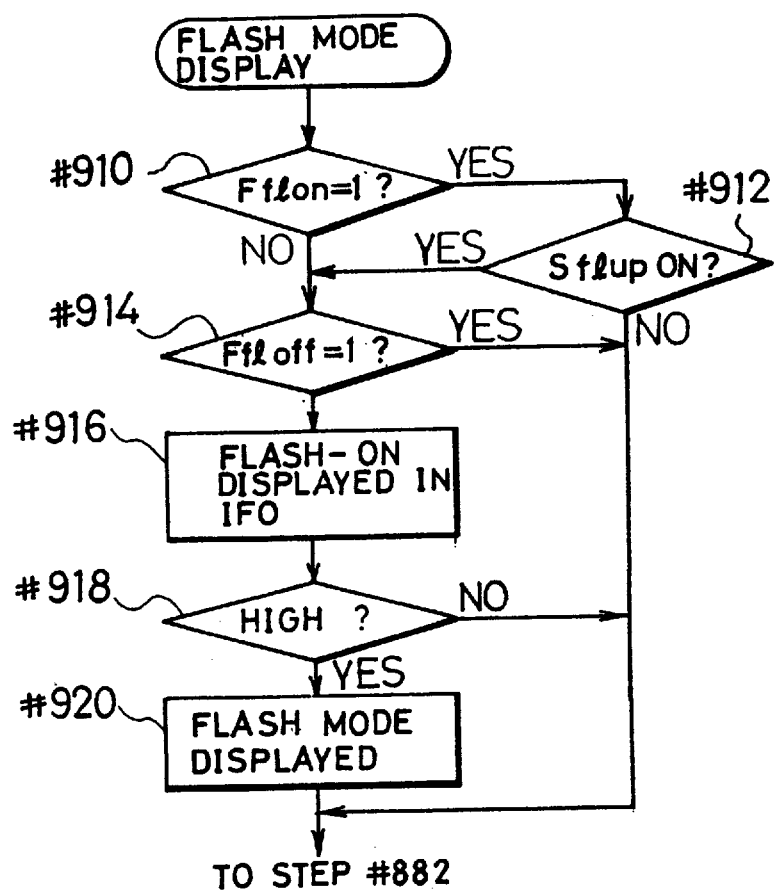
FIG. 53 is a flow chart showing a "Flash Mode Display Routine"

FIG. 53 is a flow chart showing the "Flash Mode Display Routine." In this subroutine, it is first discriminated whether the flash firing flag Fflon is set at 1 in Step #910. If the flag Fflon is set at 0 (NO in Step #910), it is discriminated whether the flash pop-up button Sflup is in the ON state in Step #912. If the flag Fflon is set at 1 (YES in Step #910) or the button Sflup is in the ON state (YES in Step #912), it is discriminated whether the temporary prohibition flag Ffloff is set at 1 in Step #914. If the flag Ffloff is set at 1 (YES in Step #914) or the button Sflup is in the OFF state (NO in Step #912), this subroutine returns to Step #882. If, on the other hand, the flag Ffloff is set at 0 (NO in Step #914), the flash-on indicator 60 is displayed in the display unit IFO in Step #916.

Subsequently, it is discriminated whether the charging completion signal is high in Step #918. If the charging completion signal is high (YES in Step #918), the flash mode is displayed using the indicators 61, 62, see TABLE-1, in Step #920. Consequently, this subroutine returns to Step #882.

FIGS. 64A and 64B are diagrams showing displayed states of the flash mode in Steps #850, #852, #862 to #866, #870, and #874. FIG. 64A shows a state in the automatic flash mode where the flash firing flag Fflon is set at 1 and the charging of the flash device 11 is already completed. At this time, the aperture value and shutter speed are respectively changed to those values suited to the flash firing photographing operations which are recalculated in consideration of an amount of flash light emitted from the flash device 11. FIG. 64B shows a forcible flash firing mode while the flash pop-up button Sflup is in the ON state, where the mark "AUTO" is not displayed in the on-body display unit OB.

FIG. 65A shows an exemplary displayed state where the flash firing is not required while FIG. 65B showing a displayed state obtainable when the flash pop-up button Sflup is turned on in the state shown in FIG. 65A. Similarly to the state shown in FIG. 64B, the mark "AUTO" is not displayed and the aperture value and shutter speed are changed to those values suited to the flash firing photographing operation in the state shown in FIG. 65B. However, the charging of the flash device 11 is not completed yet and therefore the indicator 62 is not displayed in the display unit IFO.

Referring back to FIG. 52B, an "Image Indicator Display Routine" is executed in Step #882.

Figure 54:
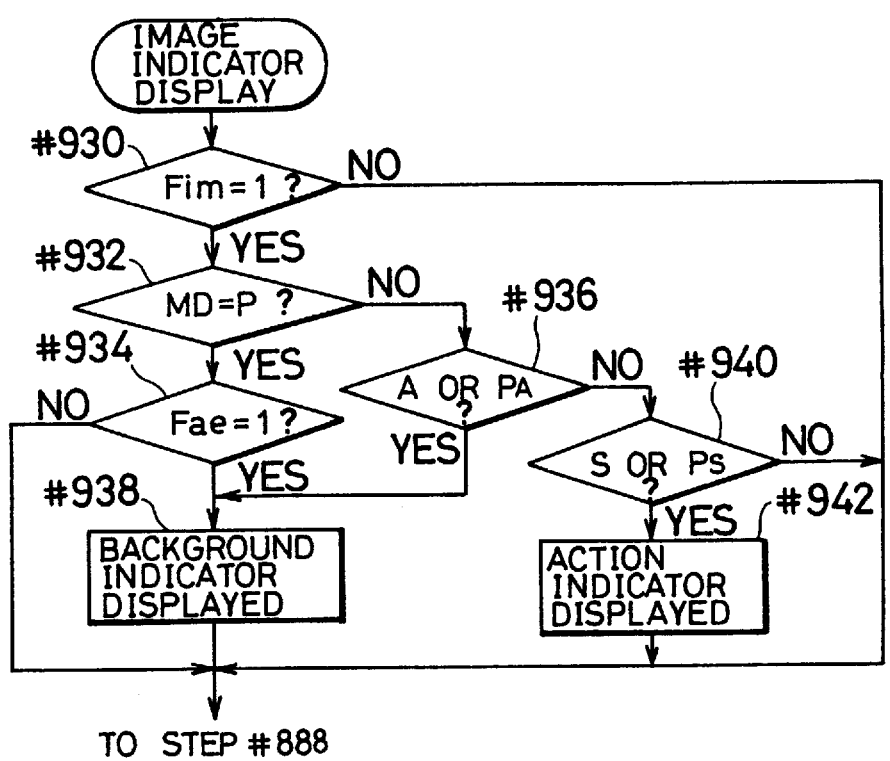
FIG. 54 is a flow chart showing an "Image Indicator Display Routine"

FIG. 54 is a flow chart showing the "Image Indicator Display Routine." In this subroutine, it is first discriminated whether the image indicator flag Fim is set at 1 in Step #930. If the flag Fim is set at 0 (NO in Step #930), this subroutine returns to Step #884. If the flag Fim is set at 1 (YES in Step #930), it is discriminated whether the P-mode is currently set as an exposure mode in Step #932. If the P-mode is currently set (YES in 932), it is discriminated whether the brightness data flag Fae is set at 1 in Step #934. If the flag Fae is set at 0 (NO in Step #934), this subroutine returns to Step #884. If, on the other hand, the P-mode is not currently set (NO in Step #932), it is discriminated whether either the A-mode or PA-mode is currently set as an exposure mode in Step #936. If the flag Fae is set at 1 (YES in Step #934) or either the A-mode or PA-mode is currently set (YES in Step #936), the background unsharpness indicator 57 is displayed in the display unit IFI in Step #938. If neither A-mode nor PA-mode is currently set (NO in Step #936), it is discriminated whether either the S-mode or PS-mode is currently set as an exposure mode in Step #940. If either the S-mode or PS-mode is currently set (YES in Step #942), the action indicator 56 is displayed in the display unit IFI in Step #942. If neither S-mode or PS-mode is currently set, i.e. the M-mode is currently set (NO in Step #942), this subroutine returns to Step #888.

Referring back to FIG. 52B. it is discriminated whether the panorama switch Span is in the ON state in Step #888. If the switch Span is in the ON state (YES in Step #888), the panorama frame 55 is displayed in the display unit IFI in Step #890. If the switch Span is in the OFF state (NO in Step #888), the panorama frame 55 is not to be displayed and this subroutine proceeds to Step #892 in which it is further discriminated whether the wide view flag Fwide is set at 1. If the flag Fwide is set at 1 (YES in Step #892), it is discriminated whether the switch S1 is in the ON state in Step #894. If the switch S1 is in the OFF state (NO in Step #894), the wide view frame 54 is displayed in the display unit IFI in Step #896 and this subroutine returns to Step #780. If the switch S1 is in the ON state (YES in Step #894,) this subroutine returns to Step #780 without displaying the frame 54.

Figure 62B:
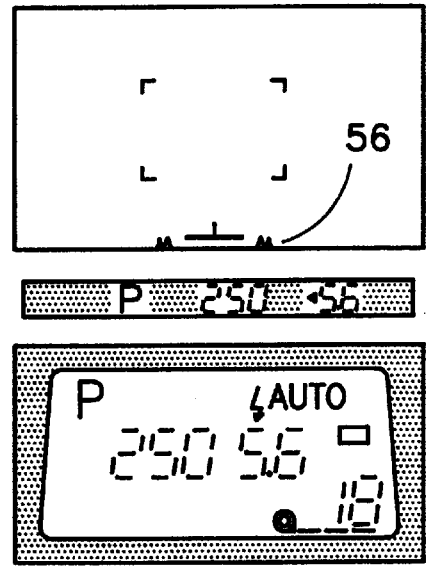

FIG. 62B shows an example of states of the display units IFI, IFO and OB after execution of the "Display Routine II."

Referring back to FIG. 51B, a "Light Measurement Routine" is executed in Step #780.

Figure 55:
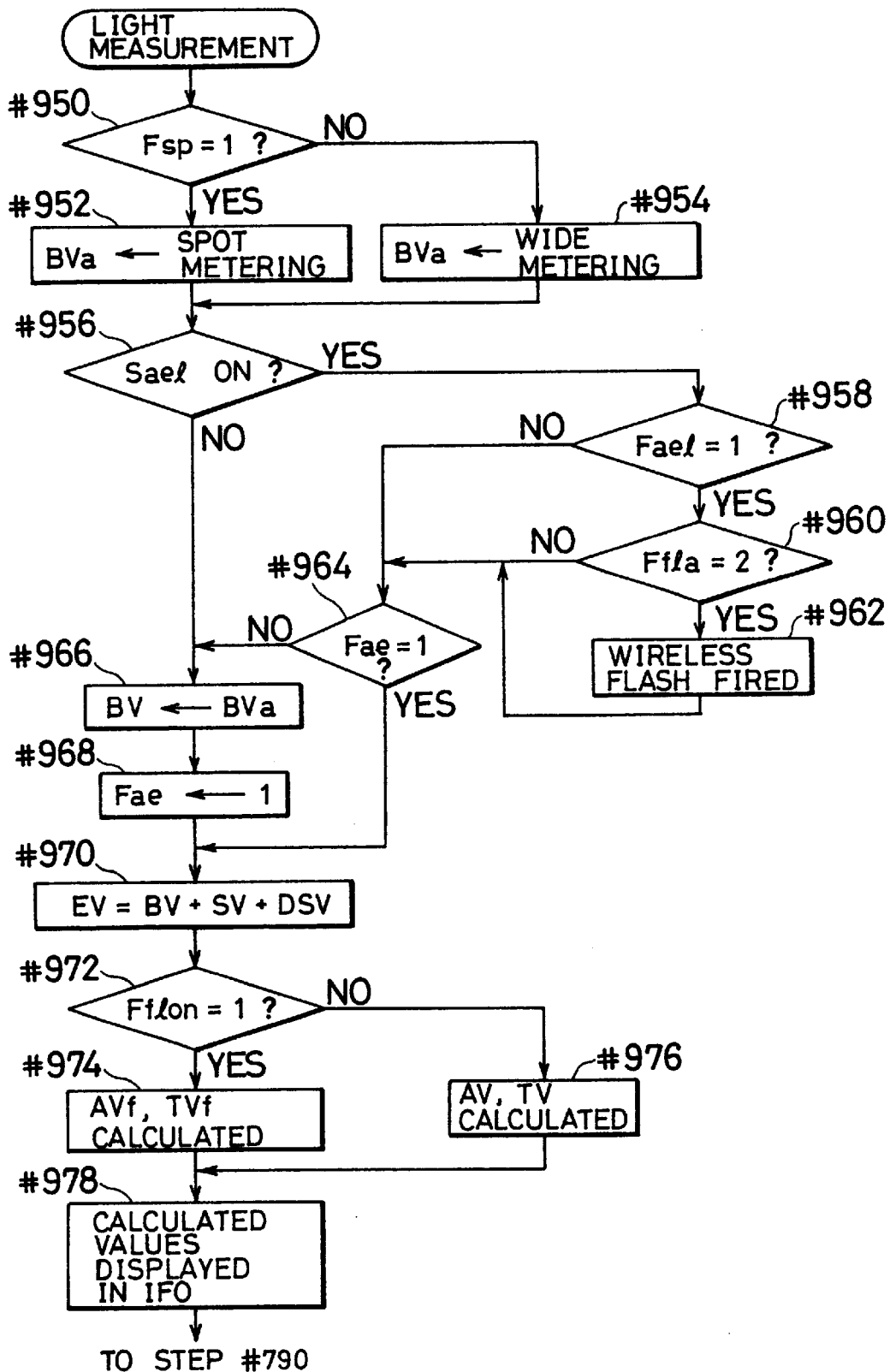
FIG. 55 is a flow chart showing a "Light Measurement Routine"

FIG. 55 is a flow chart showing the "Light Measurement Routine." In this subroutine, it is first discriminated whether the spot metering flag Fsp is set at 1 in Step #950. If the flag Fsp is set at 1 (YES in Step #950), the spot metering is performed and the obtained brightness of the subject is stored as data BVa in Step #952. On the other hand, the flag Fsp is set at 0 (NO in Step #950), the wide metering is performed and the obtained brightness of the subject is stored as data BVa in Step #954. Then, it is discriminated whether the AE lock button Sael is in the ON state in Step #956. If the button Sael is in the ON state (YES in Step #956), it is discriminated whether the AE lock flag Fael is set at 1 in Step #958. In other words, it is discriminated whether either the "S1-ON Interrupt Routine" or "Tca3 Interrupt Routine" is currently executed. If the flag Fael is set at 1 (YES in Step #958), it means that the "AE Lock Interrupt Routine" is currently executed. Subsequently, it is discriminated whether the flash mode flag Ffla is set at 2 in Step #960. If the flag Ffla is set at 2 (YES in Step #960), the wireless flash device is fired preliminarily in Step #962 and this routine proceeds to Step #964.

In Step #964, it is discriminated whether the brightness data flag Fae is set at 1. If the flag Fae is set at 1 (YES in Step #964), this subroutine proceeds to Step #970. On the other hand, if the flag Fae is set at 0 (NO in Step #964), the brightness data BVa is stored as data BV in Step #966 and the flag Fae is set to 1 in Step #968. In Step #970, an exposure control value EV is calculated using the following equation: EV=BV+SV+DSV. Then, it is discriminated whether the flash firing flag Fflon is set at 1 in Step #972. If the flag Fflon is set at 1 (YES in Step #972), the aperture value AVf and shutter speed TVf suited to the flash firing photographing operation are calculated in Step #974. On the other hand, if the flag Fflon is set at 0 (NO in Step #972), the aperture value AV and shutter speed TV suited to the normal photographing operation are calculated in Step #976. Consequently, the aperture value and shutter speed calculated either in Step #974 or #976 are displayed in the AV segment units and SS segment units of the display units IFO and OB, and this subroutine returns to Step #790. In Step #790, a "Flash Firing Determination Routine" is executed.

Figure 56:
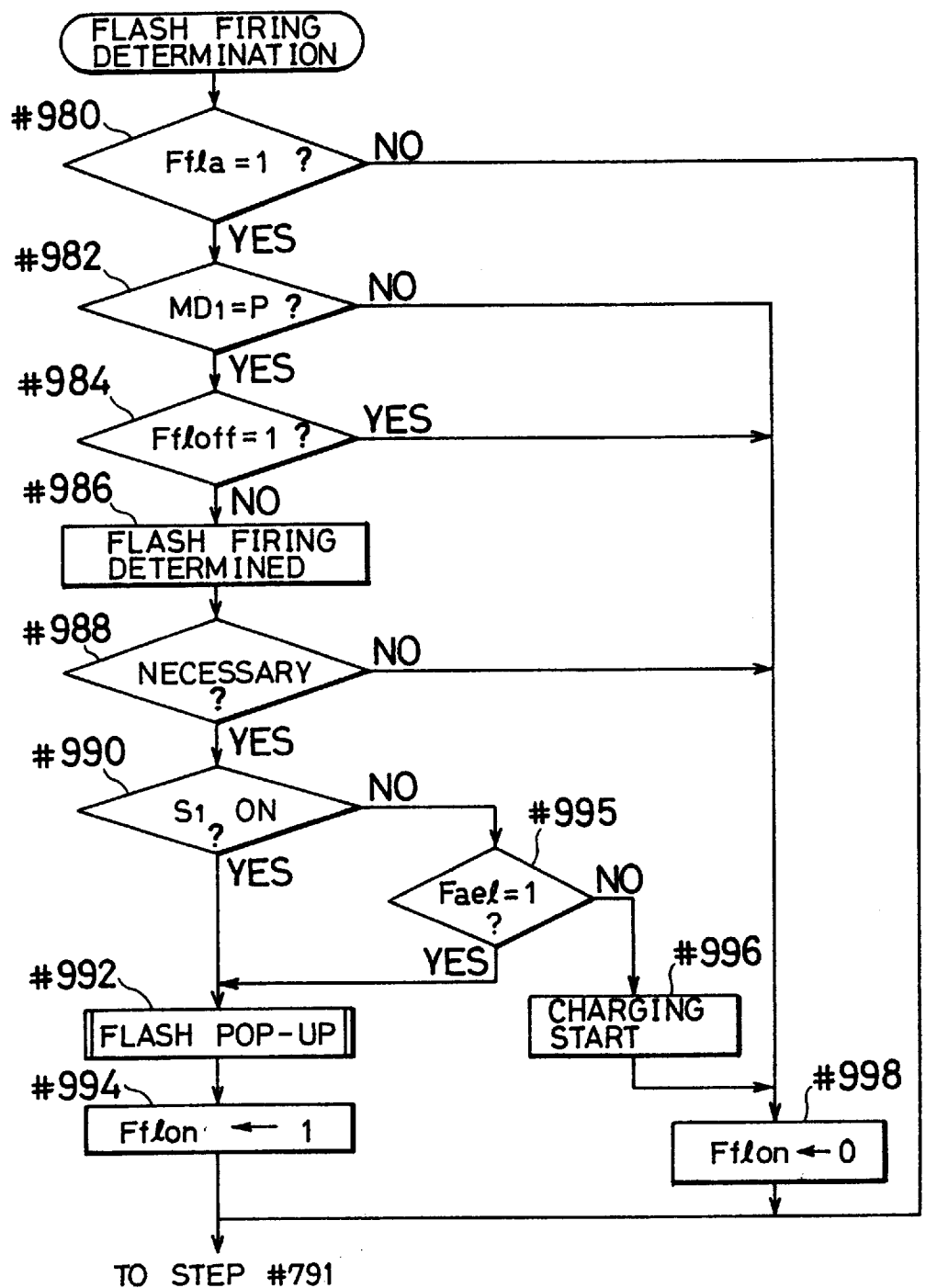
FIG. 56 is a flow chart showing a "Flash Firing Determination Routine"

FIG. 56 is a flow chart showing the "Flash Firing Determination Routine." In this subroutine, it is first discriminated whether the flash mode flag Ffla is set at 1 in Step #980. If the flag Ffla is set at 0 or 2 (NO in Step #980), this subroutine returns to Step #791 since it is not necessary to determine the need for flash firing. On the other hand, the flag Ffla is set 1 (YES in Step #980), it is discriminated whether the content of the mode shift register MD1 is P-mode in Step #982. If the content of the register MD1 is P-mode (YES in Strep 982), it is discriminated whether the temporary prohibition flag Ffloff is set at 1 in Step #984. If the flag Ffloff is set at 0 (NO in Step #984), it is discriminated whether the flash firing is necessary based on the measured subject brightness in Step #988. If the flash firing is necessary (YES in Step #988), it is discriminated whether the switch S1 is in the ON state in Step #990. If the switch S1 is in the ON state (YES in Step #990), the "Flash Pop-Up Routine" shown in FIG. 47 is executed in Step #992. Consequently, this subroutine returns to Step #791 after setting the flash firing flag Fflon to 1 in Step #994.

On the other hand, this subroutine returns to Step #791 after resetting the flag Fflon to 0 in Step #998 if: the content of the register MD1 is PA-mode or PS-mode (NO in Step #982); the flag Ffloff is set at 1 (YES in Step #984); or the flash firing is not necessary (NO in Step #988). Also, when the switch S1 is in the OFF state (NO in Step #990), this subroutine proceeds to Step #995 in which it is discriminated whether the flag Fael is set to 1. When the flag Fael is not set to 1 in Step #995, this subroutine proceeds to Step #996 in which the charging of the flash device 11 is started, and proceeds to Step #998. When the flag Fael is set to 1 (YES in Step #995), this subroutine proceeds to Step #992.

Referring back to FIG. 51B, it is discriminated whether the flag Fael is set to 1 in Step #791. When the flag Fael is not set to 1, this routine proceeds to Step #792 in which an "Automatic Focusing Routine" to be described later is executed, and then proceeds to Step #794 in which an automatic program zooming is executed. Thereafter, this routine proceeds to Step #796. When the flag Fael is set to 1, this routine directly proceeds to Step #796. In this way, the "Automatic Focusing Routine" and automatic program zooming are suspended when the routine of the AE lock button Sael is being executed.

Figure 57:
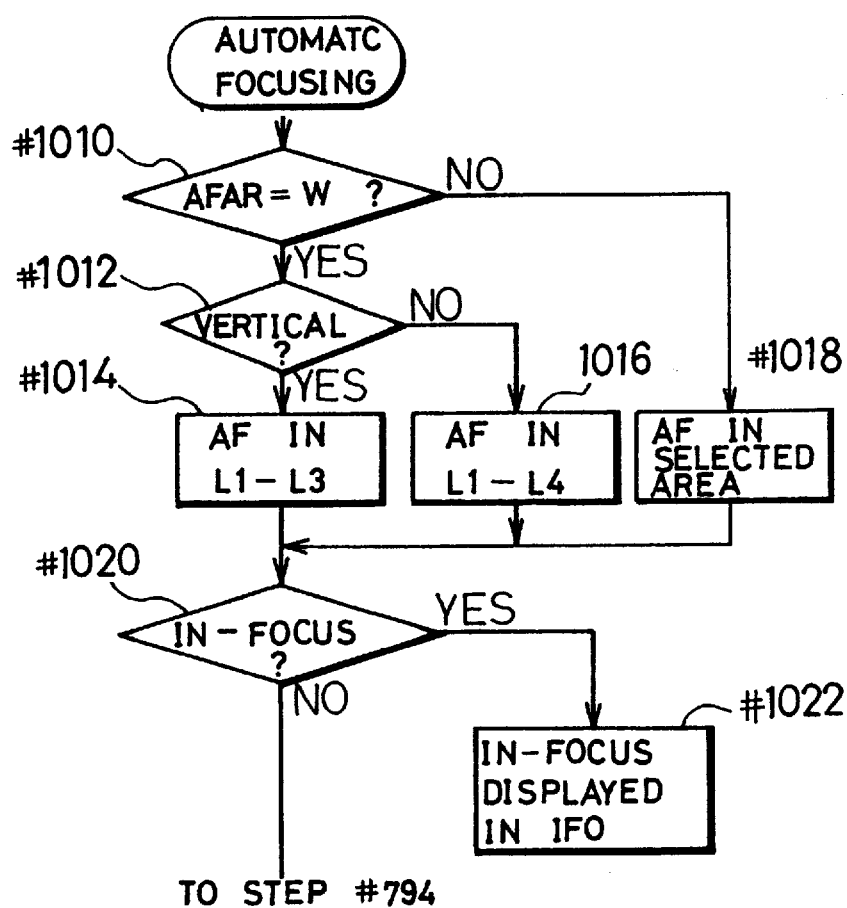
FIG. 57 is a flow chart showing an "Automatic Focusing Routine"

FIG. 57 is a flow chart showing the "AF Routine." In this subroutine, it is first discriminated whether the content of the AF area register AFAR is W in Step #1010. If the content of the register AFAR is W (YES in Step #1010), it is discriminated whether the camera is held in the vertical position in Step #1012. If the camera is held in the vertical position (YES in Step #1012), the subject distance data is obtained using focus conditions detected in the local AF areas L1 to L3 in Step #1014. The focus condition is representative of the distance to the subject. For example, the focus condition representative of the shortest subject distance may be chosen as the subject distance data. Alternatively, a specified calculation is performed based on the detected focus conditions to obtain the subject distance data. On the other hand, if the camera is held in the horizontal position (NO in Step #1012), the subject distance data is obtained using focus conditions detected in the local AF areas L1 to L4 in Step #1016. Similarly to the case where the camera is held in the vertical position, in this case, the focus condition representative of the shortest subject distance may be chosen as the subject distance data or a specified calculation is performed based on the detected focus conditions to obtain the subject distance data. If the content of the register AFAR is not W (NO in Step #1010), the AF operation is executed in the selected local AF area in Step #1018. In this case, the focus condition detected in the selected local AF area serves as the subject distance data.

Upon obtaining the subject distance data, it is discriminated whether the taking lens is in such a position as to attain an in-focus condition in Step #1020. If the in-focus condition is currently attained (YES in Step #1020), an unillustrated in-focus indicator is displayed in the out-of-frame display unit IFO in Step #1022 and this subroutine returns to Step #794. On the other hand, the in-focus indicator is not currently attained (NO in Step #1020), this subroutine returns to Step #794.

Referring back to FIG. 51B, in Step #794, an automatic program zooming (APZ) is executed. The APZ is applicable to a camera provided with a taking lens unit of the power zooming type and adapted for driving the taking lens to attain a target focal length according to the subject distance data, so that a magnification locked by the operator to obtain a desired image size can be maintained. More specifically, in the cameras, the magnification is determined based on the subject distance obtained by a distance measuring device and the focal length of the taking lens when the subject distance is measured. Based on the magnification when the subject distance is measured and locked magnification is calculated the target focal length. The taking lens is driven to attain the target focal length by the APZ.

Subsequently, in Step #796, it is discriminated whether either the front control dial Sf or rear control dial Sr is being operated. If either of the control dials is being operated (YES in Step #796), a "Dial Operation Routine II" is executed in Step #798.

Figure 58:
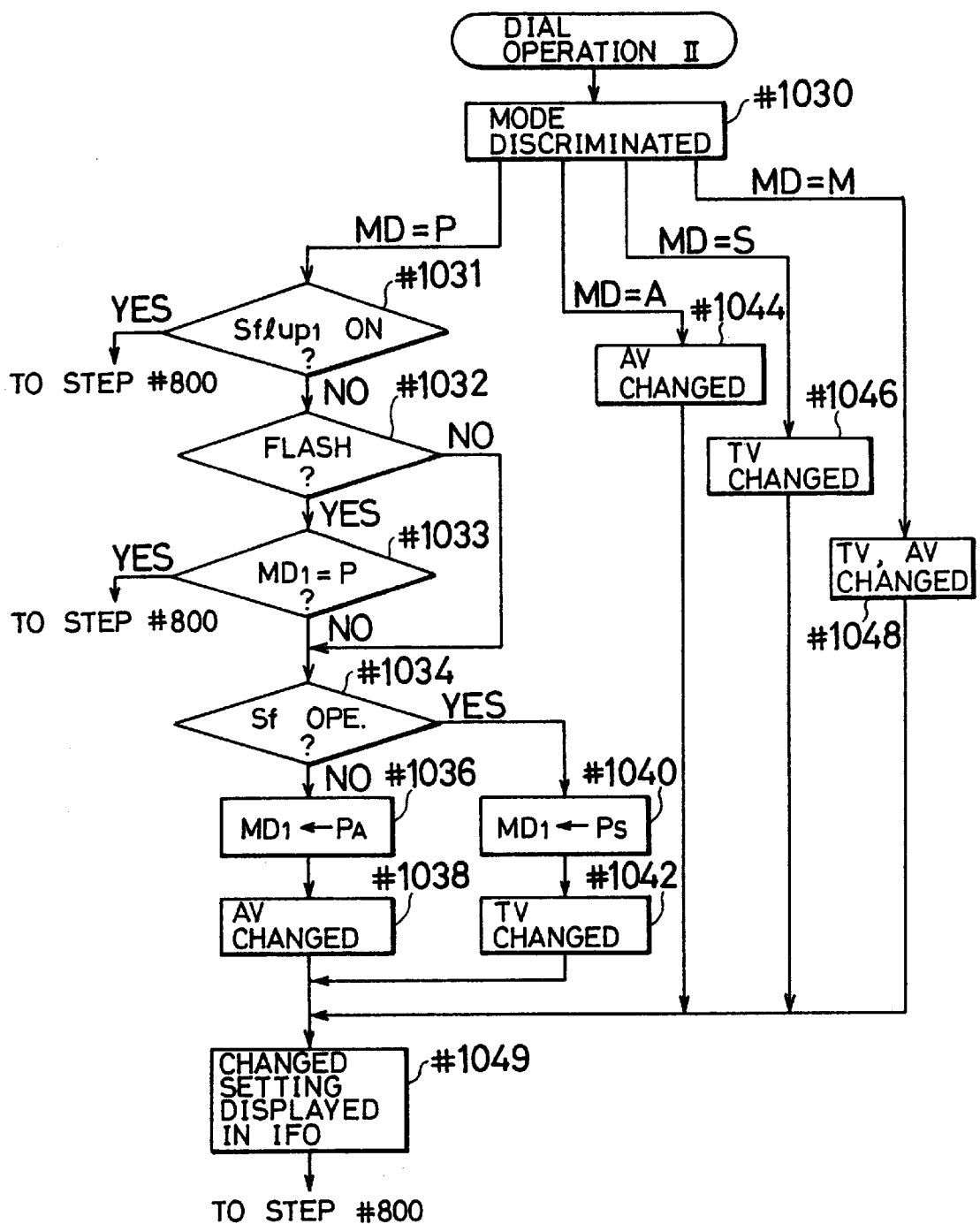
FIG. 58 is a flow chart showing a "Dial Operation Routine II"

FIG. 58 is a flow chart showing the "Dial Operation Routine II." In this subroutine, the content of the mode register MD is discriminated, i.e. the set exposure mode is discriminated in Step #1030. If the content of the register MD is discriminated to be P-mode in Step #1030, it is discriminated whether the flash switch Sflup1 is in the ON state in Step #1031. If the switch Sflup1 is in the ON state (YES in Step #1031), this subroutine returns to Step #800. If, on the other hand, the switch Sflup1 is in the OFF state (NO in Step #1031), it is discriminated whether the flash firing is necessary based on the measured subject brightness in Step #1032. When the flash firing is discriminated to be necessary (YES in Step #1032, it is discriminated whether P-mode is set in the shift mode register MD1. When P-mode is set (YES in Step #1033), this subroutine proceeds to Step #800. When P-mode is not set (NO in Step #1033), this subroutine proceeds to Step #1034. When the flash firing is discriminated not to be necessary (NO in Step #1032), this subroutine directly proceeds to Step #1034. This suspends PA-mode or PS-mode when the flash firing is necessary and the exposure mode has been set in P-mode.

In Step #1034, it is discriminated whether the front control dial Sf has been operated. Unless the front control dial Sf has been operated, i.e. the rear control dial Sr has been operated (NO in Step #1034), the content of the shift mode register MD1 is changed to PA-mode in Step #1036 and the aperture value AV is changed by the specified amount according to the operated direction of the dial Sr in Step #1038. Conversely, if the control dial Sf has been operated (YES in Step #1034), the content of the register MD1 is changed to PS-mode in Step #1040 and the shutter speed TV is changed by the specified amount according to the operated direction of the dial Sf in Step #1042.

If the content of the register MD is discriminated to be A-mode in Step #1030, the aperture value AV is changed by the specified amount according to the operated direction of the dial Sr in Step #1044. If the content of the register MD is discriminated to be S-mode in Step #1030, the shutter speed TV is changed by the specified amount according to the operated direction of the dial Sf in Step #1046. If the content of the register MD is discriminated to be M-mode in Step #1030, the shutter speed TV and aperture value AV are changed respectively by the specified amounts according to the operated directions of the dials Sf and Sr in Step #1048. Consequently, the photographing settings changed in this subroutine are displayed in the display unit IFO in Step #1049 and this subroutine returns to Step #800. It will be appreciated that only the aperture value AV is changeable in the A-mode and only the shutter speed TV is changeable in the S-mode. Accordingly, there is no need to discriminate which control dial has been operated in the case where the A-mode or S-mode is set.

Referring back to FIG. 51B, if neither of the control dials Sf and Sr has been operated (NO in Step #796), this routine proceeds to Step #800 in which the timer T1 is reset and started. In Step #801, the function flag Ffunc, flash mode setting flag Fflm, film speed mode setting flag Fisom are reset to 0, and all the interrupt routines are enabled. Subsequently, it is discriminated whether the switch S1 is in the ON state in Step #802. If the switch S1 is in the ON state (YES in Step #802), it is discriminated whether the switch S2 is in the ON state in Step #804. If the switch S2 is in the ON state (YES in Step #804), an "Exposure Control Routine" is executed in Step #806. On the other hand, if the switch S2 is in the OFF state (NO in Step #804), this routine returns to Step #774.

Figure 59A:
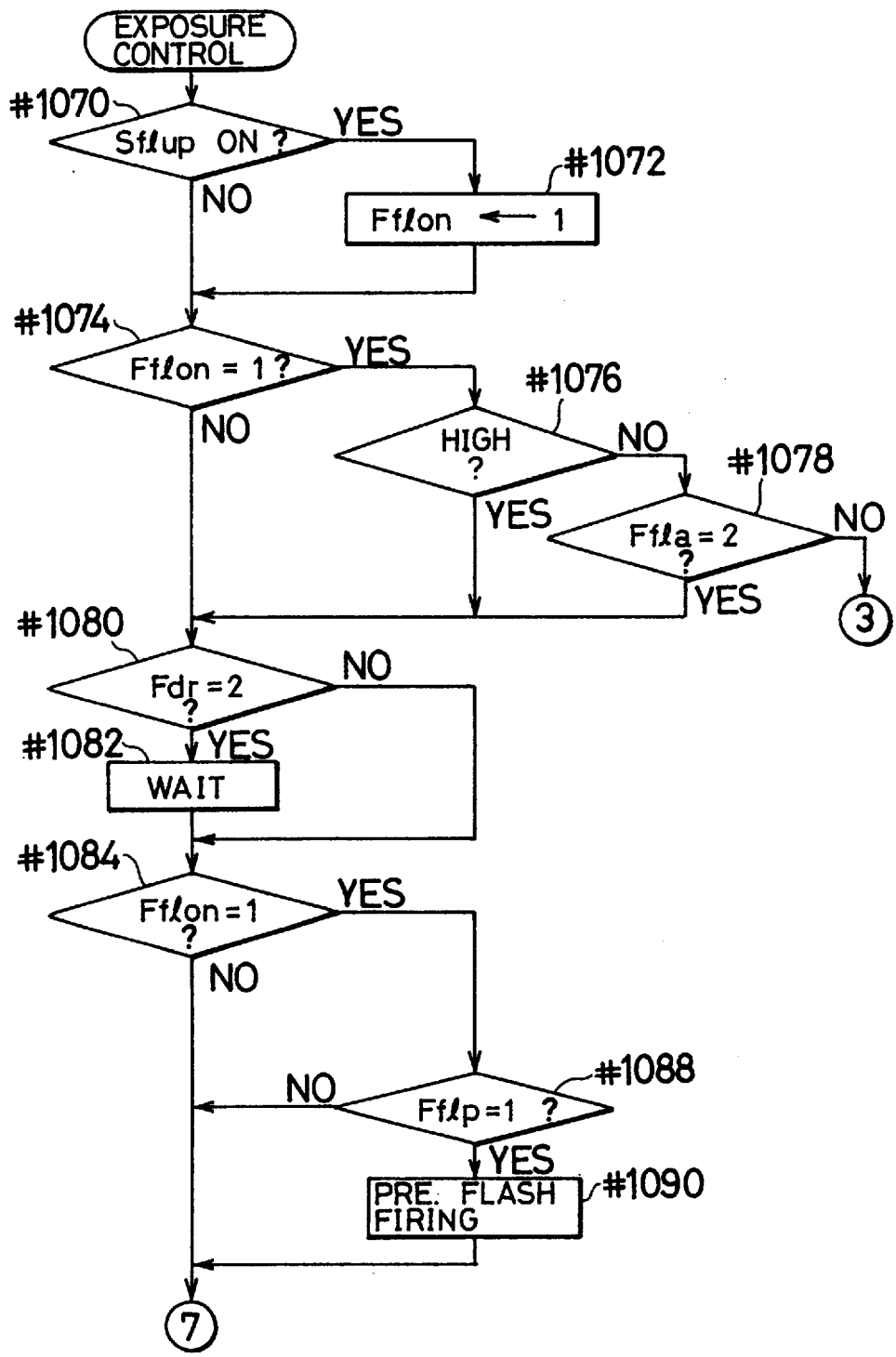
FIGS. 59A and 59B are flow charts showing an "Exposure Control Routine"
Figure 59B:
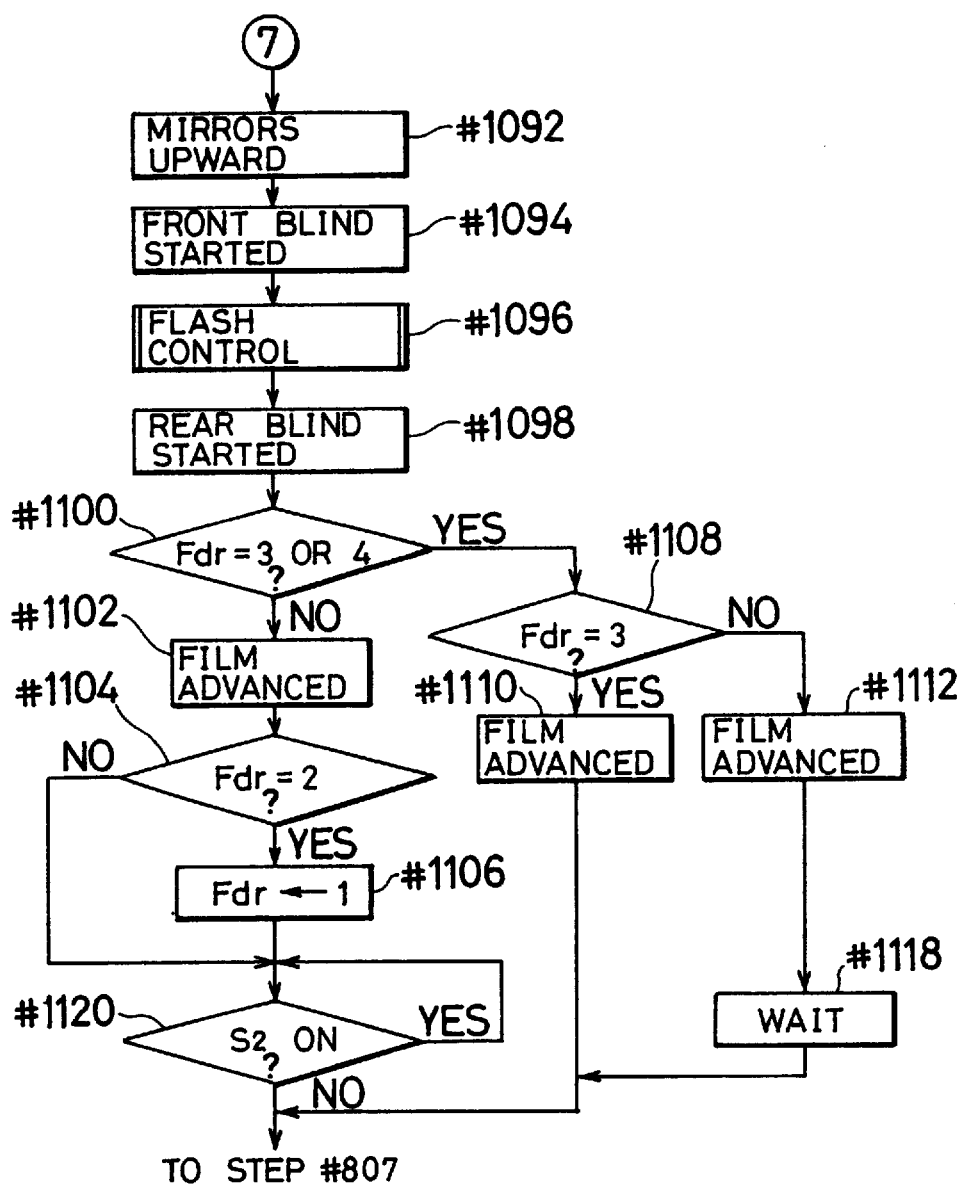

FIGS. 59A and 59B are flow chart showing the "Exposure Control Routine." In this subroutine, it is first discriminated whether the flash pop-up button Sflup is in the ON state in Step #1070. If the button Sflup is in the ON state (YES in Step #1070), the flash firing flag Fflon is set to 1 in Step #1072. Then, in Step #1074, it is discriminated whether the flag Fflon is set at 1. If the flag Fflon is set at 0 (NO in Step #1074), this subroutine proceeds to Step #1080. On the other hand, if the flag Fflon is set at 1 (YES in Step #1074), it is discriminated whether the charging completion signal is high in Step #1076. If the charging completion signal is high, this subroutine proceeds to Step #1080 since the charging of the flash device 11 has been completed. If, on the other hand, the charging completion signal is low (NO in Step #1076), it is discriminated whether the flash mode flag Ffla is set at 2 in Step #1078. If the flag Ffla is set at 2, i.e. the wireless flash mode is set (YES in Step #1078), this subroutine proceeds to Step #1080 on the assumption that the exposure control is executable. If the flag Ffla is set at 0 or 1 (NO in Step #1078), this subroutine returns to Step #772 since the flash device 11 needs to be charged with more electric energy.

In Step #1080, it is discriminated whether the self/drive flag Fdr is set at 2. If the flag Fdr is set at 2, i.e. the self-timer mode is set (YES in Step #1080), the camera waits in standby for a preset time in Step #1082. If the flag Fdr is set at 0 or 1 (NO in Step #1080), this sub-routine proceeds directly to Step #1084. Subsequently, it is discriminated whether the flag Fflon is set at 1 in Step #1084. If the flag Fflon is set at 0 (NO in Step #1084), this subroutine proceeds to Step #1092. If, on the other hand, the flag Fflon is set at 1 (YES in Step #1084), it is discriminated whether the preliminary flash firing flag Fflp is set at 1 in Step #1088. If the flag Fflp is set at 1 (YES in Step #1088), the preliminary flash firing is carried out in Step #1090 and this subroutine proceeds to Step #1092. If the flag Fflp is set at 0 (NO in Step #1088), this subroutine directly proceeds to Step #1092.

In Step #1092, the mirrors are retracted upward from respective positions on the optical axis so that the subject image can be introduced to the film plane. Then, the front and rear blinds constituting a focal plane shutter are controllably driven. The front and rear blinds are adapted for traveling across the film plane to expose the film frame. More specifically, the traveling of the front blind is started in Step #1094. In Step #1096, a "Flash Control Routine" described below is executed. Then, in Step #1098, the traveling of the rear blind is started after a delay period determined depending upon the calculated shutter speed following start of the traveling of the front blind.

Figure 60:
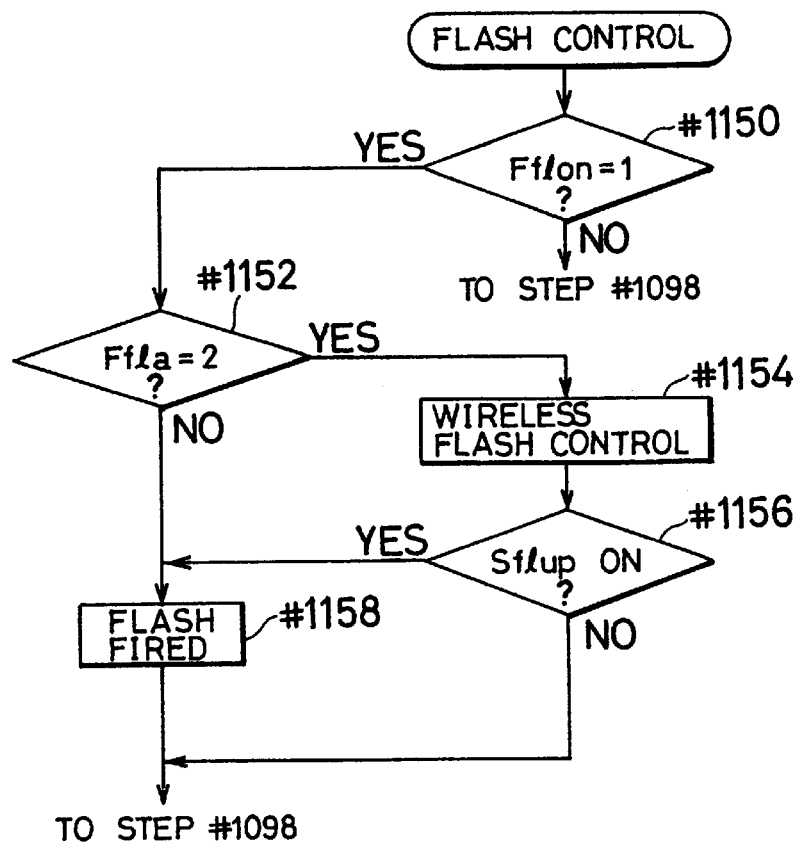
FIG. 60 is a flow chart showing a "Flash Control Routine"

FIG. 60 is a flow chart showing the "Flash Control Routine." In this subroutine, it is first discriminated whether the flash firing flag Fflon is set at 1 in Step #1150. If the flag Fflon is set at 0 (NO in Step #1150), this subroutine returns to Step #1098. On the other hand, if the flag Fflon is set at 1 (YES in Step #1150), it is discriminated whether the flash mode flag Ffla is set at 2 in Step #1152. If the flag Ffla is set at 0 or 1 (NO in Step #1152), the flash device 11 is immediately caused to fire in Step #1158. If the flag Ffla is set at 2 (YES in Step #1152), a wireless flash control is executed in Step #1154. More specifically, the optical pulse is transmitted to the off-camera flash device to control the firing thereof using the built-in flash device 11 of the camera as described above. Subsequently, it is discriminated whether the flash pop-up button Sflup is in the ON state in Step #1156. If the button Sflup is in the OFF state (NO in Step #1156), this subroutine returns to Step #1098. If the button Sflup is in the ON state (YES in Step #1156), the flash device 11 is fired simultaneously with the firing of the off-camera flash device in Step #1158 and this subroutine returns to Step #1098.

Upon completion of the exposure control, it is discriminated whether the self/drive flag Fdr is set at 3 or 4 in Step #1100. If the flag Fdr is set at 1 or 2, i.e. the single drive mode self-timer mode is set (NO in Step #1100), the film is advanced by one frame in Step #1102. Subsequently, it is discriminated whether the flag Fdr is set at 2 in Step #1104. If set at 2 (YES in Step #1104), the flag Fdr is set to 1 in Step #1106 and this subroutine proceeds to Step #1120. On the other hand, if the flag Fdr is set at 1 (NO in Step #1104), this subroutine proceeds directly to Step #1120. In this way, the drive mode is reset to a basic single drive mode. This subroutine waits in Step #1120 until the switch S2. which is depressed on to expose the film frame, is turned off.

If the flag Fdr is set at 3 or 4 (YES in Step #1100), it is discriminated whether the flag Fdr is set at 3, i.e. the high speed continuous drive mode is set, in Step #1108. If the flag Fdr is set at 3 (YES in Step #1108), the film is advanced by one frame in Step #1110 and this subroutine immediately proceeds to Step #1122. If the flag Fdr is set at 4, i.e. the low speed continuous drive mode is set (NO in Step #1108), the film is advanced by one frame in Step #1112 and this subroutine proceeds to Step #1122 after waiting for arrival of the next shooting timing in Step #1118.

When the switch S2 is turned off (NO in Step #1120), this subroutine returns to Step #807 in which it is discriminated whether the switch S1 is in the ON state. If the switch S1 is in the ON state (YES in Step #807), this subroutine returns to Step #774 for the next photographing operation in the case of the single drive mode and for the next shot in the case of the continuous drive mode. When the switch S1 is in the OFF state (NO in Step #807), this subroutine proceeds to Step #808 in which it is discriminated whether the presence of eye has been detected in Step #808. If the presence of eye has been detected (YES in Step #808), it is discriminated whether the eye detection mode flag Fca3 is set at 1 in Step #810. If the flag Fca3 is set at 0 (NO in Step #810), it is discriminated whether the grip switch Sg is in the ON state in Step #812. If the flag Fca3 is set at 1 (YES in Step #810) or if the switch Sg is in the ON state (YES in Step #812), this routine returns to Step #774. If the switch Sg is in the OFF state (NO in Step #812), it is discriminated whether the timer flag Ft2 is set at 0 in Step #814. The flag Ft2 indicates that the timer T2 is current measuring time when set to 1 while indicating the opposite when set to 0. If the flag Ft2 is set at 0 (YES in Step #814), the timer T2 is reset and started in Step #816 and the flag Ft2 is set to 1 in Step #818. On the other hand, if the flag Ft2 is set at 1 (NO in Step #814), it is discriminated whether 4 seconds have elapsed following start of the timer T2. i.e. T2≧4 seconds. in Step #820. This routine returns to Step #774 until the timer T2 measures 4 seconds (NO in Step #820). Upon the timer T2 measuring 4 seconds (YES in Step #820), the timer T1 is reset and started in Step #824; execution of the "Tca3 Interrupt Routine" is prohibited in Step #826; and the timer flag Ft2 is reset to 0 in Step #828.

On the other hand, if the absence of eye has been detected (NO in Step #808), this subroutine proceeds to Step #822 in which it is discriminated whether the flag Ft2 is set at 1. If the flag Ft2 is set at 1 (YES in Step #822), this routine proceeds to Step #824 since the timer T2 is currently measuring time. If the flag Ft2 is set at 0 (NO in Step #822), it is discriminated whether the flag Fca3 is set at 1 in Step #830. If the flag Fca3 is set at 0 (NO in Step #830), it is discriminated whether the grip switch Sg is in the ON state in Step #832. If the flag Fca3 is set at 1 (YES in Step #830) or if the switch Sg is in the ON state (YES in Step #832), this routine proceeds directly to Step #836. On the contrary, if the switch Sg is in the OFF state (NO in Step #832), this routine proceeds to Step #836 after prohibiting execution of the "Tca3 Interrupt Routine" in Step #834.

In Steps #836 and #838, all the displays in the in-frame display unit IFI are cleared and all the displays in the out-of-frame display unit IFO are cleared respectively. Then, it is discriminated whether 4 seconds have elapsed following start of the timer T1 in Step #840. A loop of Steps #836 to #840 is recycled until the timer T1 measures 4 seconds. Upon the timer T1 measuring 4 seconds (YES in Step #840), this subroutine proceeds to Step #842 in which the aforementioned "Display Routine I" is executed. Consequently, values of all the flags and registers are reset to respective initial values in Step #844 and this routine returns to Step #8 of the main routine.

Figure 62C:
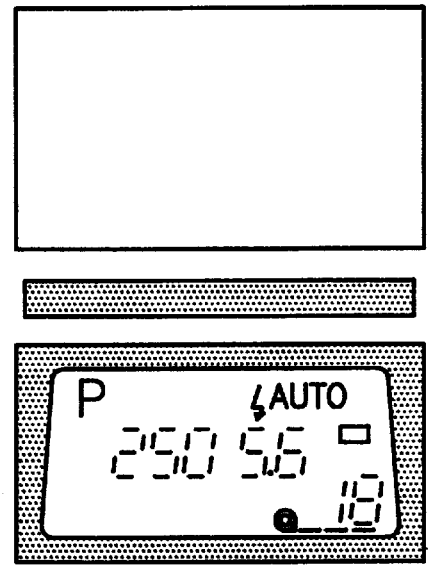

By provision of Steps #808 to #840, the operations after Step #774 are repeated for 4 seconds at the time when the grip switch Sg is turned off in the state where the switch S1 is off; the switch Sg is on; and the presence of eye is detected. Upon lapse of 4 seconds, all the displays in the display units IFI, IFO are cleared for another period of 4 seconds although the displays in the on-body display unit OB are kept displayed, see FIG. 62C. Further, upon detection of the absence of eye, all the displays in the display units IFI, IFO are cleared and the displays in the display unit OB are kept displayed for 4 seconds, see FIG. 62C.

Figure 61:
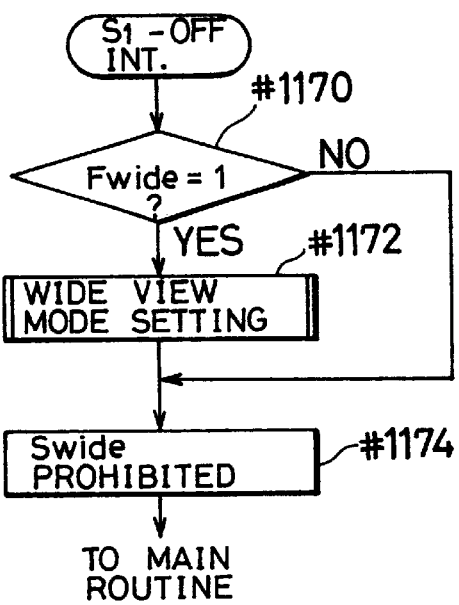
FIG. 61 is a flow chart showing an "S1-OFF Interrupt Routine"

FIG. 61 is a flow chart showing an "S1-OFF Interrupt Routine." In this routine, it is first discriminated whether the wide view flag Fwide is set at 1 in Step #1170. If the flag Fwide is set at 1 (YES in Step #1170), the "Wide View Mode Setting Routine" is executed in Step #1172 and this routine proceeds to Step #1174. If the flag Fwide is set at 0 (NO in Step #1170), this routine proceeds directly to Step #1174. Any interrupt signal from the view size changeover switch Swide is prohibited in Step #1174 and this routine returns to the "Main Routine."

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera comprising:

operation means for executing a predetermined function of the camera, wherein said operation means has a plurality of selectable operation modes including an initial mode;

selecting means for selecting a desired operation mode among the plurality of selectable operation modes for a particular photographic session;

reset means for resetting the operation mode selected by said selecting means to the initial mode; and changing means for changing the initial mode in accordance with a designation made by a user's manual operation independently of any previously selected operation mode.

2. A camera as defined in claim 1, wherein said operation means is a focus detecting means having a plurality of selectable focus detection modes for detecting the focus condition of different respective areas in a field of view.

3. A camera as defined in claim 1, wherein said operation means is a light metering means having a plurality of selectable light metering modes for metering light from different respective areas in a field of view.

4. A camera as defined in claim 1, wherein said operation means is an exposure correcting means having a plurality of selectable correcting modes for providing respective correction amounts that differ from one another.

5. A camera as defined in claim 1, wherein said operation means is an exposure controlling means having a plurality of selectable exposure controlling modes for calculating respective exposure control values that differ from one another.

6. A camera as defined in claim 5, wherein said exposure control values are a shutter speed and an aperture value.

7. A camera as defined in claim 1, further comprising switching means for switching a state of the camera between a normal state where normal image taking operations are executed and an initial mode changing state, independent of the normal state, where the initial mode of the operation means is changed.

8. A camera comprising:
operation means for executing a predetermined function of the camera, wherein said operation means has a plurality of selectable control values including an initial value;
selecting means for selecting a desired control value from the plurality of selectable control values for a particular photographic session;
reset means for resetting the control value selected by said selecting means to the initial value; and
changing means for changing the initial value in accordance with designation made by a user's manual operation independently of any previously selected control value.

9. A camera as defined in claim 8, wherein said operation means is a focus detecting means having a plurality of selectable focus detection values designating different focus detecting areas in a field of view.

10. A camera as defined in claim 8, wherein said operation means is a light metering means having a plurality of selectable light metering values designating different light metering areas in a field of view.

11. A camera as defined in claim 8, wherein said operation means is an exposure correcting means having a plurality of selectable exposure correcting values.

12. A camera as defined in claim 8, wherein said operation means is an exposure controlling means having a plurality of selectable exposure control values.

13. A camera as defined in claim 12, wherein said exposure control values are a shutter speed and an aperture value.

14. A camera as defined in claim 8, further comprising switching means for switching a state of the camera between a normal state where normal image taking operations are executed and an initial value changing state, independent of the normal state, where the initial value of the operation means is changed.

15. A method for setting and resetting an operation mode of a device mounted on a camera that has a plurality of selectable operation modes, said method comprising the steps of:
selecting a desired operation mode among said plurality of selectable operation modes for a particular photographic session;
resetting the operation mode selected in said selecting step to an initial mode;
inputting information for designating a desired operation mode as the initial mode; and
changing the initial mode in accordance with the input information independently of any previously selected operation mode.

16. A method as defined in claim 15, wherein said selecting step includes the step of selecting a focus detecting area of a focus detecting device on the camera, and said resetting step includes the step of resetting the selected area to an initial focus detecting area.

17. A method as defined in claim 15, wherein said selecting step includes the step of selecting a light metering mode of a light metering device on the camera, and said resetting step includes the step of resetting the selected mode to an initial light metering mode.

18. A method as defined in claim 15, further comprising the step of switching a state of the camera between a normal state where normal image taking operations are executed and an initial mode changing state, independent of the normal state, where the initial mode of the device is changed.

19. A method for setting and resetting a control value of a device mounted on a camera which has a plurality of selectable control values, said method comprising the steps of:
selecting a desired control value among said plurality of selectable control values for a particular photographic session;
resetting the control value selected in said selecting step to an initial value;
inputting information for designating a desired control value as the initial value independently of any previously selected control value; and
changing the initial value in accordance with the input information.

20. A method as defined in claim 19, wherein said selecting step includes the step of selecting an exposure correcting value of an exposure correcting device on the camera, and said resetting step includes the step of resetting the selected value to an initial exposure correcting value.

21. A method as defined in claim 19, wherein said selecting step includes the step of selecting an exposure control value of an exposure controlling device on the camera, and said resetting step includes the step of resetting the selected value to an initial exposure control value.

* * * * *